(12) United States Patent
Maeda

(10) Patent No.: US 8,064,518 B2
(45) Date of Patent: Nov. 22, 2011

(54) ENCODING APPARATUS, ENCODING METHOD, DECODING APPARATUS, AND DECODING METHOD

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1472 days.

(21) Appl. No.: 10/586,352

(22) PCT Filed: Mar. 10, 2005

(86) PCT No.: PCT/JP2005/004721
§ 371 (c)(1),
(2), (4) Date: Jul. 17, 2006

(87) PCT Pub. No.: WO2005/088981
PCT Pub. Date: Sep. 22, 2005

(65) Prior Publication Data
US 2007/0110158 A1 May 17, 2007

(30) Foreign Application Priority Data
Mar. 11, 2004 (JP) ................................. 2004-069486

(51) Int. Cl.
*H04N 7/12* (2006.01)
*H04N 11/02* (2006.01)
*H04N 11/04* (2006.01)

(52) U.S. Cl. .............................. 375/240.12; 375/240.01
(58) Field of Classification Search .............. 375/240.12
See application file for complete search history.

(56) References Cited

U.S. PATENT DOCUMENTS

| 4,974,071 | A | 11/1990 | Maeda | 358/839 |
|---|---|---|---|---|
| 5,359,438 | A | 10/1994 | Maeda | 358/539 |
| 5,371,606 | A | 12/1994 | Katayama et al. | 358/400 |
| 5,521,717 | A | 5/1996 | Maeda | 358/426 |
| 5,933,249 | A | 8/1999 | Shimura et al. | 358/429 |
| 6,067,382 | A | 5/2000 | Maeda | 382/239 |
| 6,342,904 | B1 * | 1/2002 | Vasudevan et al. | 715/723 |
| 6,486,981 | B1 | 11/2002 | Shimura et al. | 358/500 |
| 6,512,793 | B1 | 1/2003 | Maeda | 375/240.08 |
| 6,643,382 | B1 | 11/2003 | Maeda | 382/100 |
| 6,763,071 | B1 | 7/2004 | Maeda | 375/240.25 |

(Continued)

FOREIGN PATENT DOCUMENTS

EP  0 658 057 A2  6/1995

(Continued)

OTHER PUBLICATIONS

Richardson, "H.264 and MPEG4 Video Compression", Wiley, 2003.*

(Continued)

*Primary Examiner* — Christopher S Kelley
*Assistant Examiner* — Hee-Yong Kim
(74) *Attorney, Agent, or Firm* — Fitzpatrick, Cella, Harper & Scinto

(57) ABSTRACT

Frames are divided into a plurality of sections on the basis of input images of the frames (S8). One representative image that represents the image of each frame is set in each of the sections (S10). One representative image to be referred to is selected so as to encode an image of a frame of interest from the representative images set for respective sections, and the image of the frame of interest is encoded by motion compensation using the images of the frames in the section that includes the selected representative image (S13, S14, S15).

7 Claims, 28 Drawing Sheets

U.S. PATENT DOCUMENTS

| | | | |
|---|---|---|---|
| 6,782,049 B1 * | 8/2004 | Dufaux et al. | 375/240.01 |
| 6,798,977 B2 | 9/2004 | Maeda | 386/111 |
| 6,968,088 B2 | 11/2005 | Maeda et al. | 382/239 |
| 7,162,101 B2 | 1/2007 | Itokawa et al. | 382/282 |
| 2005/0028213 A1 * | 2/2005 | Adler et al. | 725/89 |
| 2006/0013304 A1 | 1/2006 | Maeda et al. | 375/240.11 |
| 2007/0098073 A1 | 5/2007 | Maeda | 375/240.16 |
| 2007/0160299 A1 | 7/2007 | Kajiwara et al. | 382/240 |

FOREIGN PATENT DOCUMENTS

| | | |
|---|---|---|
| EP | 0 658 057 A3 | 6/1996 |
| WO | WO 01/26379 A1 | 4/2001 |

OTHER PUBLICATIONS

Ferman et al., "Robust Color Histogram Descriptors for Video Segment Retrieval and Identification", IEEE Tran. Image Processing, vol. 11, No. 5, May 2002, pp. 497-508.*

Zhang et al: "Dynamic Selection and Effective Compression of Key Frames for Video Abstraction", Pattern Recognition Letters, vol. 24, No. 9-10, pp. 1523-1532; Jun. 2003.

Sikora T: "MPEG Standards Section 1 Digital Video Coding Standards", Digital Consumer Electronics Handbook, pp. 803-823, I, 1997.

Tudor P.N.: "Tutorial MPEG-2 Video Compression", Electronics and Communication Engineering Journal, Institution of Electrical Engineers, vol. 7, No. 6, pp. 257-264, Dec. 1995.

Tambankar A., et al.: "An overview of H.264/MPEG-4 part 10", Video/Image Processing and Multimedia Communications, pp. 1-51, Jul. 2003.

Yi J. Liang et al.: "Low-Latency video Transmission Over Lossy Packet Networks Using Rate-Distortion Optimized Reference Picture Selection", Proceedings 2002 International Conference on Image Processing, vol. 2 of 3, pp. 181-184, Sep. 22, 2002.

Chang A., et al.: "A Novel Approach to Fast Multi-Frame Selection for H.264 Vider coding", Proceedings of the 2003 of the 2003 IEEE Symposium on Circuits and Systems, vol. 2 of 5, pp. II-704-II-707, May 25, 2003.

* cited by examiner

FIG. 9

| RECORD | VALID FLAG | SECTION START POINT VALUE S | SECTION END POINT VALUE E | REPRESENTATIVE FRAME NUMBER D |
|---|---|---|---|---|
| 0 | 1 | 3 | 7 | 4 |
| 1 | 1 | 8 | 9 | 8 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |

ENCODING APPARATUS, ENCODING METHOD, DECODING APPARATUS, AND DECODING METHOD

This application is a National Stage Filing Under 35 U.S.C. §371 of International Application No. PCT/JP2005/004721, filed Mar. 10, 2005, and published in English as International Publication No. WO 2005/088981, which claims priority to Japanese Patent Application No. 2004-069486, filed Mar. 11, 2004, hereby incorporated by reference.

TECHNICAL FIELD

The present invention relates to a technique for encoding frames that form a moving image by motion compensation, and a technique for decoding the encoded result.

BACKGROUND ART

In recent years the H.264 encoding method, as a new moving image encoding method, has received a lot of attention. This encoding method is jointly developed by the ITU-T and ISO.

As a feature of this new encoding method, 4×4 integer transformation is used, and a plurality of intra-prediction schemes are prepared, unlike in the conventional MPEG-1, 2, and 4 encoding methods. An intra-loop filter is used, and motion compensation is made using seven different types of subblocks. The pixel precision of the motion compensation is as high as ¼ pixel precision as in the MPEG-4 encoding method. Furthermore, universal variable-length encoding and context adaptive variable-length encoding are used as entropy encoding.

As a more significant feature, MPEG-1, 2, or 4 performs motion compensation using two reference images before and after the current image, but H.264 can use more reference images. A num_ref_frames code included in the first header of a bitstream can assume a maximum of 16 values. That is, 16 frames before and after the current frame can be referred to. As for a macroblock to be encoded, prediction errors of seven different types of subblocks are calculated for images of a maximum of 16 frames, as described above, and a macroblock that can minimize the prediction errors is selected, thus greatly improving the encoding efficiency.

FIG. 11 shows the arrangement of an H.264 encoder. This encoder receives image data for respective macroblocks.

A switch 1000 switches whether or not intra-encoding is performed. In case of intra-encoding, image data is input into an intra-predictor 1001, which predicts in nine modes in order to calculate prediction errors. In encoding other than intra-encoding, image data is input into a differentiator 1002, which calculates differences from predicted images to generate prediction errors.

A transformer/quantizer 1003 computes the integer transformation of the obtained prediction errors for 4×4 pixel blocks, thus quantizing respective coefficients. The quantization result undergoes variable-length encoding by an entropy encoder 1004, and the encoded result is output to an output unit 1014. At the same time, the quantization result is input to an inverse quantizer/inverse transformer 1005, which reconstructs the prediction errors. The prediction errors are added to prediction images by an adder 1006. The results are stored in frame memories 1007 to 1010 accordingly.

A motion estimator 1011 compares decoded images stored in the frame memories 1007 to 1010 with an input image to calculate motion vectors for respective subblocks with ¼ pixel precision. The motion vectors and the numbers of the selected frames are also input to a motion compensator 1012, which loads reference images from the corresponding frame memories, selects a reference image with minimum prediction errors, and outputs it as a predicted image to the differentiator 1002. The motion vectors and the numbers of the selected frames are input to a motion encoder 1013 and are encoded, so that the motion vectors are encoded to mvd_idx_IO codes and the like, and information of the reference frames is encoded to ref_idx_IO codes and the like. The encoded codes are output to the output unit 1014. The output unit 1014 shapes and outputs encoded data in accordance with the format.

FIG. 22 shows the arrangement of an H.264 decoder. When encoded data is input into an input unit 5102, codes are interpreted and are distributed to corresponding decoders. An entropy decoder 51021 performs variable-length decoding to obtain the quantization result of 4×4 transformation coefficients. The quantization result is input to an inverse quantizer/inverse transformer 51022 to reconstruct prediction errors. In case of intra-encoding, image data is input to an intra-predictor 51023 to perform prediction from surrounding pixels, thus reconstructing and outputting pixel data. In case of encoding other than intra-encoding, an adder 51024 adds the prediction errors to predicted images to reconstruct and output pixel data. At the same time, these pixel data are stored in the frame memories 51025 to 51028 accordingly. A motion decoder 51029 decodes mvd_idx_IO codes and the like representing motion vectors and ref_idx_IO codes and the like representing reference frame information, and inputs decoded data to a motion compensator 51030. The motion compensator 51030 loads reference images from the corresponding frame memories and outputs them as predicted images to the adder 51024.

Since a plurality of frames are referred to in this way, the encoding efficiency can be improved by referring to temporally separated frames such as in a case wherein an object which once hides behind another object and appears after a brief interval.

The aforementioned encoding apparatus encodes by referring to a plurality of frames, and tries to reduce prediction errors, with reference to many frames. However, when the number of frames to be referred to becomes large, a more robust process is required in motion vector search for motion compensation.

In the aforementioned encoding apparatus, when there are no significant changes, all reference frames are very similar to one another, and images over a long period of time cannot be referred to by fewer frames. However, when a change has occurred, a large code size is generated. For example, a railway monitor monitors rail tracks without trains most of the time, and generates a large code size at an instance when a train is framed. This poses a problem. It lowers the effect of improving the encoding efficiency even when a plurality of frames are referenced. The number of frames increases dramatically over a long period of time, the circuit scale becomes huge, and many additional processes are required, resulting in long processing times.

Also, when images including many noise components are selected as reference images upon encoding, a large code size is required.

Since intra-frame encoded images generally deteriorate less than inter-frame encoded images, they are suited to reference frames, but have a large code size.

DISCLOSURE OF INVENTION

The present invention has been made in consideration of the aforementioned problems, and has as its object to implement faster motion compensation.

The present invention has been made in consideration of the aforementioned problems, and has as its object to effectively reduce the number of frames to be referred to, and to perform an encoding process using faster motion compensation.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames;

section division means for dividing the frames into a plurality of sections on the basis of the images of the frames input by the input means;

representative image setting means for setting one representative image that represents the image of each frame in each of the sections divided by the section division means; and reference image selection means for selecting one representative image to be referred to so as to encode an image of a frame of interest from the representative images set for respective sections, and in that the image of the frame of interest is encoded by motion compensation using the images of the frames in the section that includes the representative image selected by the reference image selection means.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames;

section division means for dividing the frames into a plurality of sections on the basis of the images of the frames input by the input means;

representative image setting means for setting one representative image that represents the image of each frame in each of the sections divided by the section division means; and reference image selection means for selecting one representative image to be referred to so as to encode an image of a frame of interest from the representative images set for respective sections, and in that the image of the frame of interest is encoded by motion compensation using the representative image selected by the reference image selection means.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames for every predetermined number of frames;

representative image setting means for setting one representative image that represents images of the predetermined number of frames on the basis of the images of the frames for every predetermined number of frames; and output means for outputting encoded results of the images of the frames input by the input means together with information required to specify the representative image.

In order to achieve an object of the present invention, for example, a decoding apparatus of the present invention comprises the following arrangement.

That is, a decoding apparatus for decoding an encoded result of images of frames that form a moving image by motion compensation, characterized by comprising:

input means for inputting encoded results of images of frames for a predetermined number of frames and information required to specify a representative frame which represents the frames for the predetermined number of frames, which is appended to each of the encoded results of the frames; and storage means for storing a decoded result of the representative frame specified by the information, and in that the encoded result of an image of each frame input by the input means after the representative frame stored in the storage means is decoded using the decoded result of the representative frame stored in the storage means.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames;

setting means for setting an image of a frame input at a predetermined cycle of the images of the frames input by the input means as an image of a representative frame;

switching means for switching an encoding method depending on whether or not a frame to be encoded is a representative frame; and output means for outputting encoded results of the images of the frames input by the input means together with information required to specify the representative frame.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames for every predetermined number of frames;

calculation means for calculating a difference between an image of a frame input by the input means and a decoded image obtained by decoding a result of encoding the image of the frame;

determination means for determining an image of a frame having a smallest difference of the differences calculated by the calculation means for the frames for the predetermined number of frames as a representative image that represents the images of the frames for the predetermined number of frames; and output means for outputting encoded results of the images of the frames input by the input means together with information required to specify the representative frame.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames;

storage means for storing an image of a representative frame to be referred to when inter-frame encoding is applied to an input image input by the input means;

calculation means for calculating similarity levels of images stored in the storage means with the input image;

storage control means for, when a minimum similarity level of the similarity levels calculated by the calculation means for the images stored in the storage means is not less than a predetermined value, storing the input image in the storage means as a representative frame; and output means for outputting encoded results of the images of the frames input by the input means together with information required to specify the representative image.

In order to achieve an object of the present invention, for example, an encoding apparatus of the present invention comprises the following arrangement.

That is, an encoding apparatus for encoding images of frames, which form a moving image by motion compensation, characterized by comprising:

input means for inputting images of frames;

storage means for storing an image of a representative frame to be referred to when inter-frame encoding is applied to an input image input by the input means;

motion vector calculation means for calculating motion vectors with the input image for images stored in the storage means;

calculation means for calculating errors of the emotion vectors calculated by the motion vector calculation means for the images stored in the storage means;

storage control means for, when a minimum error of the errors calculated by the calculation means for the images stored in the storage means is not more than a predetermined value, storing the input image in the storage means as a representative frame; and output means for outputting encoded results of the images of the frames input by the input means using the motion vectors together with information required to specify the representative image.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames;

a section division step of dividing the frames into a plurality of sections on the basis of the images of the frames input in the input step;

a representative image setting step of setting one representative image that represents the image of each frame in each of the sections divided in the section division step; and a reference image selection step of selecting one representative image to be referred to so as to encode an image of a frame of interest from the representative images set for respective sections, and in that the image of the frame of interest is encoded by motion compensation using the images of the frames in the section that includes the representative image selected in the reference image selection step.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames;

a section division step of dividing the frames into a plurality of sections on the basis of the images of the frames input in the input step;

a representative image setting step of setting one representative image that represents the image of each frame in each of the sections divided in the section division step; and a reference image selection step of selecting one representative image to be referred to so as to encode an image of a frame of interest from the representative images set for respective sections, and in that the image of the frame of interest is encoded by motion compensation using the representative image selected in the reference image selection step.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames for every predetermined number of frames;

a representative image setting step of setting one representative image that represents images of the predetermined number of frames on the basis of the images of the frames for every predetermined number of frames; and an output step of outputting encoded results of the images of the frames input in the input step together with information required to specify the representative image.

In order to achieve an object of the present invention, for example, a decoding method of the present invention comprises the following arrangement.

That is, a decoding method of decoding an encoded result of images of frames that form a moving image by motion compensation, characterized by comprising:

an input step of inputting encoded results of images of frames for a predetermined number of frames, and information required to specify a representative frame which represents the frames for the predetermined number of frames, which is appended to each of the encoded results of the frames; and a storage step of storing a decoded result of the representative frame specified by the information, and in that the encoded result of an image of each frame input in the input step after the representative frame stored in the storage step is decoded using the decoded result of the representative frame stored in the storage step.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames;

a setting step of setting an image of a frame input at a predetermined cycle of the images of the frames input in the input step as an image of a representative frame;

a switching step of switching an encoding method depending on whether or not a frame to be encoded is a representative frame; and an output step of outputting encoded results of the images of the frames input in the input step together with information required to specify the representative frame.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames for every predetermined number of frames;

a calculation step of calculating a difference between an image of a frame input in the input step and a decoded image obtained by decoding a result of encoding the image of the frame;

a determination step of determining an image of a frame having a smallest difference of the differences calculated in the calculation step for the frames for the predetermined number of frames as a representative image that represents the images of the frames for the predetermined number of frames; and an output step of outputting encoded results of the images of the frames input in the input step together with information required to specify the representative frame.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames;

a storage step of storing an image of a representative frame to be referred to when inter-frame encoding is applied to an input image input in the input step;

a calculation step of calculating similarity levels of images stored in the storage step with the input image;

a storage control step of storing, when a minimum similarity level of the similarity levels calculated by the calculation step for the images stored in the storage step is not less than a predetermined value, the input image in the storage step as a representative frame; and an output step of outputting encoded results of the images of the frames input in the input step together with information required to specify the representative image.

In order to achieve an object of the present invention, for example, an encoding method of the present invention comprises the following arrangement.

That is, an encoding method of encoding images of frames, which form a moving image by motion compensation, characterized by comprising:

an input step of inputting images of frames;

a storage step of storing an image of a representative frame to be referred to when inter-frame encoding is applied to an input image input in the input step;

a motion vector calculation step of calculating motion vectors with the input image for images stored in the storage step;

a calculation step of calculating errors of the motion vectors calculated in the motion vector calculation step for the images stored in the storage step;

a storage control step of storing, when a minimum error of the errors calculated in the calculation step for the images stored in the storage step is not more than a predetermined value, the input image in the storage step as a representative frame; and an output step of outputting encoded results of the images of the frames input in the input step using the motion vectors together with information required to specify the representative image.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 shows the contents of a table that represents a section;

BEST MODE FOR CARRYING OUT THE INVENTION

Preferred embodiments of the present invention will now be described in detail in accordance with the accompanying drawings.

First Embodiment

Figure 1:
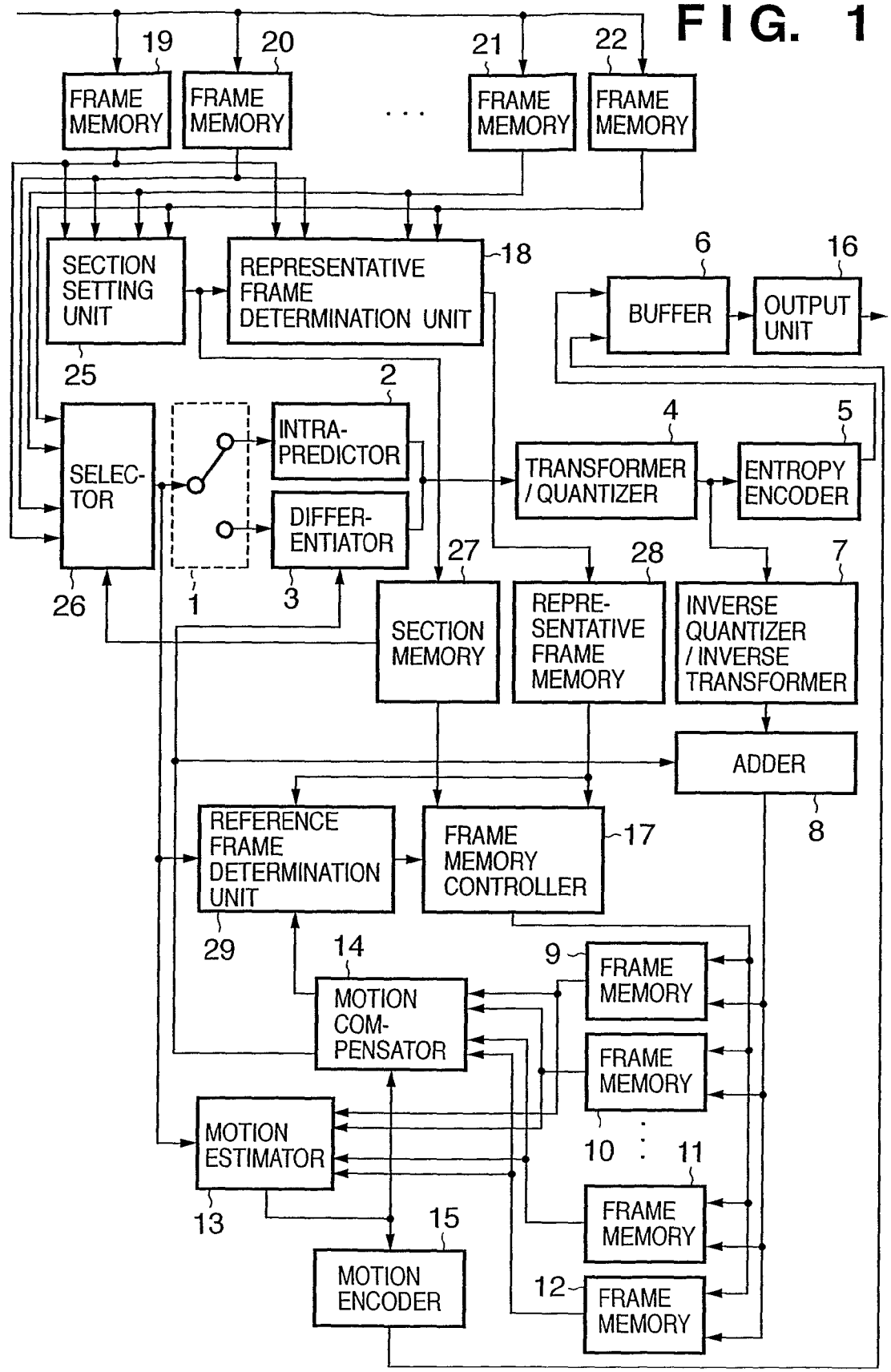
FIG. 1 is a block diagram showing the arrangement of a moving image encoding apparatus according to the first embodiment of the present invention.

FIG. 1 is a block diagram showing the arrangement of a moving image encoding apparatus according to this embodiment. In this embodiment, a description will be given based on the H.264 encoding method, but temporally discontinuous reference frames are to be referred to unlike in H.264. However, the base method is not limited to H.264. For the sake of simplicity, forward prediction that refers to previous frames will be exemplified. However, the present invention can also be applied to two-way prediction. In the following description, image data of a frame will also be referred to as frame data. This frame data (an image of a frame) includes data indicating the frame number of this frame.

Referring to FIG. 1, reference numerals 19 to 22 denote frame memories for storing images of frames (input images) of an externally input moving image. Reference numeral 1 denotes a selector which selects an output destination in accordance with an intra-frame encoding/inter-frame encoding mode.

Reference numeral 2 denotes an intra-predictor which performs intra-prediction based on the H.264 encoding method; and 3, a differentiator for obtaining motion prediction errors. Reference numeral 4 denotes a transformer/quantizer which performs integer orthogonal transformation, and quantizes input coefficients; and 7, an inverse quantizer/inverse transformer which performs the reverse process of the transformer/quantizer 4. Reference numeral 8 denotes an adder which adds motion predicted images. Reference numeral 5 denotes an entropy encoder which encodes the quantization result of the transformer/quantizer 4; and 6, a buffer which stores generated codes for a plurality of frames.

Reference numerals 9, 10, 11, and 12 denote frame memories each of which stores locally decoded image data and the frame number for each frame. Reference numeral 13 denotes a motion estimator which extracts an optimal motion vector from the corresponding frame of an input image and decoded image data; and 14, a motion compensator which generates a predicted image on the basis of the motion vector calculated by the motion estimator 13 and information of the corresponding frame. Reference numeral 15 denotes a motion encoder which encodes motion information on the basis of the calculated motion vector and information of the corresponding frame.

Reference numeral 17 denotes a frame memory controller which controls inputs/outputs of the frame memories 9 to 12; and 16, an output unit which outputs encoded data stored in the buffer 6. Reference numeral 25 denotes a section setting unit which sets a section by calculating a similarity level upon comparison of input images. Reference numeral 18 denotes a representative frame determination unit which determines a representative frame that represents the section. Reference numeral 26 denotes a selector which selects a frame to be encoded. Reference numeral 27 denotes a section memory which stores the set section; and 28, a representative frame memory which stores the determined representative frame. Reference numeral 29 denotes a reference frame determination unit which determines a section to be referred to.

The moving image encoding operation in the moving image encoding apparatus with the above arrangement will be described below.

Prior to encoding, the frame memories, section memory 27, and representative frame memory 28 are initialized. As an initialization process, each memory is padded with zero data.

In the section setting unit 25, "1" indicating the first frame is set as a start point value indicating the start point and an end point value indicating the end point of the section. The output unit 16 generates and outputs header information which represents the maximum number of frames to be referred to.

Image data of frames input to the moving image encoding apparatus of this embodiment are stored in turn in the frame memories 19 to 22. Each input image data is input to the section setting unit 25 together with image data of the previously input frame. That is, a set of images of the N-th and (N−1)-th frames are input to the section setting unit 25.

The section setting unit 25 calculates a difference R between the two input frame data (image data of frames). In this embodiment, for the sake of simplicity, a sum total value obtained by adding the absolute values of differences between pixel values of corresponding pixels in the two images for all the pixels is used as the difference R.

For example, let $X_N(i, j)$ (i and j indicate the position of a pixel in an image $X_N$) be the pixel value of the image $X_N$ of the N-th frame stored in the frame memory 19, and $X_{N-1}(i, j)$ be the pixel value of an image $X_{N-1}$ of the (N−1)-th frame stored in the frame memory 20.

In this case, a difference RN between these two images (images of the N-th and (N−1)-th frames) can be calculated by:

$$RN = \Sigma\Sigma(|X_N(i,j) - X_{N-1}(i,j)|) \qquad (1)$$

where "$\Sigma\Sigma$" indicates addition for all i and j.

If the calculated difference RN is smaller than a pre-set threshold Th, the section setting unit 25 adds 1 to the end point value, and repeats the same process by incrementing N by 1.

On the other hand, if the difference RN is larger than the pre-set threshold Th or if the frame memories 19 to 22 become full of non-encoded frame data, the section setting unit 25 stores the start and end point values of the section on a free area of the section memory 27 or overwrites them on data indicating the oldest section if no free area is available in the section memory 27. Also, these values are input to the representative frame determination unit 18.

The representative frame determination unit 18 loads these values (start and end point values) indicating the section and image data of frames in the section stored in the frame memories 19 to 22, and calculates a difference Q. In this embodiment, let S be the start point value and E be the endpoint value of the section. Then, a difference QN between the N-th frame and each of other frames (the S-th to E-th frames except for the N-th frame) is calculated by:

$$QN = \Sigma(\Sigma\Sigma(|X_N(i,j) - X_M(i,j)|)) \ (M = S \text{ to } E) \qquad (2)$$

More specifically, the sum total value of $(|X_N(i, j)-X_M(i, j)|)$ is calculated for all i and j, and such results are added for all M (S to E). Especially, when N=M, calculations can be omitted.

That is, the difference value QN according to this embodiment is obtained by calculating the sum total values, each of which is obtained by adding the absolute values of the differences of pixel values of corresponding pixels between the N-th and M-th frame images, for all M (M=S, S+1 ... E−1, E), and calculating the sum total of these values.

The representative frame determination unit 18 selects a frame with the smallest difference Q of the calculated differences QN. The unit 18 inputs the number of the selected frame to the representative frame memory 28.

Then, the section setting unit 25 sets a value obtained by adding 1 to the end point value in the start and end point values.

Next, the selector 26 refers to the latest start and end point values stored in the section memory 27, sequentially reads out frame data between the start and end point values of those stored in the frame memories 19 to 22, and inputs them to the selector 1.

The selector 1 selects the intra-predictor 2 as an output so as to intra-frame encode frames at predetermined intervals (e.g., every 15 frames). Otherwise, the selector 1 selects the differentiator 3 as an output so as to perform inter-frame encoding.

When the intra-predictor 2 is selected, input frame data undergoes prediction for respective blocks. On the other hand, when the differentiator 3 is selected, each input image data is input to the motion estimator 13 for respective slices.

Representative frame data of respective sections are read out from the frame memories 9 to 12 with reference to "the representative frame numbers of previously set sections) held in the representative frame memory 28, and the motion estimator 13 and motion compensator 14 generate predicted images corresponding to input images of the representative frames. Then, errors (prediction errors) between the predicted images of the representative frames and input images are calculated, and a representative frame with smallest prediction errors from the input image is specified.

The start and end point values as information indicating the two ends of the section that includes the frame number of the specified representative frame are read out from the representative frame memory 28, and images of frames in the section specified by the readout start and end point values are read out from the frame memories 9 to 12. The motion estimator 13 and motion compensator 14 execute a known encoding process based on motion compensation using the readout images and input images.

Since the motion compensator 14 generates a predicted image corresponding to an input image, that image is input to the differentiator 3. The differentiator 3 calculates a prediction error from the input image and predicted image. A motion vector is encoded by the motion encoder 15, and is stored in the buffer 6. The result obtained by the intra-predictor 2 or differentiator 3 is input to the transformer/quantizer 4, which computes the integer orthogonal transforms and quantizes their coefficients. The quantization result is input to the entropy encoder 5 and inverse quantizer/inverse transformer 7. The entropy encoder 5 entropy-encodes the input quantization result and stores encoded data in the buffer 6 for respective frames.

On the other hand, since the intra-predictor 2 or differentiator 3 outputs the prediction error, the prediction error is supplied to the adder 8 via the transformer/quantizer 4 and inverse quantizer/inverse transformer 7, and is added to a "predicted image corresponding to an input image" input from the motion compensator 14 by the adder 8. For example, when the prediction error is output from the differentiator 3, it is a difference between the input image input from the selector 26 and the predicted image corresponding to this input image, and the adder 8 adds this difference to "the predicted image corresponding to the input image" input from the motion compensator 14, thus reclaiming a decoded image. Hence, the frame memories 9 to 12 store data obtained by reclaiming frame data stored in the frame memories 19 to 22.

The aforementioned encoding process based on motion compensation is a known one except for the process for specifying images to be referred to (in the above description, images of frames in the section including the frame number of the specified representative frame).

As described above, in the encoding process according to this embodiment, a section of a sequence of frames whose images are not so different among continuous images (the difference Rn between neighboring frames is equal to or smaller than the threshold Th) is set. Furthermore, a frame having a smallest difference from other frames in those of this section is set as the frame of a reference image. Hence, the number of images to be referred to upon encoding frames in the section is one, and the number of images to be referred to can be reduced, thus allowing a faster encoding process.

Note that the inverse quantizer/inverse transformer 7 obtains the prediction error (a difference between the input image and predicted image) from the input quantization result, and adds it to a predicted image from the motion compensator 14, thus reclaiming an input image. The reclaimed input image is stored in a frame memory that does not store any data or a frame memory that stores image data of the oldest frame of the frame memories 9 to 12.

Finally, encoded data stored in the buffer 6 is externally output from the output unit 16. Also, image data of the frames that have been encoded are deleted from the frame memories 19 to 22.

The aforementioned process is repeated until all frames input to the moving image encoding apparatus of this embodiment are encoded.

Figure 2:
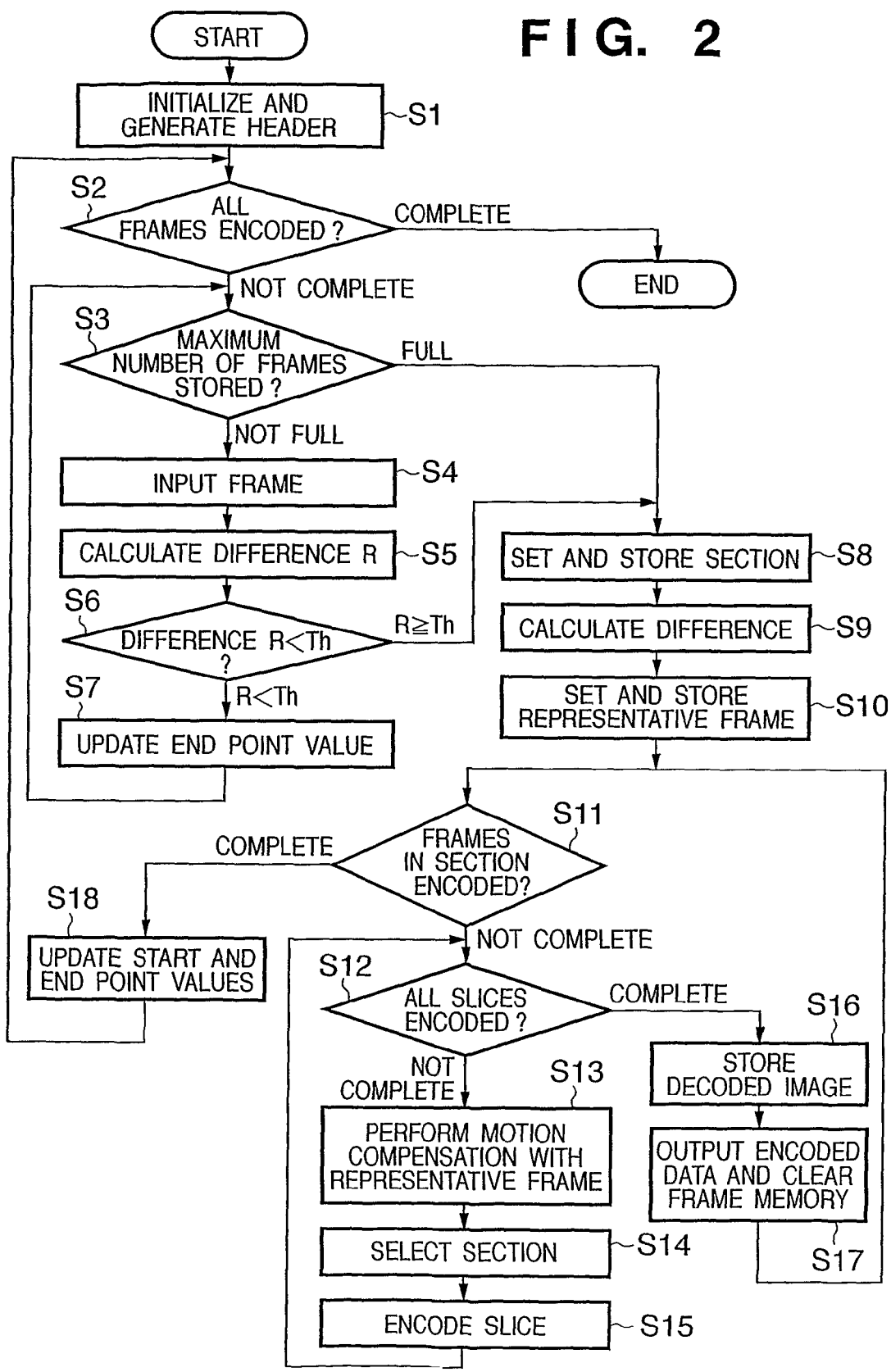
FIG. 2 is a flowchart of an encoding process according to the first embodiment of the present invention.

FIG. 2 is a flowchart of the aforementioned encoding process.

As described above, respective units shown in FIG. 1 are initialized, and the output unit 16 generates and outputs header information indicating the maximum number of frames to be referred to (step S1). It is checked if the encoding process of all frames to be encoded is complete (step S2). If frames to be encoded still remain, the flow advances to step S3 to check if the frame memories 19 to 22 become full of image data of non-encoded frames (step S3). If the frame memories still have an enough space, the flow advances to step S4; otherwise, the flow advances to step S8.

If the frame memories still have an enough space, frame data to be encoded are sequentially input to the frame memories 19 to 22 (step S4). The section setting unit 25 refers to a frame at a position indicated by the start point value. In this case, the section setting unit 25 calculates a difference R between the current reference frame and next frame according to equation (1) (step S5). It is checked if the calculated difference R is smaller than the predetermined threshold Th (step S6). If R<Th, the section setting unit 25 determines that the difference between the current reference frame image and the next frame image is not so large, updates the end point value by adding 1 to it (step S7), and repeats the processes in step S3 and subsequent steps. In this manner, if it is determined that the difference between the current reference frame image and the next frame image is not so large, the end point is updated one by one to update the section specified by the start and end point values.

On the other hand, if the difference R is equal to or larger than the threshold Th in step S6 or if the frame memories do not have any space and are full of data in step S3, the section setting unit 25 determines that the current reference frame image and the next frame image have a difference, and stores the start and end point values in the section memory 27 so as to refer to the section specified by the start and end point values in subsequent processes (step S8).

The representative frame determination unit 18 loads these values (start and end point values) indicating the section, and image data of respective frames in this section of the frame memories 19 to 22, and executes the process for calculating differences QN according to equation (2) for these frames (step S9). Then, the unit 18 sets a frame with a smallest difference QN of those calculated for respective frames as a representative frame. For this purpose, the unit 18 inputs and stores the frame number of the frame with a smallest difference Q in the frame memory 28 (step S10).

The subsequent processes calculate motion vectors for respective frames in this section, and encode these frames.

It is checked if the encoding process of all the frames in the section is complete (step S11). If frames to be encoded in the section still remain, the flow advances to step S12 to encode images of the frames to be encoded one by one.

The process for encoding one frame image will be described below.

One frame image is encoded for respective encoding units (to be referred to as slices hereinafter). It is checked if the encoding process of all encoding units of one image is complete (step S12).

If encoding units to be encoded still remain, the flow advances to step S13. The motion compensator 14 reads out data of representative frames of respective sections held in the representative frame memory 28 on the basis of the "frame numbers for previously set sections" from the frame memories 9 to 12. The motion compensator 14 generates predicted images of the representative frames corresponding to the frame image to be encoded, and calculates errors (prediction errors) between the predicted images corresponding to the representative frames, and the frame image to be encoded (step S13).

Then, the representative frame with a smallest prediction error from the frame to be encoded is specified, and the start and end point values as information indicating the two ends of the section including the frame number of the specified representative frame are read out from the representative frame memory 28, thus setting the section to be referred to so as to encode the encoding unit to be encoded (step S14).

Frame images in the section set in step S14 are read out from the frame memories 19 to 22, and the encoding unit undergoes the encoding process using the readout images and the encoding unit to be encoded (step S15).

The process in step S15 will be described in more detail below. If the inter-frame encoding mode is set, the motion estimator 13 compares the encoding unit to be encoded with the corresponding portion of each frame in the section set in step S14 to obtain a motion vector by a known technique. The motion encoder 15 encodes this motion vector and outputs the encoded result to the buffer 6.

The motion compensator 14 generates a predicted image for this encoding unit on the basis of the calculated motion vector, and the differentiator 3 calculates the difference between this predicted image and encoding unit as a prediction error. This prediction error is encoded by the transformer/quantizer 4 and entropy encoder 5, and the encoded result is output to the buffer 6. As a result, the buffer 6 stores the encoded data of the motion vector and that of the prediction error as the encoded results of this encoding unit.

On the other hand, if the intra-frame encoding mode is set, this encoding unit is directly encoded.

In order to execute the encoding process for the next encoding unit, the flow returns to step S12 to repeat the subsequent processes. The encoding process in steps S12 to S15 is a known one, and this embodiment has the aforementioned feature in the selection method of the image to be referred to upon encoding.

On the other hand, if it is determined in step S12 that the encoding process of all the encoding units that form one frame image is complete, the flow advances to step S16 to store the frame image encoded in steps S12 to S15 in a frame memory that does not store any image data or a frame memory that stores the frame of the oldest number of the frame memories 9 to 12 (step S16).

The output unit 16 externally outputs the encoded data output to the buffer 6 (step S17). In order to encode the next frame in the section, the flow returns to step S11 to repeat the subsequent processes.

If it is determined in step S11 that the encoding process of all the frames in the section is complete, the flow advances to step S18. The section setting unit 25 sets a value obtained by adding 1 to the end point value in the start and end point values to update the start and end point values (step S18). The flow then returns to step S2 to repeat the subsequent processes.

With the above description, the moving image encoding apparatus according to this embodiment can efficiently perform optimal motion compensation with reference to a fewer number of frames, and can attain a faster encoding process. In this embodiment, the difference is the sum total of the differences for respective pixels between images. However, the present invention is not particularly limited to this as long as the difference indicates a similarity between images.

In this embodiment, differences for respective pixels are calculated for all pixels but may be calculated for subsampled pixels.

The moving image encoding apparatus according to this embodiment is implemented by hardware having the arrangement shown in FIG. 1. However, the present invention is not limited to this. For example, the functions of the respective units shown in FIG. 1 are implemented by software, and a program of this software is installed in a computer such as a PC (personal computer), WS (workstation), or the like. When a CPU of this computer executes this program, the computer executes the aforementioned moving image encoding process. Hence, in this case, this computer can serve as the moving image encoding apparatus according to this embodiment.

In this way, software implementation is possible not only in this embodiment, but also in subsequent embodiments.

Second Embodiment

Figure 3:
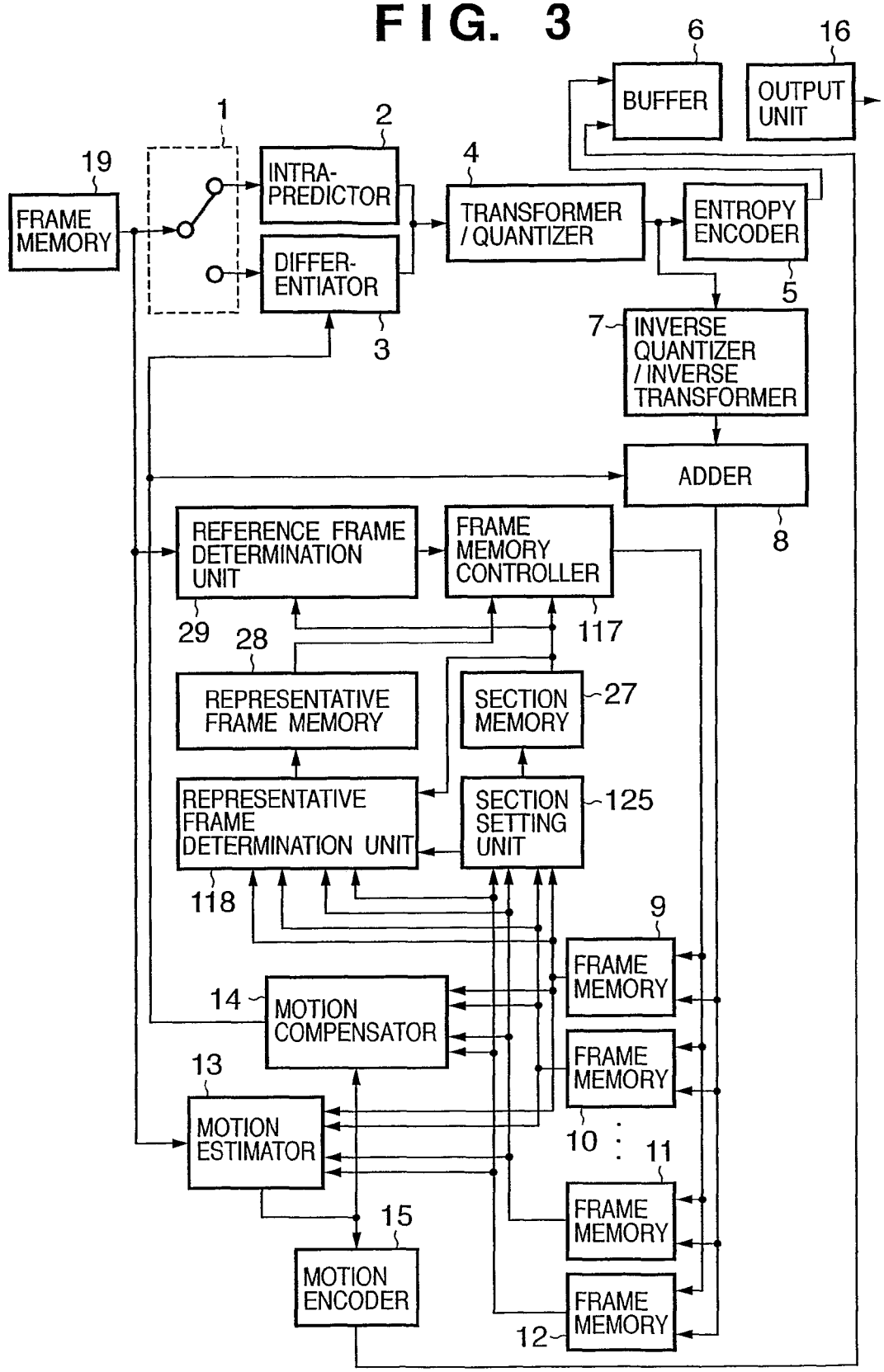
FIG. 3 is a block diagram showing the arrangement of a moving image encoding apparatus according to the second embodiment of the present invention.

FIG. 3 is a block diagram showing the arrangement of a moving image encoding apparatus according to this embodiment. The same reference numerals in FIG. 3 denote the same parts as in FIG. 1, and a description thereof will be omitted.

Reference numeral 117 denotes a frame memory controller which controls inputs/outputs of the frame memories 9 to 12; and 125, a section setting unit which sets a section by calculating a similarity level upon comparison of input images.

Reference numeral 118 denotes a representative frame determination unit which determines a representative frame that represents the section.

The moving image encoding process to be executed by the moving image encoding apparatus according to this embodiment will be described below.

As in the first embodiment, prior to encoding, the frame memories, section memory 27, and representative frame memory 28 are initialized. As an initialization process, each memory is padded with zero data.

In the section setting unit 25, "1" indicating the first frame is set as a start point value indicating the start point and an end point value indicating the end point of the section. The output unit 16 generates and outputs header information which represents the maximum number of frames to be referred to.

Frames that form a moving image are sequentially input to the frame memory 19. When the intra-frame encoding mode is set, the selector 1 inputs frame data which is input to and stored in the frame memory to the intra-predictor 2 for respective macroblocks. The intra-predictor 2 performs prediction for blocks, and a prediction error as the prediction result undergoes integer orthogonal transformation and quantization by the transformer/quantizer 4. The quantization result is input to the entropy encoder 5. The entropy encoder 5 entropy-encodes the input quantization result, and stores encoded data in the buffer 6 for respective frames.

The inverse quantizer/inverse transformer 7 obtains a decoded image from the input quantization result. The decoded image data is stored in a free frame memory or a frame memory that stores image data of the oldest representative frame of the frame memories 9 to 12 in accordance with an instruction from the frame memory controller 117. The encoded data stored in the buffer 6 is output from the output unit 16.

In this manner, the process in the intra-frame encoding mode is the same as that in the first embodiment.

On the other hand, the process when the inter-frame encoding mode is set will be described below.

Basically, the encoding process is done as in the first embodiment. Unlike in the first embodiment, the section and representative frame are updated as needed parallel to encoding without determining the section and representative frame in advance. The update process will be explained below.

As in the first embodiment, the differentiator 3 outputs a difference between an input image and predicted image as a prediction error. This prediction error is added to a predicted image by the adder 8 to reclaim a decoded image. The decoded image is stored in one of the frame memories 9 to 12.

Each of input image data stored in the frame memories 9 to 12 is input to the section setting unit 125 together with image data of the previously input frame. That is, a set of images of the N-th and (N−1)-th frames are input to the section setting unit 125.

The section setting unit 125 calculates a difference R between the two input frame data according to equation (1). Note that in this embodiment, the method of calculating the difference R is not limited to such specific method. If the calculated difference R is smaller than the pre-set threshold Th, the section setting unit 125 adds 1 to the end point value to update the end point value.

If a frame indicated by the end point value updated by the section setting unit 125 is the N-th frame, the representative frame determination unit 118 calculates differences QN according to equation (2) using images from the frame indicated by the current start point value to the (N−1)-th frame, and the image of the N-th frame (in this case, "images from the frame indicated by the current start point value to the (N−1)-th frame" correspond to $X_M(i, j)$, and the "image of the N-th frame" corresponds to $X_N(1, j)$).

Also, the section setting unit 125 calculates a difference SN between the N-th frame image and image data of a frame set as the representative frame of the current section according to equation (1).

The representative frame determination unit 118 adds the difference SN and a cumulative difference QD (an initial value of this difference QD is zero) of the differences from the representative frame upon encoding up to the (N−1)-th frame to calculate a new cumulative difference QD'. This cumulative difference QD' is compared with the difference QN.

As a result of comparison, if the difference QN is smaller than the cumulative difference QD', the N-th frame is set as a new representative frame. For this purpose, the frame number (i.e., N) of the N-th frame is set in the representative frame memory 28. After that, the value of the difference QN is substituted as the value of the difference QD.

On the other hand, if the difference QN is equal to or larger than the difference QD', the representative frame is not updated. After that, the value of the difference QD' is substituted as the value of the difference QD.

With the aforementioned process, the representative frame and the end point value of the section can be set immediately before encoding of the next frame.

Figure 4:
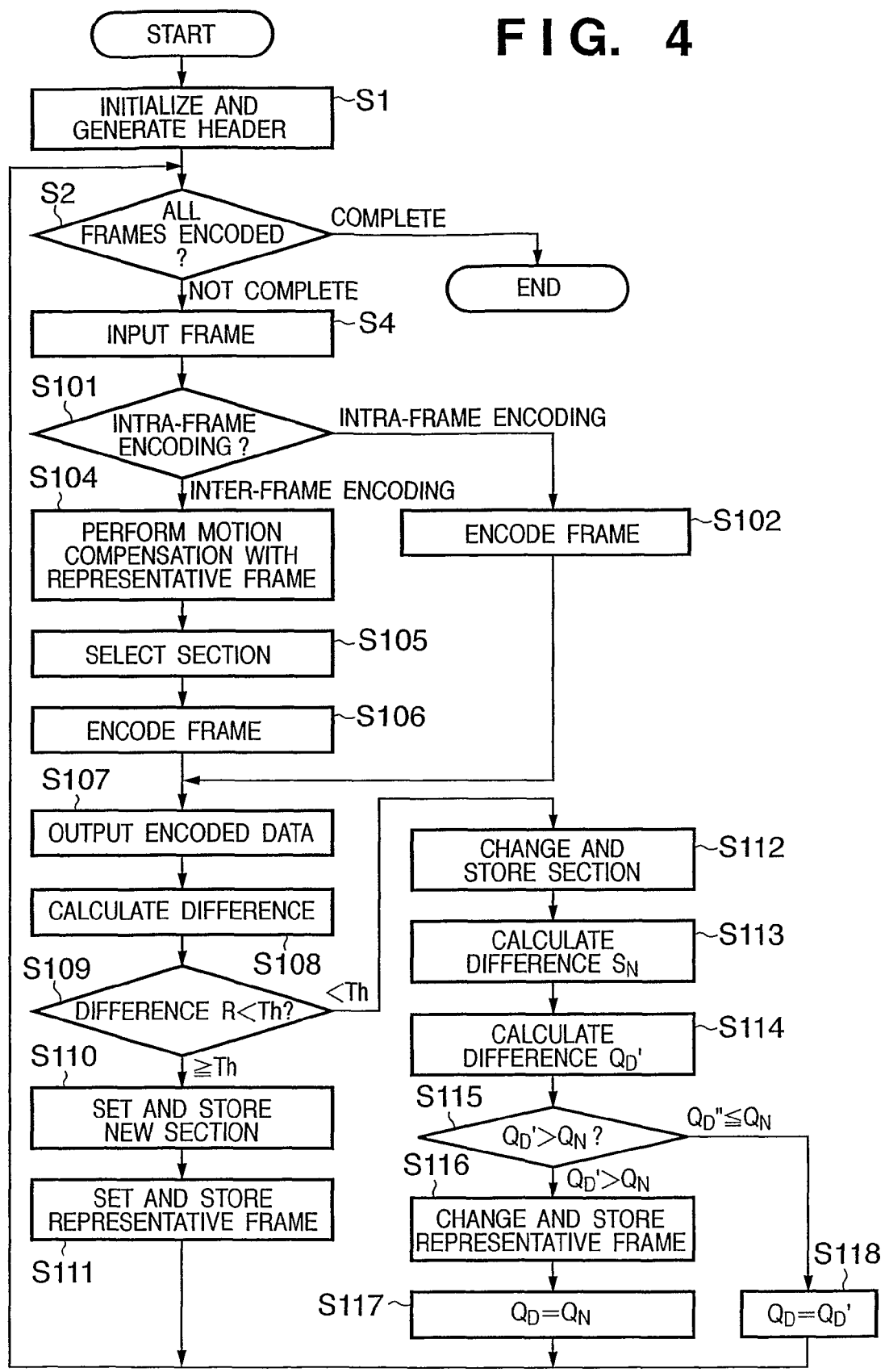
FIG. 4 is a flowchart of an encoding process according to the second embodiment of the present invention.

FIG. 4 is a flowchart of the aforementioned encoding process. In FIG. 4, the same numbers are assigned to the same processing steps as those in FIG. 2, and a description thereof will be simplified. This embodiment will exemplify a case wherein the representative frame is selected for respective frames. However, the present invention is not limited to this, and slices or macroblocks may be used as units as in the first embodiment.

As described above, respective units shown in FIG. 3 are initialized, and the output unit 16 generates and outputs header information indicating the maximum number of frames to be referred to (step S1). It is checked if the encoding process of all frames to be encoded is complete (step S2). If frames to be encoded still remain, the flow advances to step S4 to sequentially input frame data to be encoded to the frame memory 19 (step S4).

It is then checked which of the intra-frame encoding and inter-frame encoding modes is set (step S101). If the intra-frame encoding mode is set, the flow advances to step S102. The selector 1 outputs an input image from the frame memory 19 to the intra-predictor 2, which applies known intra-encoding to the input image (step S102).

On the other hand, if the inter-frame encoding mode is set, the flow advances to step S104. The motion compensator 14 reads out data of representative frames of respective sections held in the representative frame memory 28 on the basis of the "frame numbers for previously set sections" from the frame memories 9 to 12. The motion compensator 14 generates predicted images of the representative frames corresponding to the frame image to be encoded, and calculates errors (prediction errors) between the predicted images corresponding to the representative frames, and the frame image to be encoded (step S104).

Then, the representative frame with a smallest prediction error from the frame to be encoded is specified, and the start and end point values as information indicating the two ends of the section including the frame number of the specified representative frame are read out from the representative frame memory 28, thus setting the section to be referred to so as to encode the frame to be encoded (step S105).

Frame images in the section set in step S105 are read out from the frame memories 19 to 22, and the frame to be encoded undergoes the encoding process using the readout images and the frame to be encoded (step S106).

The processes in steps S104 to S106 are substantially the same as those in steps S13 to 15, except for an encoding unit.

With the above processes, since the buffer 6 stores the encoded data of the frame to be encoded as in the first embodiment, the output unit 16 externally outputs this encoded data stored in the buffer 6. Furthermore, as in step S16, the reclaimed image of the encoded frame is stored in a frame memory that does not store any image data or a frame memory that stores the frame of the oldest number of the frame memories 9 to 12 (step S107).

The subsequent processes set information to be referred to so as to encode the next frame, i.e., the position of the representative frame and the section.

The representative frame determination unit 118 compares the reclaimed image (reclaimed in step S107) of the frame encoded in step S106 with the image (which is similarly reclaimed and is stored in one of the frame memories 9 to 12) of the frame immediately before this frame to calculate a difference R on the basis of equation (1) (step S108).

The unit 118 compares the calculated difference R with the threshold Th (step S109). If the difference R is equal to or larger than the threshold Th, the flow advances to step S110; otherwise, the flow advances to step S112.

If the difference R is equal to or larger than the threshold Th, the flow advances to step S110. Since it is determined that the frame encoded in step S106 belongs to those in the immediately preceding section, i.e., that frame has large, differences from every frames in the immediately preceding section, it is determined that the frame encoded in step S106 belongs to a next new section, and a setting process of the start and end points of the next section, and a representative frame in this section is executed.

The section setting unit 125 sets the number of the frame encoded in step S106 as the state and end points of a new section in the section memory 27 (step S110). Next, in order to set the frame encoded in step S106 as the representative frame in the newly set section, the number of this frame is stored in the representative frame memory 28 (step S111).

In order to execute the encoding process of the next frame, the flow returns to step S2 to execute subsequent processes.

On the other hand, if the difference R is smaller than the threshold Th in step S109, the flow advances to step S112. A process for adding 1 to the end point currently stored in the section memory 27 so as to include the frame encoded in step S106 in the immediately preceding section is executed (step S112).

Next, the section setting unit 125 calculates differences QN and SN according to equation (1) (step S113). More specifically, when the frame indicated by the updated end point (in this case, the frame encoded in step S106) is the N-th frame, the representative frame determination unit 116 calculates a difference QN in accordance with equation (2) using images from the frame indicated by the current start point value to the (N−1)-th frame, and the image of the N-th frame (in this case, "images from the frame indicated by the current start point value to the (N−1)-th frame" correspond to $X_M(i, j)$, and the "image of the N-th frame" corresponds to $X_N(i, j)$ in equation (2)).

A difference SN between the N-th frame image and image data of the frame set as the current representative frame is calculated according to equation (1).

The representative frame determination unit 118 adds the difference SN and a cumulative difference QD (an initial value of this difference QD is zero) of the differences from the representative frame upon encoding up to the (N−1)-th frame to calculate a new cumulative difference QD' (step S114). The updated QD is represented by QD'.

The cumulative difference QD' is compared with the difference QN (step S115).

As a result of comparison, if the difference QN is smaller than the cumulative difference QD', the flow advances to step S116 to set the N-th frame (i.e., the frame encoded in step S106) as a new representative frame. For this purpose, the frame number (i.e., N) of the N-th frame is set in the representative frame memory 28 (step S116). After that, the value of the difference QN is substituted as the value of the difference QD (step S117).

On the other hand, if the difference QN is equal to or larger than the difference QD', the flow advances from step S115 to step S118. The value of the difference QD' is substituted as the value of the difference QD (step S118).

After either of step S117 or S118, the flow returns to step S2 to encode the next frame, thus repeating the subsequent processes.

With the aforementioned processes, the frame (representative frame) to be referred to as a reference image upon encoding the next frame, and the end point value of the section can be set immediately before encoding of the next frame.

With the above arrangement and a series of selection operations, since the section setting process and representative frame determination process are done using a decoded image, faster motion compensation can be achieved using a frame memory with a smaller memory size than the first embodiment (one frame memory for holding input images can be used in this embodiment although a plurality of frame memories are required in the first embodiment).

Third Embodiment

Figure 5:
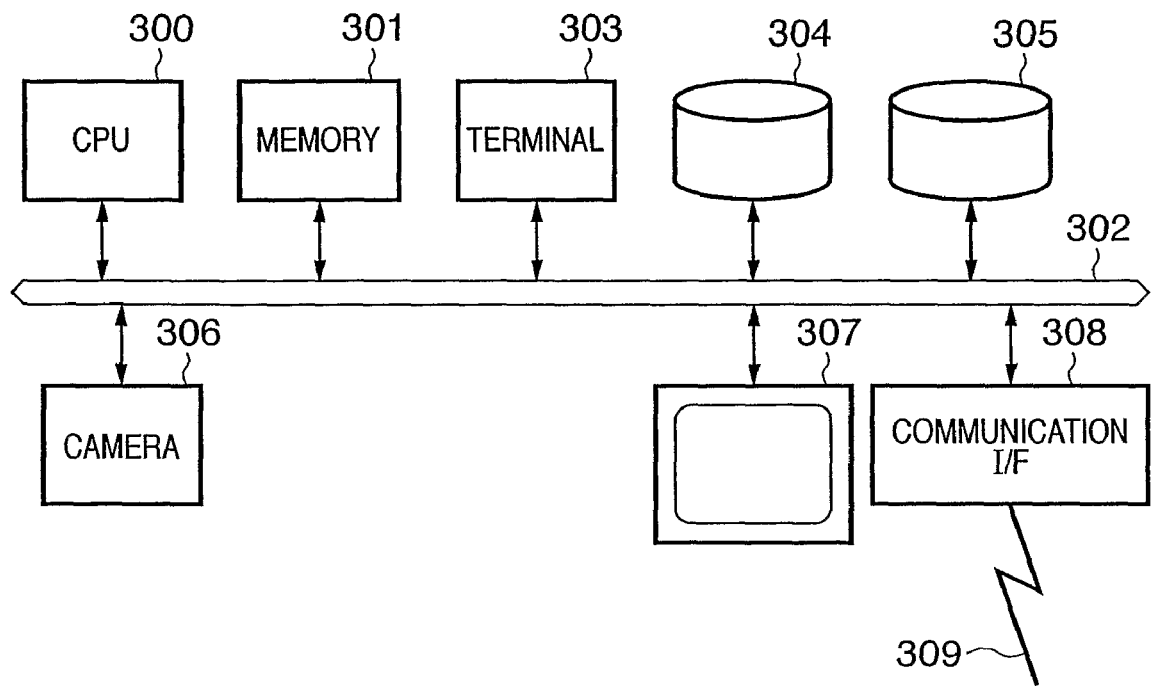
FIG. 5 is a block diagram showing the basic arrangement of a moving image encoding apparatus according to the third embodiment of the present invention.

FIG. 5 is a block diagram showing the basic arrangement of a moving image encoding apparatus according to this embodiment.

Referring to FIG. 5, reference numeral 300 denotes a CPU which controls the overall apparatus using programs and data loaded onto a memory 301 and executes respective processes to be described later. Reference numeral 301 denotes a memory which comprises an area for temporarily storing programs and data loaded from storage devices 304 and 305, and also a work area used when the CPU 300 executes respective processes.

Reference numeral 303 denotes a terminal which is used to input various settings, various instructions, and the like to the moving image encoding apparatus of this embodiment. Reference numeral 304 denotes a storage device which stores software programs for making the CPU 300 execute various processes, and data. Some or all of these software programs are loaded onto the memory 301 under the control of the CPU 300, and are to be processed by the CPU 300.

Reference numeral 305 denotes a storage device for storing moving image stream data. Some or all of such stream data are loaded onto the memory 301 under the control of the CPU 300, and are to be processed by the CPU 300.

In FIG. 5, the storage devices 304 and 305 are independent devices. However, the present invention is not limited to such specific arrangement. For example, a single storage device may store programs and data stored in the storage devices 304 and 305. The storage devices 304 and 305 may be removable storage media. In this case, a device for reading out programs and data recorded on these recording media must be added to the moving image encoding apparatus of this embodiment.

Reference numeral 306 denotes a camera for sensing a moving image. The sensed moving image data (image data of respective frames) is recorded in the storage device 305. Reference numeral 307 denotes a display device which comprises a CRT, liquid crystal display, and displays various images, characters, and the like. Reference numeral 308 denotes a communication I/F (interface). The moving image encoding apparatus of this embodiment makes data communications with external apparatuses via this communication I/F 308 and a network 309 such as a LAN, public network, wireless network, broadcasting wave, or the like.

Reference numeral 302 denotes a communication path which includes a bus and network and interconnects the aforementioned units.

The process for encoding a moving image, which is sensed by the camera 306 and is recorded in the storage device 305, and outputting the encoded result onto the network 309 via the communication I/F 308, which process is done by the moving image encoding apparatus with the above arrangement, will be described below. Note that the H.264 encoding method will be exemplified as the encoding method. However, the present invention is not limited to such specific method, and may be applied to any other encoding methods as long as they encode data with reference to a plurality of frames (i.e.; two or more frames). For the sake of simplicity, only forward prediction will be explained, but the present invention is not limited to this. Furthermore, intra-frame encoding is done at predetermined intervals, and inter-frame encoding is done at other timings.

When an encoding instruction is input using a keyboard or mouse (not shown) of the terminal 303, this instruction is supplied to the CPU 300, which initializes the respective units. The CPU 300 reads out software programs and data such as a software program for making the CPU 300 execute a moving image encoding process (to be described later), a software program for making a communication process (to be described later), and the like from the storage clavicle 305, and loads them onto the memory 301.

Figure 6:
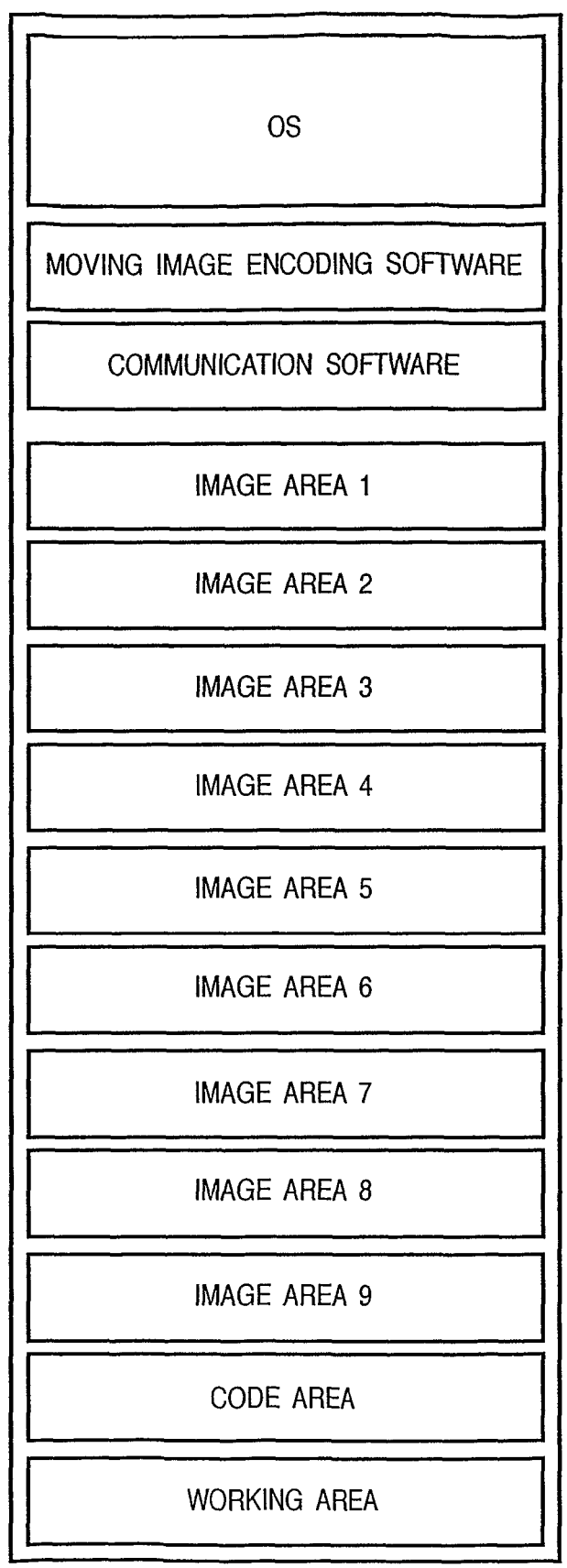
FIG. 6 shows an example of the memory map in a memory 301.

FIG. 6 shows an example of the memory map in the memory 301. As shown in FIG. 6, areas for storing the moving image encoding software and communication software are assured on the memory 301, and an area for storing an OS (operating system) for making the CPU 300 execute processes that control these software programs is also assured. Furthermore, the memory 301 includes image areas (1 to 9; to be described later), a code area, and a working area.

Figure 7:
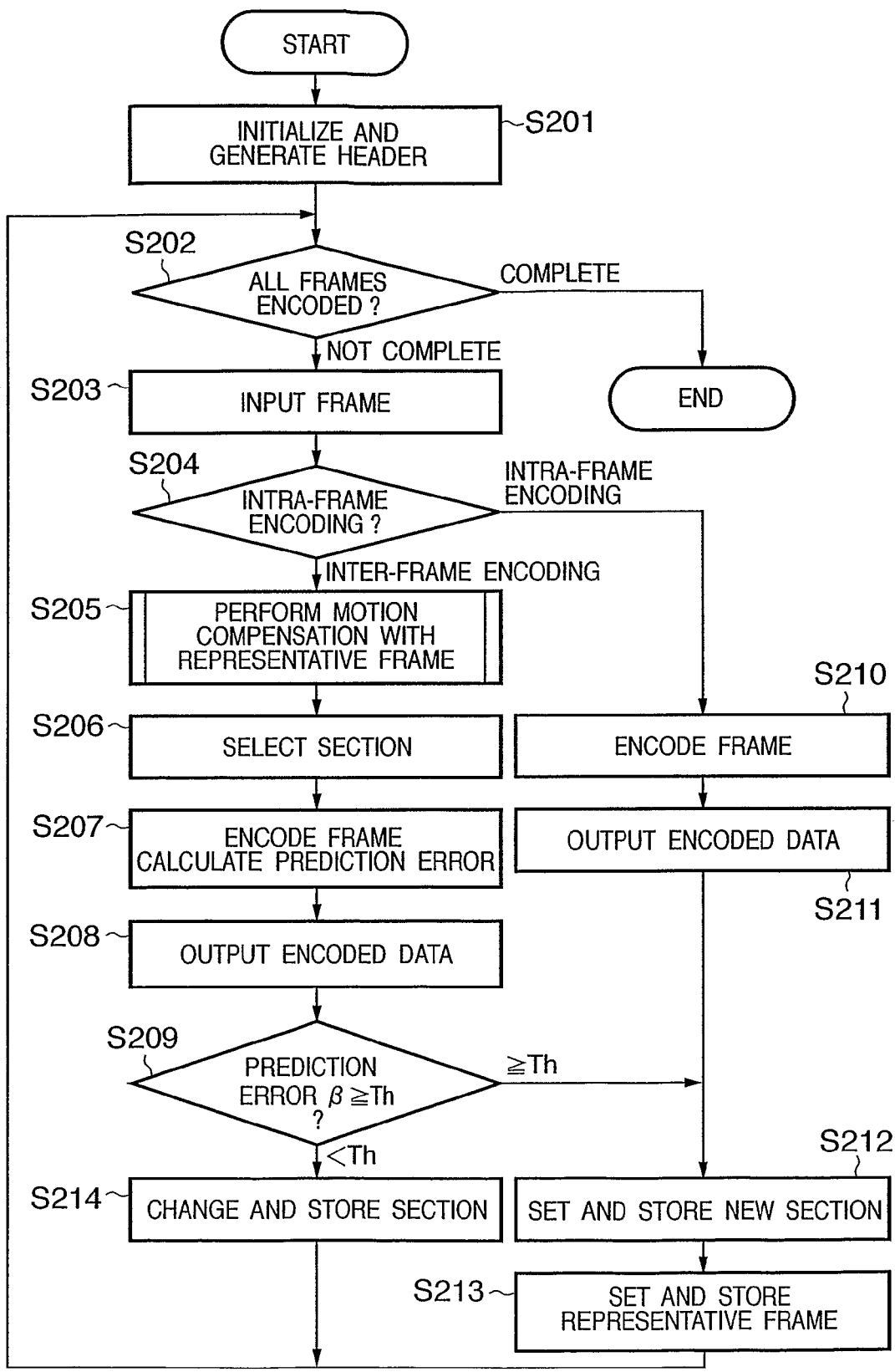
FIG. 7 is a flowchart of a process implemented by a CPU 300 upon executing moving image encoding software and communication software according to the third embodiment of the present invention.

FIG. 7 is a flowchart of the process implemented when the CPU 300 executes these moving image encoding software and communication software.

The CPU 300 clears image areas and code area on the memory 301, generates header information, and stores it on the code area (step S201). At this time, the CPU 300 assures a table area indicating sections on the working area. FIG. 9 shows the contents (configuration example) of this table.

Each record includes a valid flag, section start point value, section end value, and representative frame number. The maximum number of records is equal to the number of image areas for storing reference images. In this embodiment, since image area 1 stores an input image, reference images for eight frames are stored. Let $F(x)$; $S(x)$, $E(x)$, and $D(x)$ be the valid flag, section start point value, section end value, and representative frame number of record x.

Referring back to FIG. 7, it is checked if the encoding process of all frames is complete (step S202). If frames to be encoded still remains, the flow advances to step S203. Data for one frame of the moving image sensed by the camera 306 is read out from the storage device 305, and is stored in one image area on the memory 301 (step S203). If the process in step S203 is the first one, data is stored in image area 1. Note that the data of the frame to be stored includes the frame number of this frame.

If the frame to be encoded is the one which is to undergo intra-frame encoding, the flow advances to step S210; otherwise, the flow advances to step S205. The frame image stored in the image area in step S203 and image data as the representative frame undergo motion compensation (step S205).

If intra-frame encoding is to be made, the CPU 300 performs intra-frame encoding while executing intra-prediction (step S210). By executing the communication software, the CPU 300 outputs encoded data of the code area on the memory 301 to the network 309 via the communication interface 308, and then clears the corresponding portion of the code area on the memory 301 (step S211).

Figure 8:
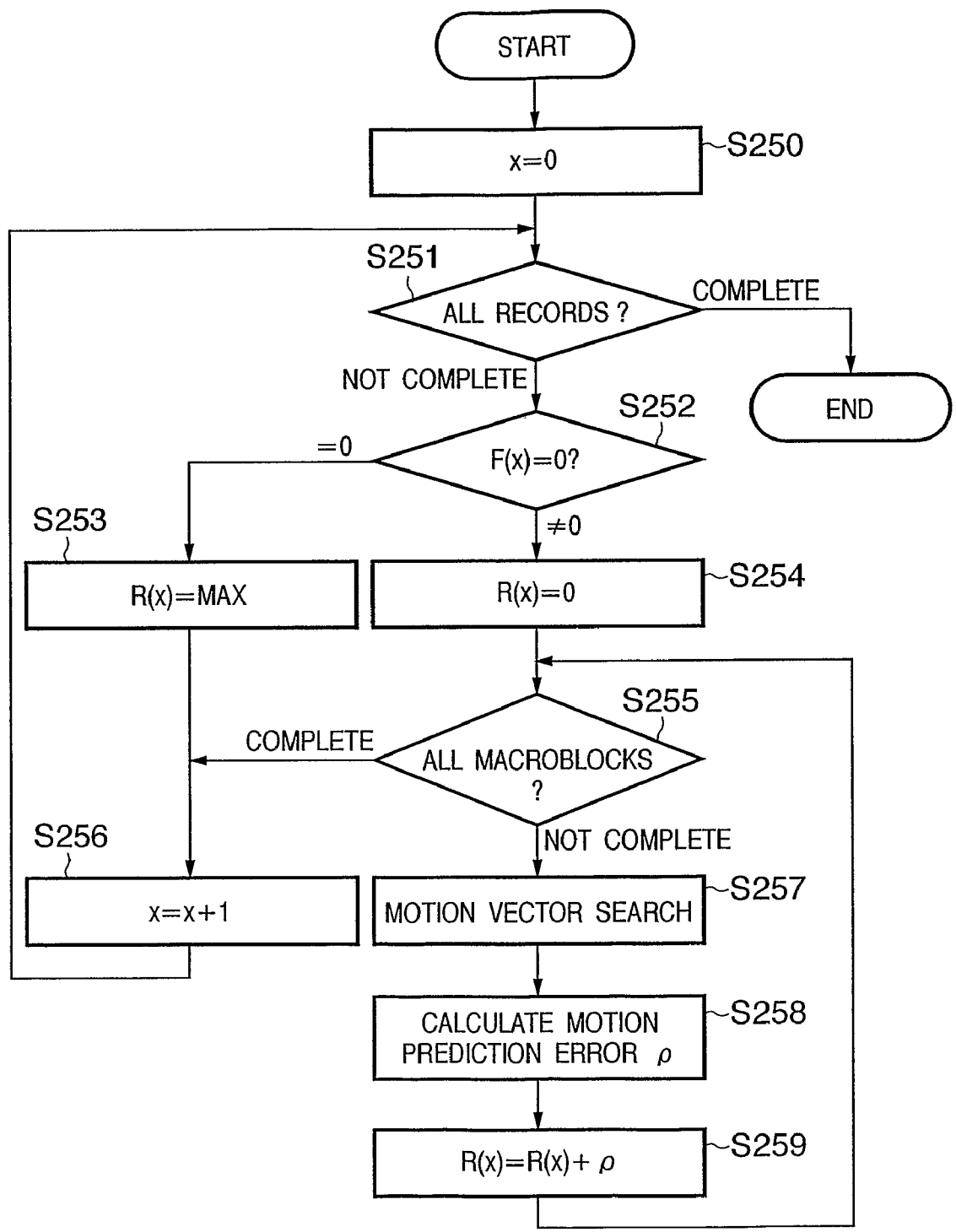
FIG. 8 is a flowchart showing details of the process in step S205.

FIG. 8 is a flowchart showing details of the process in step S205.

Initially, zero is substituted in a variable x used to count the number of records, thus resetting the variable x (step S250). Next, whether or not the motion compensation process for all records is complete is checked by determining whether or not the value of the variable x has reached the maximum number of records (step S251). If the motion compensation process is complete, the flow advances to step S206 in FIG. 7; otherwise, the flow advances to step S252.

If the motion compensation process for all records is not complete yet, it is checked if the valid flag $F(x)$ indicating whether or not valid data is stored in the record x is zero (step S252).

If $F(x)=0$, i.e., if no valid data are stored in the record x (e.g., $F(x)=S(x)=E(x)=D(x)=0$), the flow advances to step S253 to substitute the maximum number MAX in a variable $R(x)$ (step S253). The value of the variable x is incremented by 1 (step S256), and the flow then returns to step S251.

On the other hand, if $F(x)\neq 0$, i.e., if valid data are stored in the record x, the flow advances from step S252 to step S254 to substitute zero in the variable $R(x)$ so as to reset it (step S254). It is then checked if processes in steps S257 to S259 have been done for all macroblocks that form the frame image stored in the image area in step S203 (step S2.55).

If the processes in steps S257 to S259 have been done for all macroblocks that form the frame image stored in the image area in step S203, the flow advances to step S256.

On the other hand, if the processes in steps S257 to S259 have not been done yet for all macroblocks that form the frame image stored in the image area in step S203, the flow advances from step S255 to step S257. A known motion vector search process is executed by reading out frame data of the representative frame number $D(x)$ with reference to the table shown in FIG. 9, and comparing it with the frame image stored in the image area in step S203 (step S257).

Next, a prediction error $\rho$ between the image stored in the image area in step S203 and a predicted image of this image generated based on the motion vector is calculated (step S258). The process for calculating the prediction error is a known technique as in the above embodiments. The calculated prediction error $\rho$ is added to the variable $R(x)$ (step S259). The flow then returns to step S255 to repeat the processes in steps S257 to S259 for all the macroblocks. In this way, the prediction error can be calculated on the basis of the frame image of the representative frame number $D(x)$ and the image stored in the image area in step S203.

By repeating the aforementioned processes for all records with $F(x)\neq 0$, the prediction errors from the predicted image of the image stored in the image area in step S203 can be calculated for respective representative frames.

Referring back to FIG. 7, after the prediction errors from predicted images of images stored in the image area in step S203 are calculated for respective representative frames, the CPU 300 specifies a value (x_m) of the variable x that minimizes the value of the variable R(x) with reference to the values of the variable R(x) for all x (x=0 to 7 in this embodiment). The CPU 300 then reads out data S(x_m) and E(x_m) from the table shown in FIG. 9 to select a section having S(x_m) as the start point value and E(x_m) as the end point value as a section which is to undergo motion compensation (step S206).

The image stored in the image area in step S203 undergoes inter-frame encoding as the known encoding process based on motion compensation with frame images in the section selected in step S206 (step S207). The data of the encoded result is stored in the code area on the memory 301. Also, locally decoded image data is stored in an image area with the oldest frame number. Furthermore, prediction errors calculated upon motion vector search are calculated for respective macroblocks, and their sum total value $\beta$ is calculated.

Next, by executing the communication software, the CPU 300 outputs encoded data of the code area oh the memory 301 to the network 309 via the communication interface 308, and then clears the corresponding portion of the code area on the memory 301 (step S208).

The CPU 300 compares the value $\beta$ calculated in step S207 and a threshold Th stored in a predetermined area on the memory 301 to check if $\beta \geq Th$ (step S209).

If $\beta \geq Th$, the CPU 300 detects a record with the valid flag=0, sets 1 in the valid flag of that record, and stores the encoded frame number in its start and end point values in step S212. If all the valid flags are 1, the CPU 300 compares the start point values of the records, and overwrites data on the record with the smallest (oldest) section. In step S213, the CPU 300 stores the encoded frame number in the representative frame number.

In step S214, the CPU 300 adds 1 to the end point value of the record to which the frame overwritten with the decoded image belongs. Also, the CPU 300 changes the end point value of the latest section (immediately before the encoded frame) to the encoded frame number. The flow then returns to step S202 to process the next frame.

With a series of selection operations, an increase in prediction errors can be suppressed while reducing the number of frames to be referred to and implementing a faster motion compensation process.

Since it is checked based on the motion compensation error calculated upon encoding if the section is to be updated, no new calculations are required, thus minimizing an increase in processing scale.

In this embodiment, the number of frames to be referred to is eight. However, the present invention is not limited to such specific value, and various other numbers of frames to be referred can be supported by assuring the required number of image areas and the like.

The process according to this embodiment may be implemented using dedicated hardware as in the first and second embodiments.

In this embodiment, the encoded result is externally output via the communication interface 308. However, the present invention is not limited to this. For example, the encoded result may be stored in the storage device 305.

In this embodiment, image data sensed by the camera 306 is temporarily recorded in the storage device 305. However, the present invention is not limited to this. For example, the sensed image data may be directly stored in the image areas on the memory 301.

Fourth Embodiment

An encoding process different from the third embodiment will be described hereinafter.

Figure 10:
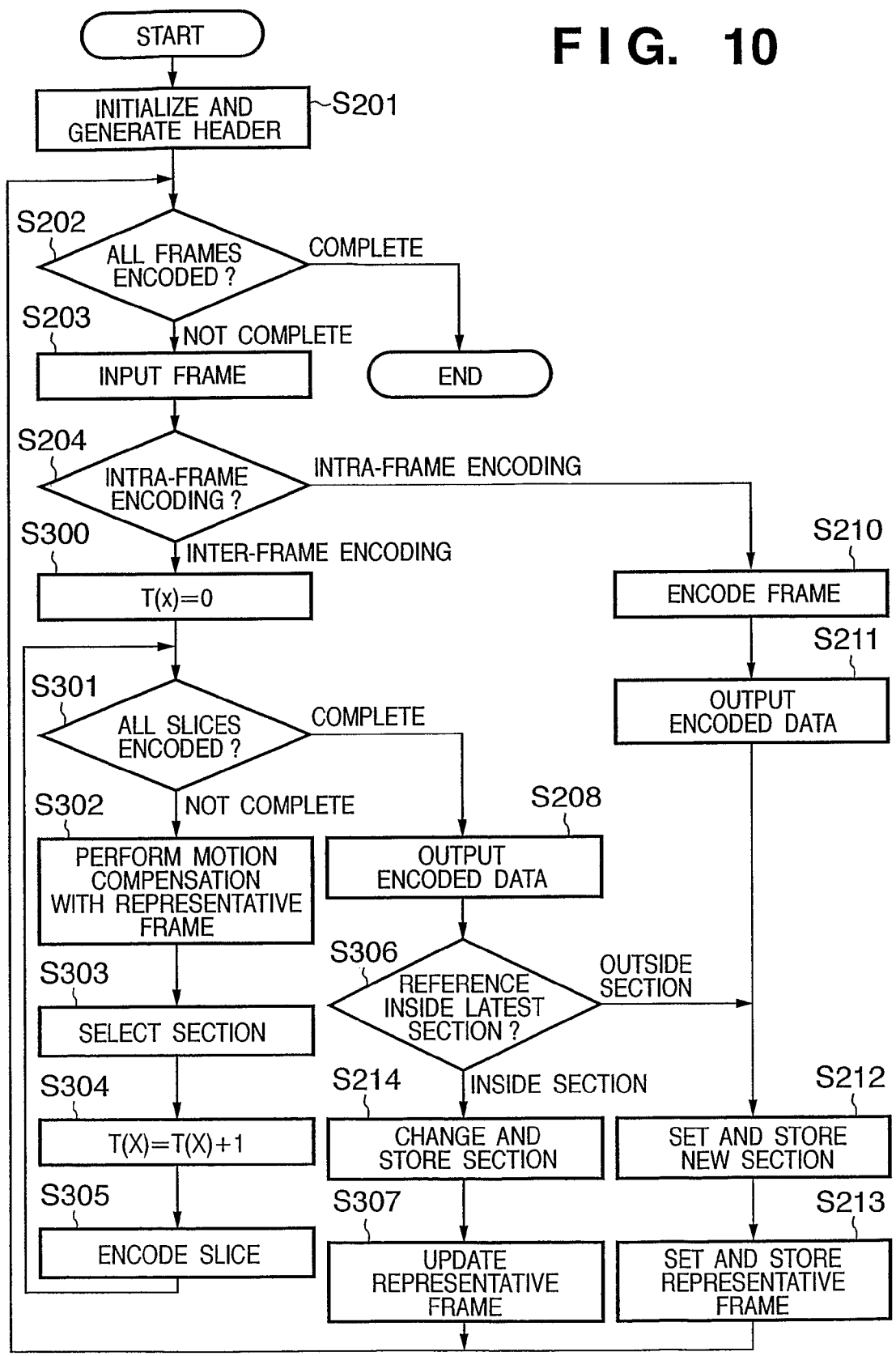
FIG. 10 is a flowchart of a moving image encoding process according to the fourth embodiment of the present invention.
Figure 11:
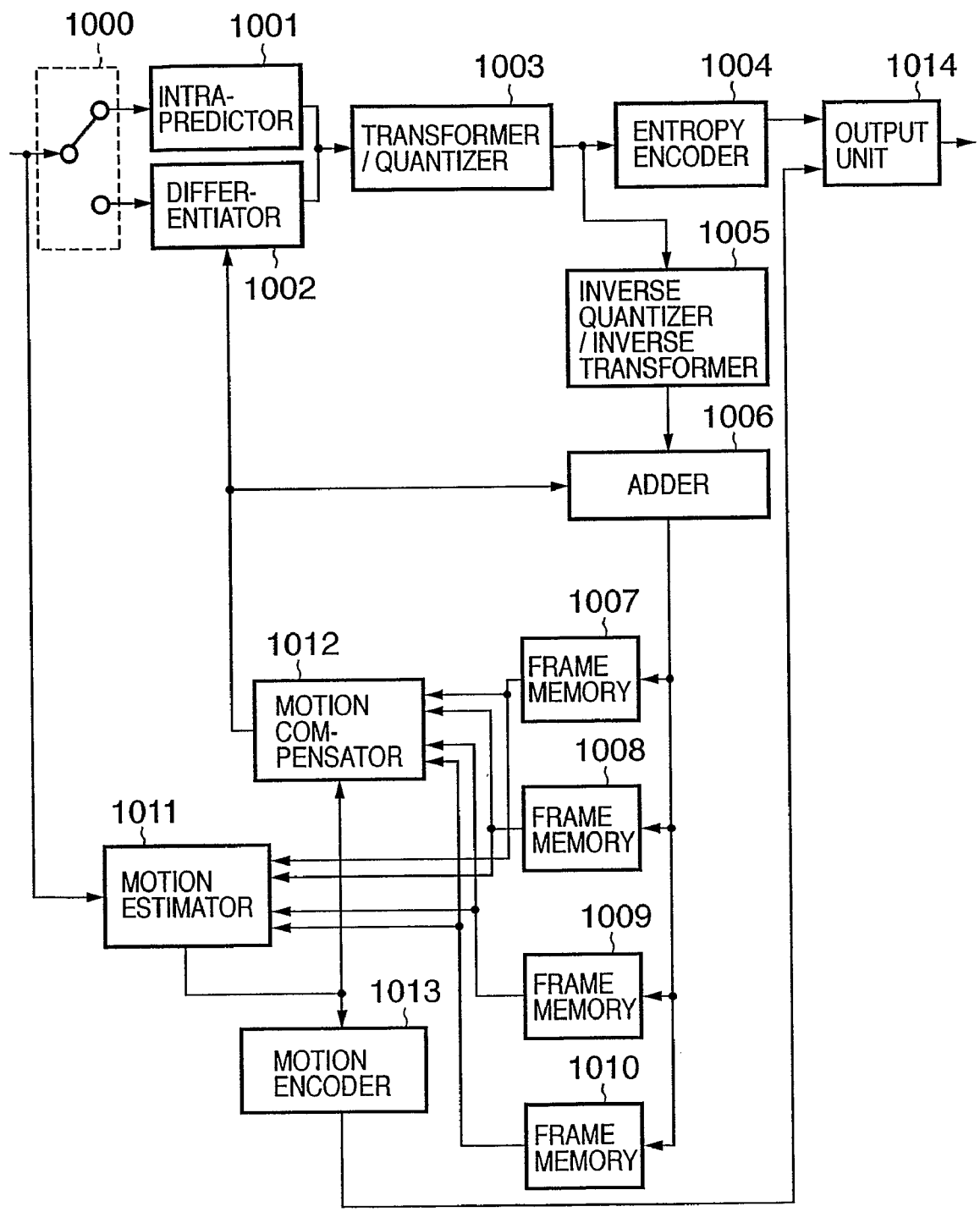
FIG. 11 is a block diagram showing the arrangement of an H.264 encoder.

FIG. 10 is a flowchart showing a moving image encoding process according to this embodiment. Note that a moving image encoding apparatus according to this embodiment comprises the same arrangement as that of the third embodiment. Hence, the CPU 300 executes the process according to the flowchart shown in FIG. 10.

Also, the same step numbers in FIG. 10 are assigned to the same processing steps as those in FIG. 7, and a description thereof will be omitted.

If inter-frame encoding is made, the CPU 300 substitutes zero in a variable T(x) used to record a reference count of a section so as to reset it (step S300). It is then checked if the encoding process of all slices is complete (step S301). If slices to be encoded still remain, the flow advances to step S302. The CPU 300 executes the process according to the flowchart shown in FIG. 8 for respective slices to calculate the values of the variable R(x) (step S302).

As in step S206, the CPU 300 sets a section (for respective slices in this embodiment) (step S303). The CPU 300 increments the value of the variable T(x) indicating the reference count to the set section by 1 (step S304). At this time, the value of the variable x is that of the record x which stores the section (start and end point values) set in step S303.

The CPU 300 executes an encoding process of the slice to be encoded by the same process as in the above embodiment (step S305).

On the other hand, if the encoding process for all slices is complete, the flow advances to step S208, and the CPU 300 outputs encoded data (step S208) as in the third embodiment. The CPU 300 checks with reference to the values of the variable T(x) and variable x if the value of the variable x that maximizes the value of the variable T(x) is a maximum value (step S306). That is, it is checked if the section which was referred to most frequently is the latest section.

If the section which was referred to most frequently is not the latest section, the flow advances to step S212 to execute the processes in steps S212 and S213 as in the third embodiment.

On the other hand, if the section which was referred to most frequently is the latest section, the flow advances to step S214. The CPU 300 executes a section update process as in the third embodiment (step S214), and updates the representative frame of the updated section (step S307).

The process in step S307 will be described in more detail below. The start point value S(x) and end point value E(x) are read out from the record of the updated section. The representative frame number D(x) of the new section is calculated and updated by:

$$D(x)=(S(x)+E(x))/2 \quad (3)$$

With a series of selection operations, an increase in prediction errors can be suppressed while reducing the number of frames to be referred to and implementing a faster motion compensation process.

Since the representative frame is updated together with the update process of the section, an optimal representative frame can always be selected. Since the central frame of the section is selected as the representative frame, the representative frame can temporally represent the section more satisfactorily.

The central frame of the section is selected as the representative frame. However, the present invention is not limited to this. For example, two frames at the start and end points of the section may be selected, and a plurality of frames may be selected in the section.

In this embodiment, the number of frames to be referred to is eight. However, the present invention is not limited to such specific value, and various other numbers of frames to be referred can be supported by assuring the required number of image areas and the like.

Fifth Embodiment

Figure 12:
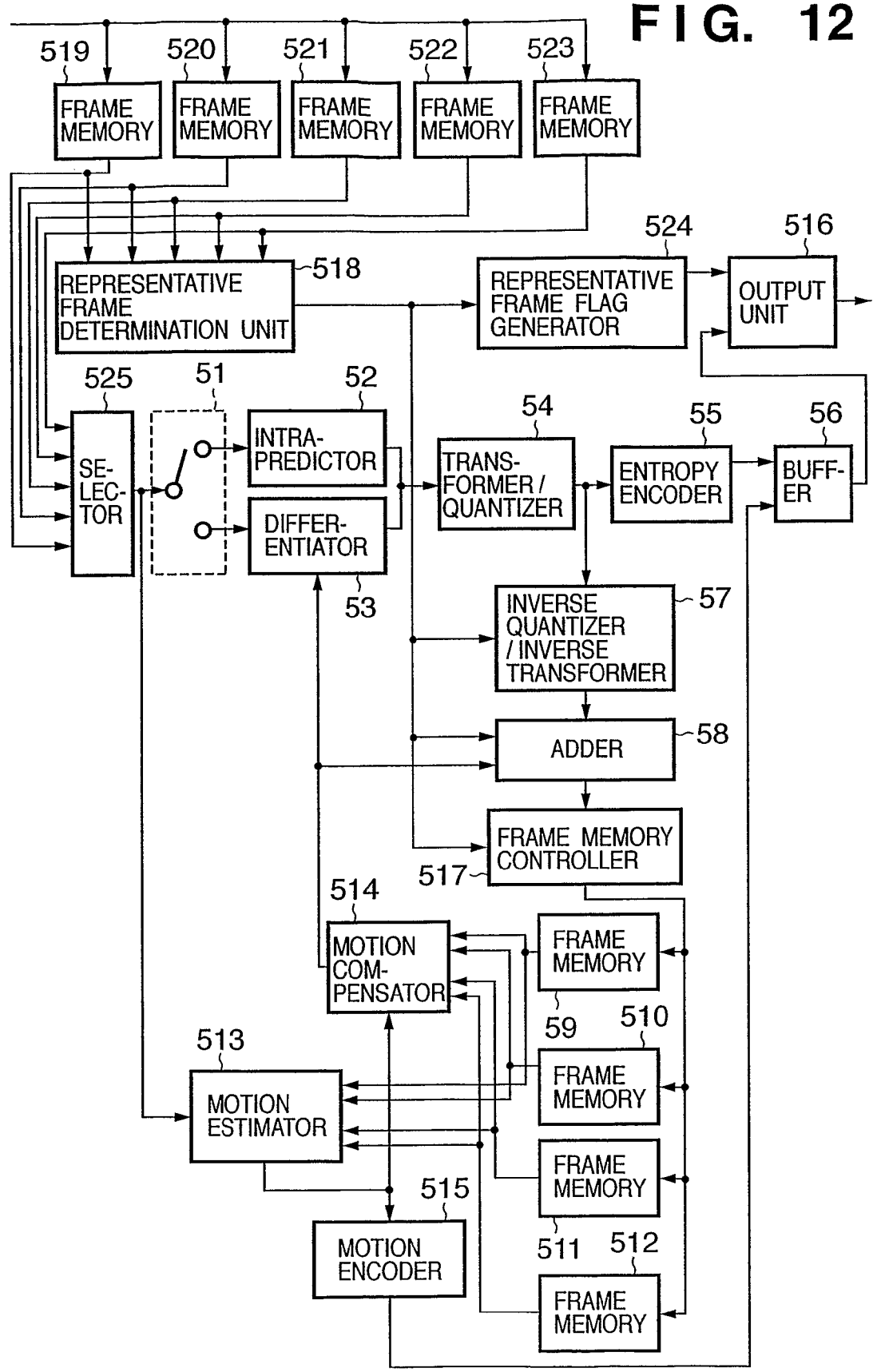
FIG. 12 is a block diagram showing the arrangement of a moving image encoding apparatus according to the fifth embodiment of the present invention.

FIG. 12 is a block diagram showing the arrangement of a moving image encoding apparatus according to this embodiment. In this embodiment, a description will be given based on the H.264 encoding method. However, the present invention is not limited to such specific method. For the sake of simplicity, forward prediction that refers to previous frames will be exemplified. However, the present invention is not limited to this, and can also be applied to two-way prediction. Also, for the sake of simplicity, the number of reference frames is 3. However, the present invention is not limited to this.

Referring to FIG. 12, reference numerals 519 to 523 denote frame memories for storing images of frames (input images) which form a moving image.

Reference numeral 525 denotes a selector which selects an input source and outputs data. Reference numeral 51 denotes a selector which selects an output destination in accordance with an intra-frame encoding/inter-frame encoding mode; 52, an intra-predictor which performs intra-prediction based on the H.264 encoding method; and 53, a differentiator for obtaining motion prediction errors.

Reference numeral 54 denotes a transformer/quantizer which performs integer orthogonal transformation, and quantizes input coefficients; and 57, an inverse quantizer/inverse transformer which performs the reverse process of the transformer/quantizer 54. Reference numeral 58 denotes an adder which adds motion prediction errors. Reference numeral 55 denotes an entropy encoder which encodes the quantization result; and 56, a buffer which stores generated codes for a plurality of frames.

Reference numerals 59, 510, 511, and 512 denote frame memories each of which stores locally decoded image data and the frame number for each frame. Reference numeral 513 denotes a motion estimator which extracts an optimal motion vector from the corresponding frame of an input image and decoded image data; and 514, a motion compensator which generates a predicted image on the basis of the motion vector calculated by the motion estimator 513 and information of the corresponding frame.

Reference numeral 515 denotes a motion encoder which encodes motion information on the basis of the calculated motion vector and information of the corresponding frame. Reference numeral 517 denotes a frame memory controller which controls inputs/outputs of the frame memories 59 to 512; and 516, an output unit which combines and outputs encoded data and reference information stored in the buffer 56. Reference numeral 518 denotes a representative frame determination unit which determines a representative frame by comparing input images. Reference numeral 524 denotes a representative frame flag generator for outputting the frame number of the representative frame to the output unit 516 when the representative frame determination unit 518 determines the representative frame.

The moving image encoding process to be executed by the moving image encoding apparatus with the above arrangement will be described below.

Prior to encoding, the representative frame flag generator 524 generates a code indicating that encoded data of interest adopts a method that refers to a representative frame, and outputs that code to the output unit 516. This code is encoded as user data to maintain compatibility to the H.264 encoding method. However, the present invention is not limited to this, and such information may be embedded as a digital watermark.

Furthermore, the output unit 516 generates and outputs header information which represents the maximum number of frames that can be used in reference. At this time, the number of frames that can be used in reference is 3. Also, the frame memories are reset to zero.

Image data of frames input to the apparatus of this embodiment are stored in turn in the frame memories 519 to 523. Since the number of frame memories used to store input images in the moving image encoding apparatus according to this embodiment is five, the number of input images that can be stored at the same time is five. However, since the number of frame memories used to store input images is not limited to this, the number of input images that can be stored at the same time is not limited to this, either.

After the input images are stored in the frame memories 519 to 523, the representative frame determination unit 518 calculates inter-frame differences R. For the sake of simplicity, the sum total of the absolute values of pixel values between positionally corresponding pixels of respective images is used as the difference R as in the first embodiment.

More specifically, let $X_N(i, j)$ (i and j indicate the position of a pixel in an image $X_N$) be the pixel value of the N-th frame stored in the frame memory 519, $X_{N+1}(i, j)$ be the pixel value of the (N+1)-th frame stored in the frame memory 520, $X_{N+2}(i, j)$ be the pixel value of the (N+2)-th frame stored in the frame memory 521, $X_{n+3}(i, j)$ be the pixel value of the (N+3)-th frame stored in the frame memory 522, and $X_{N+4}(i, j)$ be the pixel value of the (N+4)-th frame stored in the frame memory 523.

At this time, a difference $R_N$ between the N-th frame and the remaining frames ((N+1)-th to (N+4)-th frames) is calculated by:

$$R_N = \Sigma\Sigma(|X_N(i, j) - X_{(N+1)}(i, j)|) + \Sigma\Sigma(|X_N(i, j) - X_{(N+2)}(i, j)|) + \quad (4)$$
$$\Sigma\Sigma(|X_N(i, j) - X_{(N+3)}(i, j)|) + \Sigma\Sigma(|X_N(i, j) - X_{(N+4)}(i, j)|)$$

where "ΣΣ" indicates addition for all i and j.

Likewise, a difference $R_{(N+1)}$ between the (N+1)-th frame and the remaining frames is calculated by:

$$R_{N+1} = \Sigma\Sigma(|X_{N+1}(i, j) - X_N(i, j)|) + \Sigma\Sigma(|X_{N+1}(i, j) - X_{(N+2)}(i, j)|) + \quad (5)$$
$$\Sigma\Sigma(|X_{N+1}(i, j) - X_{(N+3)}(i, j)|) + \Sigma\Sigma(|X_{N+1}(i, j) - X_{(N+4)}(i, j)|)$$

Similarly, differences $R_{(N+2)}$, $R_{(N+3)}$, and $R_{(N+4)}$ are calculated.

The representative frame determination unit 518 refers to these differences $R_N$ to $R_{(N+4)}$ and selects a frame with a smallest difference as a representative frame. For example, if $R_{(N+2)}$ of the differences $R_N$ to $R_{(N+4)}$ is smallest, the (N+2)-th frame is selected as a representative frame.

The representative frame determination unit 518 holds the frame number of the frame with a smallest difference.

Next, the selector 525 reads out frame data in the frame memories 519 to 523 in turn, and inputs them to the selector 51. The selector 51 selects the intra-predictor 52 as an output so as to intra-frame encode frames at predetermined intervals (e.g., every 15 frames). Otherwise, the selector 1 selects the differentiator 53 as an output so a to perform inter-frame encoding. When the intra-predictor 52 is selected, input frame data undergoes prediction for respective blocks.

On the other hand, when the differentiator 53 is selected, each input image data is input to the motion estimator 513 for respective macroblocks.

The motion estimator 513, motion compensator 514, and motion encoder 515 perform the same processes as those of the motion estimator 13, motion compensator 14, and motion encoder 15 shown in FIG. 1 to attain an encoding process based on motion compensation for these five frames. Note that an image to be referred to upon making motion compensation for these five frames is generated as follows.

More specifically, predicted images of data of the respective representative frames held in the frame memories 59 to 512 to the frame to be encoded are generated, errors (prediction errors) between the predicted images of the representative frames and the image of the frame to be encoded are calculated, and the representative frame with a smallest prediction error from the frame to be encoded is selected as a reference image.

As a characteristic feature of this embodiment, even when data for only five frames are encoded at the same time, since the images of the representative frames are stored in the frame memories 59 to 512 upon encoding data for five frames later, this process is equivalent to a process for encoding five or more frames at the same time.

Upon detection of a representative frame of frame data to be read out from the frame memories 519 to 523 on the basis of the held representative frame number, the representative frame determination unit 518 outputs that frame number to the representative frame flag generator 524. The representative frame flag generator 524 outputs this frame number to the output unit 516. Note that the representative frame flag generator 524 holds the notified latest frame number, and outputs the currently held frame number until it receives a new number. Note that, the present invention is not limited to the frame number as long as the representative frame can be specified.

Finally, the output unit 516 appends "the frame number of the representative frame" from the representative frame flag generator 524 to encoded data for five frames stored in the buffer 56 and externally outputs these data. Note that the present invention is not limited to the frame number as long as the representative frame can be specified.

Since the intra-predictor 52 or differentiator 53 outputs the prediction error for the frame data of interest, the prediction error is supplied to the adder 58 via the transformer/quantizer 54 and inverse quantizer/inverse transformer 57, and is added to a "predicted image corresponding to the frame data of interest" input from the motion compensator 514 (to be described later) by the adder 58. For example, when the prediction error is output from the differentiator 53, it is a difference between the frame data of interest input from the selector 525 and the predicted image corresponding to this frame data of interest, the adder 58 adds this difference to "the predicted image corresponding to the frame data of interest" input from the motion compensator 514, thus reclaiming the frame data of interest. The frame memory controller 517 controls the frame memories 59 to 512 to store the reclaimed frame data when the representative frame determination unit 518 determines a representative frame.

Figure 13:
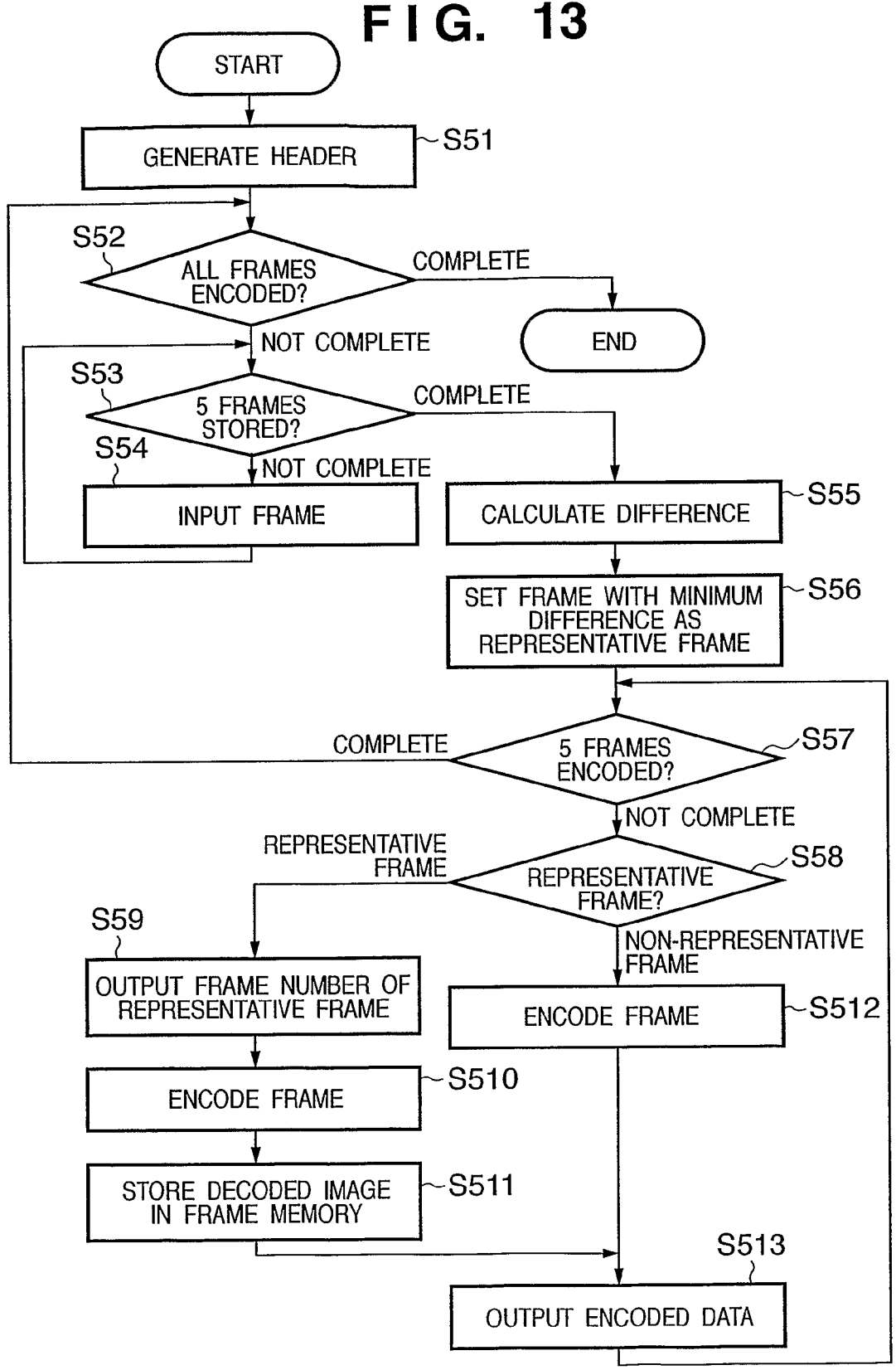
FIG. 13 is a flowchart of an encoding process according to the fifth embodiment of the present invention.

FIG. 13 is a flowchart of the aforementioned encoding process according to the present invention.

The output unit 516 generates and outputs header information including information indicating that the encoding method to be executed below uses a representative frame, and information indicating the maximum number of frames to be referred to (step S51).

If the following encoding process has not been executed for all frames to be encoded (step S52), the flow advances to step S53 to execute the subsequent processes. The representative frame determination unit 518 waits for its process until frame data are stored in the frame memories 519 to 523 (i.e., frame data for five frames are prepared in the frame memories 519 to 523) (step S53). During this interval, the each of frame memories 519 to 523 stores frame data for one frame (step S54).

After frame data are stored in the frame memories 519 to 523 (i.e., frame data for five frames are prepared in the frame memories 519 to 523), the flow advances to step S55. The representative frame determination unit 518 calculates differences $R_N$ for respective five frames (step S55). Of five differences, a frame with a smallest difference is determined as a representative frame (step S56). In this case, the representative frame determination unit 518 outputs the frame number of the representative frame to the representative frame flag generator 524.

In the subsequent processes, these five frame data are encoded.

It is checked if the encoding process for all the five frames is complete (step S57). If the encoding process is complete, the flow returns to step S52 to repeat the subsequent processes. On the other hand, if the encoding process for all the five frames is not complete yet, the flow advances to step S58 to check if the frame to be encoded is the representative frame.

Whether or not the frame to be encoded is the representative frame can be determined by checking if the frame number of the frame to be encoded matches that obtained by the representative frame determination unit 518 (if these numbers match, it is determined that the frame to be encoded is the representative frame). Hence, this determination process is executed (step S58). If the frame to be encoded is the representative frame, the flow advances to step S59, and the representative frame flag generator 524 outputs the frame number of the representative frame to the output unit 516 (step S59). Then, the encoding process based on motion compensation is applied to the frame to be encoded. This encoding process is the same as that in the first embodiment, as described above (step s510).

The encoded image of the representative frame is decoded as in the first embodiment, and the decoded image is stored in a frame memory that stores the frame of the oldest frame number of the frame memories 59 to 512 (step S511).

On the other hand, if the frame to be encoded is not the representative frame, the flow advances from step S58 to step S512 to execute the same encoding process as in step S510 (step S512).

With the above process, after the buffer 56 stores the encoded data for five frames, the output unit 516 appends "the frame number of the representative frame" obtained from the representative frame flag generator 524 to the encoded data of these frames from the buffer 56, and externally outputs these data (step S513).

With a series of selection operations described above, frames for a long period of time can be referred to using a fewer number of frames, and the memory size can be suppressed upon encoding. Since a frame having a higher similarity to other frames is selected as the representative frame, the encoding efficiency can be improved.

Since user data or the like, which can be ignored upon decoding, is selected as the encoded data of the representative frame, the compatibility to existing H.264 can be maintained.

In this embodiment, an object to be referred to is a frame. However, the present invention is not limited to this, and units (e.g., slices) obtained by dividing a frame may be used.

Intra-frame encoding may be used as the encoding method of the representative frame. In this case, since a frame with high image quality is used as reference image data, the image quality can be improved.

Sixth Embodiment

This embodiment will explain a decoding apparatus which decodes the encoded result output from the moving image encoding apparatus according to the fifth embodiment.

Figure 14:
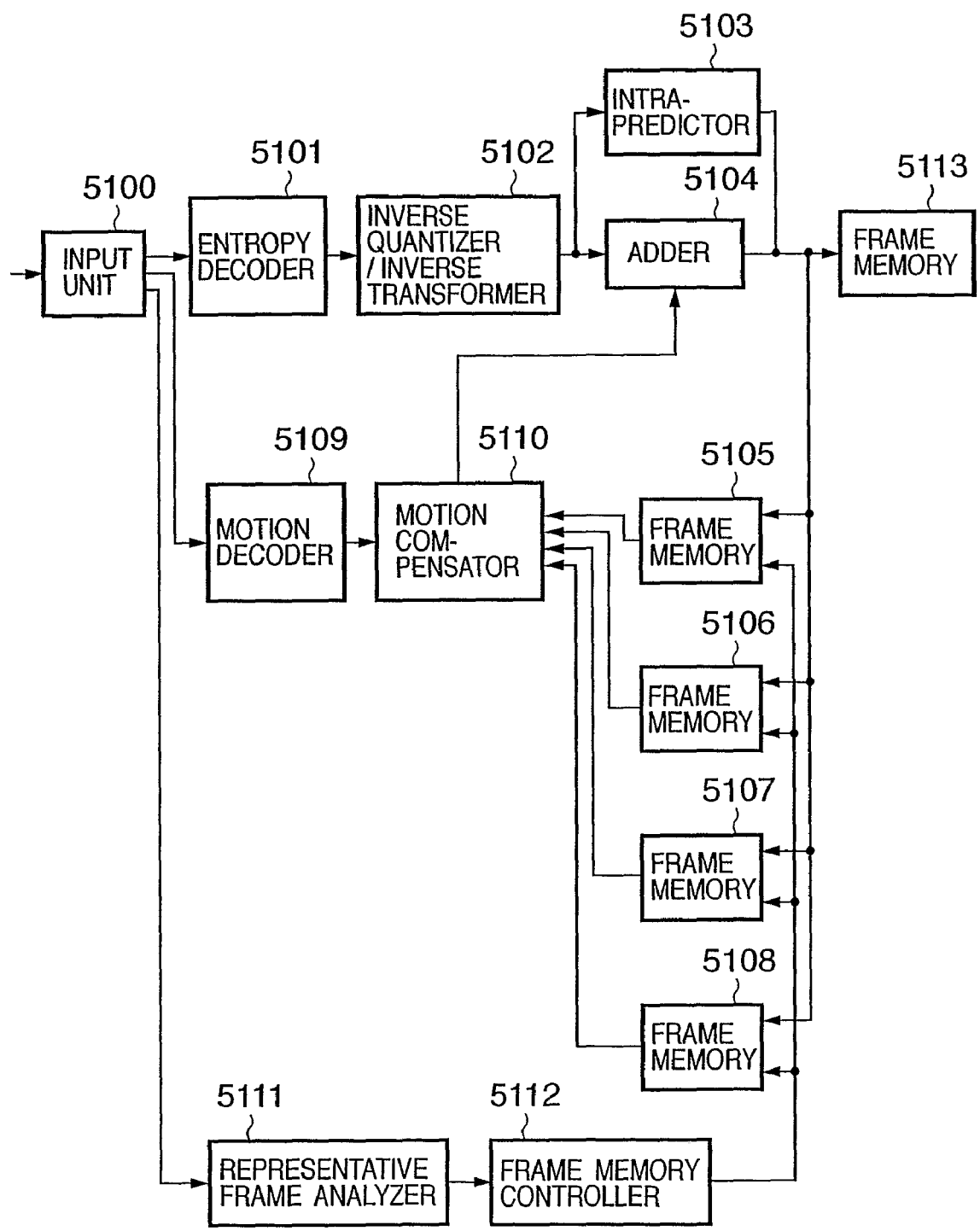
FIG. 14 is a block diagram showing the arrangement of a decoding apparatus according to the sixth embodiment of the present invention.

FIG. 14 is a block diagram showing the arrangement of a decoding apparatus according to this embodiment.

Reference numeral 5100 denotes an input unit which receives encoded data, and separately outputs it. This encoded data is appended with the frame number of the representative frame, as, described in the fifth embodiment.

Reference numeral 5101 denotes an entropy decoder which decodes encoded data to obtain a quantization result. Reference numeral 5102 denotes an inverse quantizer/inverse transformer which inversely quantizes the quantization result and computes the inverse transforms of integer orthogonal transformation. Reference numeral 5103 denotes an intra-predictor which performs intra-prediction based on the H.264 encoding method; and 5104, an adder which adds the motion prediction errors from the inverse quantizer/inverse transformer 5102 to predicted images from a motion compensator 5110. Reference numeral 5113 denotes a frame memory for temporarily storing a decoded image.

Reference numerals 5105, 5106, 5107, and 5108 denote frame memories each of which stores decoded image data and its frame number for each frame. In this embodiment, the number of frame memories is four so as to decode the encoded result output from the moving image encoding apparatus according to the fifth embodiment. However, the present invention is not limited to such specific value.

Reference numeral 5109 denotes a motion decoder which decodes a motion vector and corresponding frame information; and 5110, a motion compensator which generates a predicted image on the basis of the motion vector and corresponding frame information decoded by the motion decoder 5109. Reference numeral 5111 denotes a representative frame analyzer which notifies a frame memory controller 5112 of "the frame number of the representative frame" with reference to "the frame number of the representative frame" appended to the encoded data received by the input unit 5100; and 5112, a frame memory controller which controls inputs/outputs of the frame memories 5105 to 5108.

The decoding process to be executed by the decoding apparatus with the above arrangement according to this embodiment will be described below.

The input unit 5100 receives header information which includes the number of frames that can be used in code reference as the method that refers to the representative frame, and the like, interprets the header information, and initializes the respective units.

The input unit 5100 loads encoded data (appended with the frame number of the representative frame of each frame) of each frame, and outputs data of "the frame number of the representative frame" appended to this encoded data to the representative frame analyzer 5111.

The input unit 5100 outputs encoded data associated with a motion vector in this encoded data to the motion decoder 5109, and encoded data associated with an image to the entropy decoder 5101.

If the encoding mode of the frame is intra-frame encoding, the entropy decoder 5101 decodes input encoded data to reconstruct a quantization result. The inverse quantizer/inverse transformer 5102 inversely quantizes the quantization result and computes the inverse transforms of integer orthogonal transformation, thus reconstructing image data.

The reconstructed image undergoes prediction for respective blocks in the intra-predictor 5103 to obtain a decoded image. The decoded image is output to the frame memory 5113.

When the intra-predictor 5103 or adder 5104 outputs decoded data (i.e., a decoded image of the representative frame) with the same frame number as that notified from the representative frame analyzer 5111, the frame memory controller 5112 stores this decoded image data in a frame memory which stores the frame of the oldest frame number of the frame memories 5105 to 5108.

Note that when the decoded image output from the intra-predictor 5103 or adder 5104 is not a decoded image of the representative frame, the frame memory controller 5112 does not store the decoded image in the frame memories 5105 to 5108.

The decoded image data stored in the frame memory 5113 is externally output at predetermined timings (e.g.; for every predetermined number of frames or at predetermined time intervals).

On the other hand, if the frame encoding mode is inter-frame encoding, the motion decoder 5109 decodes a motion vector and reference frame information. The motion compensator 5110 calculates prediction errors with reference to the frame memories 5105 to 5108 accordingly, and outputs them to the adder 5104. The entropy decoder 5101 decodes input encoded data to reconstruct a quantization result. The inverse quantizer/inverse transformer 5102 inversely quantizes the quantization result and computes the inverse transforms of integer orthogonal transformation, thus reconstructing prediction errors. The reconstructed prediction errors are added for respective blocks by the adder 5104 to obtain a reconstructed image, which is stored in the frame memory 5113. In this case, no write access is made to the frame memories 5105 to 5108. Finally, the image data stored in the frame memory 5113 is externally output.

That is, the decoding process is a known process for decoding the encoded result of the encoding process based on motion compensation, except for the process for storing the decoded image of the representative frame in each of the frame memories 5105 to 5108, and the image to be referred to which is that of the representative frame.

Figure 15:
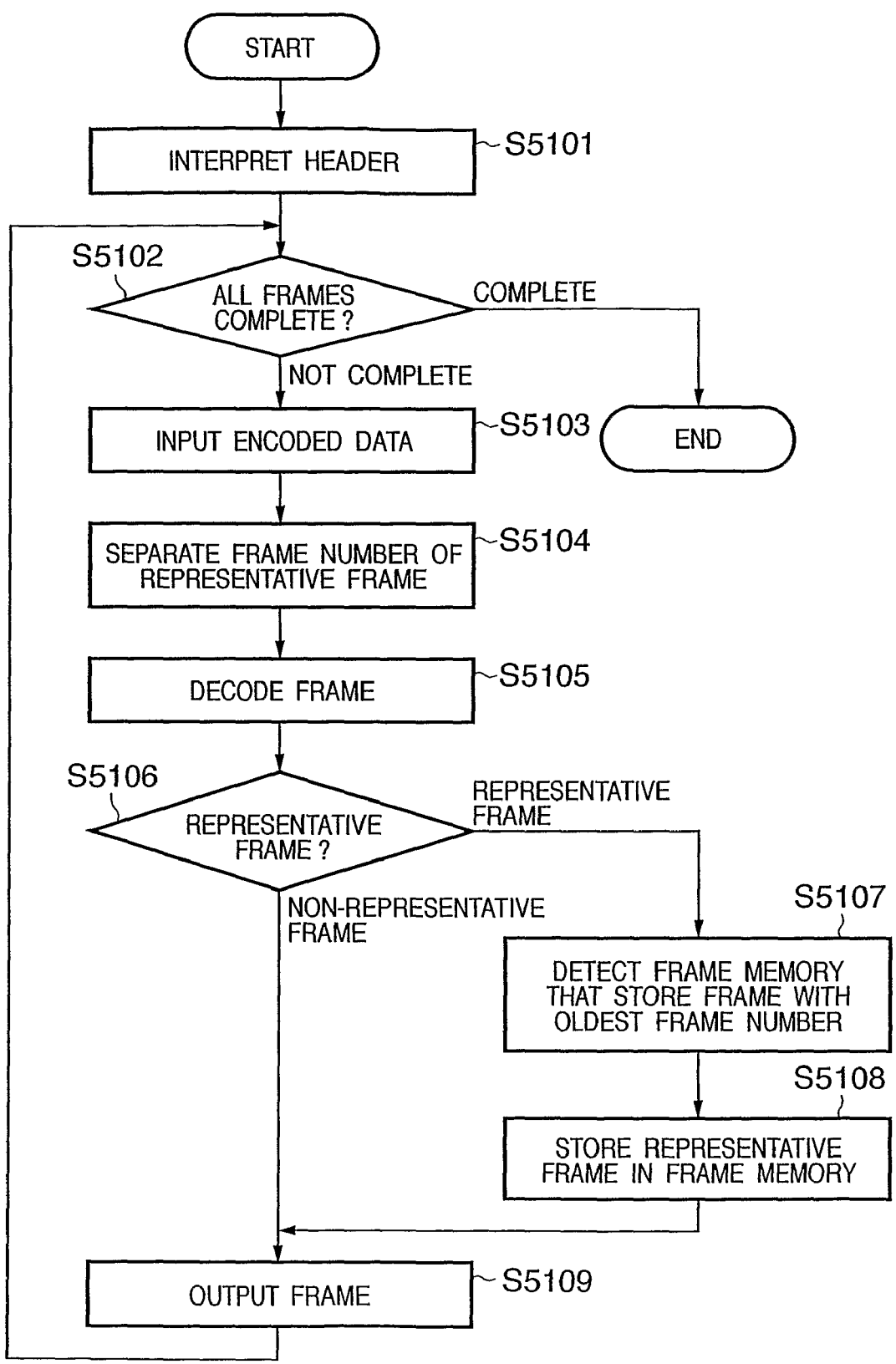
FIG. 15 is a flowchart of a decoding process according to the sixth embodiment of the present invention.

FIG. 15 is a flowchart of the aforementioned decoding process according to this embodiment.

The input unit 5100 refers to and analyzes the header information input prior to encoded data (step S5101). Especially, the unit 5100 analyzes and holds the number of frames that can be referred to.

It is checked if the decoding process for all frames is complete (step S5102). If frames to be decoded still remain, the flow advances to step S5103. The input unit 5100 inputs encoded data of each frame (step S5103). The input unit 5100 separates the frame number of the representative frame of this frame, which is appended to this encoded data, from the encoded data, and inputs it to the representative frame analyzer 5111. The representative frame analyzer 5111 outputs data of this frame number to the frame memory controller 5112 (step S5104).

The motion decoder 5109, motion compensator 5110, entropy decoder 5101, inverse quantizer/inverse transformer 5102, and intra-predictor 5103 or adder 5104 decode the input encoded data according to the decoding method of the H.264 encoding method (step S5105). Data of the decoded result, i.e., decoded image data is output to the frame memory 5113.

The frame memory controller 5112 is notified of the frame number of the representative frame of the currently decoded frame in step S5104. Hence, the frame memory controller 5112 can determine with reference to the frame number of the currently decoded frame whether or not the currently decoded frame is the representative frame.

With this determination process, if the currently decoded frame is the representative frame, the flow advances to step S5107. A frame memory that stores the frame of the oldest frame number of the frame memories 5105 to 5108 is specified (step S5107), and the decoded data image data of the decoded representative frame is stored in the specified frame memory (step S5108).

Then, the decoded image data output to the frame memory 5113 is externally output (step S5109).

With a series of selection operations described above, only encoded data of the representative frame can be referred to upon motion compensation, and the memory size that stores the reference image can be reduced.

The decoding apparatus according to this embodiment is implemented by hardware having the arrangement shown in FIG. 14. However, the present invention is not limited to this. For example, the functions of the respective units shown in FIG. 14 are implemented by software, and a program of this software is installed in a computer such as a PC (personal computer), WS (workstation), or the like. When a CPU of this computer executes this program, the computer executes the aforementioned decoding process. Hence, in this case, this computer can serve as the decoding apparatus according to this embodiment.

Seventh Embodiment

Figure 16:
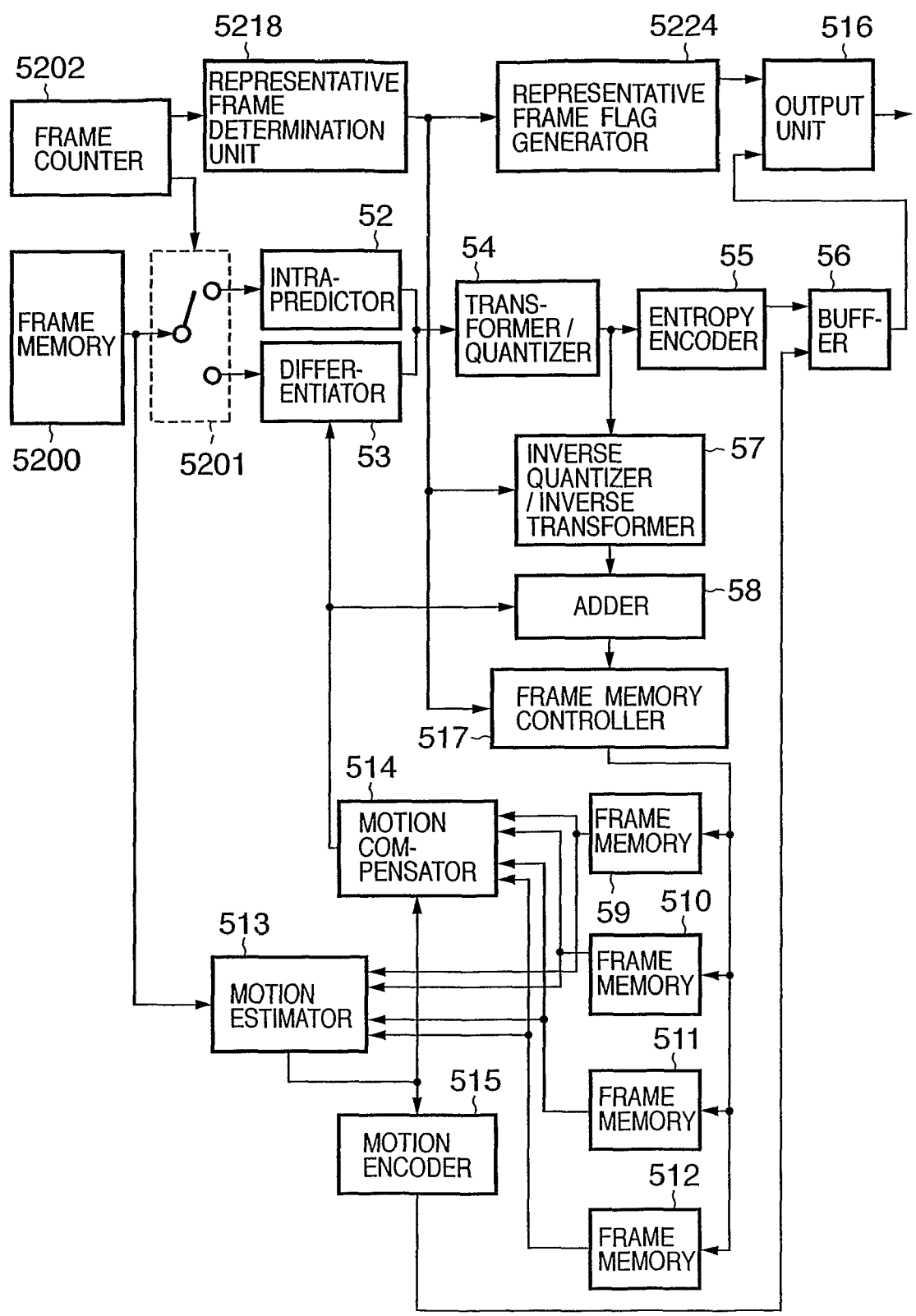
FIG. 16 is a block diagram showing the arrangement of a moving image encoding apparatus according to the seventh embodiment of the present invention.

FIG. 16 is a block diagram showing the arrangement of a moving image encoding apparatus according to this embodiment. Note that the same reference numerals in FIG. 16 denote the same parts as in FIG. 12, and a description thereof will be omitted.

Reference numeral 5200 denotes a frame memory which holds an image of each frame (input image) that forms a moving image to be encoded.

Reference numeral 5202 denotes a frame counter, which is counted up every time one frame is output from the frame memory 5200. That is, the frame counter 5202 counts the number of frames output from the frame memory 5200.

Reference numeral 5201 denotes a selector which switches an output destination to the intra-predictor when the remainder obtained when the count value of the frame counter 5202 is divided by an integer M is N (<M). Otherwise, the selector 5201 switches the output destination to the differentiator 53. Note that these values M and N are not particularly limited. That is, the selector 5201 normally selects the differentiator 53 as the output destination, and periodically switches the output destination to the intra-predictor 52 only once. Hence, the values M and N are not particularly limited as long as this process is achieved. In the following description, for example, M=5 and N=1.

Reference numeral 5218 denotes a representative frame determination unit which determines a representative frame. Reference numeral 5224 denotes a representative frame flag generator which outputs the frame number of the representative frame to the output unit 516 when the representative frame determination unit 5218 determines the representative frame. Note that the representative frame flag generator 5224 holds the notified latest frame number, and outputs the currently held frame number until it receives a new number.

The moving image encoding process to be executed by the moving image encoding apparatus with the above arrangement will be described below.

As in the fifth embodiment, prior to encoding, the representative frame flag generator 5224 generates a code indicating that encoded data of interest adopts a method that refers to a representative frame, and outputs that code to the output unit 516. Also, the output unit 516 generates and outputs header information which represents the maximum number of frames that can be used in reference. At this time, the number of frames that can be used in reference is 3. Furthermore, the frame memories are reset to zero. In addition, the count value held by the frame counter 5202 is reset to zero.

The frame memory 5200 receives image data of each frame, and outputs it to the selector 5201. The frame counter 5202 counts up its count value by one for each output. The representative frame determination unit 5218 always refers to this count value. The unit 5218 determines, as a representative frame, a frame output from the frame memory 5200 when the remainder obtained upon dividing the count value by 5 is 1, and determines as a non-representative frame, a frame output from the frame memory 5200 in other cases.

As described above, the frame data output from the frame memory 5200 is output to the transformer/quantizer 54 as a prediction error via the intra-predictor 52 or differentiator 53 depending on whether that frame data is the representative or non-representative frame. If this prediction difference is that of the representative frame (when the representative frame determination unit 5218 determines the representative frame), the inverse quantizer/inverse transformer 57 and adder 58 are activated to decode the image of the representative frame, as in the fifth embodiment. In addition, an instruction is issued to the frame memory controller 517 to overwrite the decoded image data and frame number on a frame memory that stores the oldest data of the frame memories 59 to 512.

Furthermore, the representative frame flag generator 5224 outputs, to the output unit 516, the frame number of the representative frame which is output from the representative frame determination unit 5218 when it determines the representative frame.

On the other hand, if the prediction difference is not that of the representative frame (when the representative frame determination unit 5218 determines a non-representative frame), without being activated the inverse quantizer/inverse transformer 57 and adder 58, as in the fifth embodiment, an instruction is issued to the frame memory controller 517 not to store the decoded image in the frame memories 59 to 512.

As in the fifth embodiment, when the selector 5201 performs intra-frame encoding at given intervals, input frame data is input to the intra-predictor 52 for respective macroblocks, and undergoes prediction for respective blocks. That result undergoes integer orthogonal transformation and quantization by the transformer/quantizer 54, and the quantization result is input to the entropy encoder 55.

The entropy encoder 55 entropy-encodes the input quantization result, and stores encoded data in the buffer 56 for each frame. In case of the representative frame, the inverse quantizer/inverse transformer 57 obtains a decoded image from the input quantization result.

In accordance with an instruction from the frame memory controller 517, the decoded image data and frame number are stored in a free frame memory or a frame memory which stores the image data of the oldest representative frame of the frame memories 59 to 512. In case of the non-representative frame, the decoded image is not stored in the frame memories 59 to 512.

The output unit 516 appends the frame number of the representative frame output from the representative frame flag generator 5224 to the encoded data stored in the buffer 56, and outputs that encoded data.

On the other hand, inter-frame encoding is executed in the same manner as in the fifth embodiment. That is, the selector 5201 switches the output destination of frame data to the differentiator 53. The frame memory 5200 inputs frame data to the selector 5201 and motion estimator 513 for respective macroblocks. The motion estimator 513 reads out the contents of the frame memories 59 to 512 to calculate a motion vector and frame number. The motion compensator 514 generates a predicted image, which is input to the differentiator 53. The differentiator 53 calculates a prediction error, which is input to the transformer/quantizer 54 that performs integer orthogonal transformation and quantization. The quantization result is input to the entropy encoder 55. The entropy encoder 55 entropy-encodes the input quantization result, and stores encoded data in the buffer 56 for each frame.

The output unit 516 appends the frame number of the representative frame output from the representative frame flag generator 5224 to the encoded data stored in the buffer 56, and outputs that encoded data.

Figure 17:
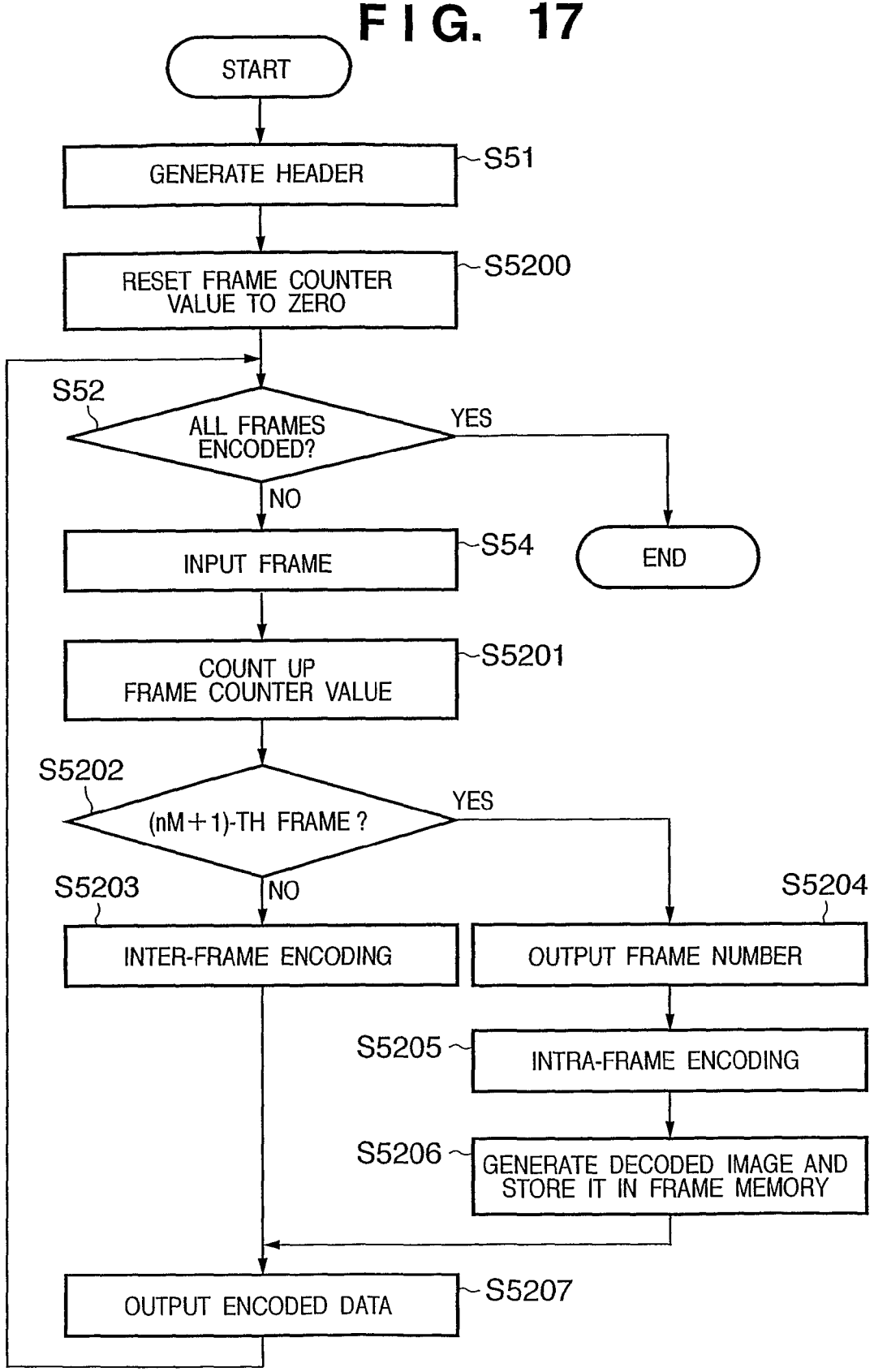
FIG. 17 is a flowchart of an encoding process according to the seventh embodiment of the present invention.

FIG. 17 is a flowchart of the aforementioned encoding process. Note that the same step numbers in FIG. 17 are assigned to the same processing steps as in FIG. 13, and a description thereof will be omitted.

The process in step S51 is executed, and the counter value held by the frame counter 5200 is reset to zero (step S5200). If the encoding process has not been executed for all frames, the flow advances to step S54 to execute the same process as in step S54 described above so as to output frame data from the frame memory 5200 to the respective units (step S54).

Every time frame data for one frame is output from the frame memory 5200, the counter vale held by the frame counter 5202 is counted up by one (step S5201). If the remainder obtained upon dividing the current count value by M is 1 (i.e., if the frame number of the frame output from the frame memory 5200 in step S54 is (N*M+1)), it is determined that the frame output from the frame memory 5200 in step S54 is a representative frame, and the flow advances to step S5204. The representative frame flag generator 5224 outputs the frame number of this representative frame output from the representative frame determination unit S218 to the output unit 516 (step S5204). Next, the aforementioned respective units perform intra-frame encoding (intra-encoding) to this representative frame (step S5205). Furthermore, the encoded result is decoded to generate a decoded image, which is stored in a frame memory according to the above conditions of the frame memories 59 to 512 (step S5206). As described above, the image data of the representative frame stored in the frame memory in this way is referred to upon encoding subsequent frames to be encoded.

On the other hand, if the remainder obtained upon dividing the current count value by M is not 1 (i.e., if the frame number of the frame output from the frame memory 5200 in step S54 is not (N*M+1)), it is determined that the frame output from the frame memory 5200 in step S54 is not a representative frame, and the flow advances to step S5203, and the respective units perform inter-frame encoding for this non-representative frame (step S5203).

Since the encoded result is output to the buffer 56 independently of whether the frame to be encoded is a representative or non-representative frame, the output unit 516 appends "the frame number of representative frame" output from the representative frame flag generator 5224 to this encoded result, and externally outputs it (step S5206).

With the above arrangement and a series of selection operations, since the representative frames are set at given intervals, the frame memory size on the encoding side can be reduced, and size and cost reductions of the circuit can be achieved.

Eighth Embodiment

A moving image encoding apparatus according to this embodiment has the same arrangement as in the third embodiment. A case will be explained hereinafter wherein the moving image encoding apparatus according to this embodiment implements a moving image encoding process different from that according to the third embodiment.

The moving image encoding apparatus according to this embodiment encodes a moving image, which is sensed by the camera 306 and is recorded in the storage device 305, and stores the encoded result in the memory 301 or outputs it onto the network 309 via the communication I/F 308, as in the third embodiment. Note that the H.264 encoding method will be exemplified as the encoding method. However, the present invention is not limited to such specific method, and may be applied to any other encoding methods as long as they encode data with reference to a plurality of frames (i.e., two or more frames). For the sake of simplicity, three frames each before and after the frame of interest are referred to. However, the present invention is not limited to this.

When an encoding instruction is input using a keyboard or mouse (not shown) of the terminal 303, this instruction is supplied to the CPU 300, which initializes the respective units. The CPU 300 reads out software programs and data such as a software program for making the CPU 300 execute a moving image encoding process (to be described later), a software program for making a communication process (to be described later), and the like from the storage device 305, and loads them onto the memory 301.

Figure 18:
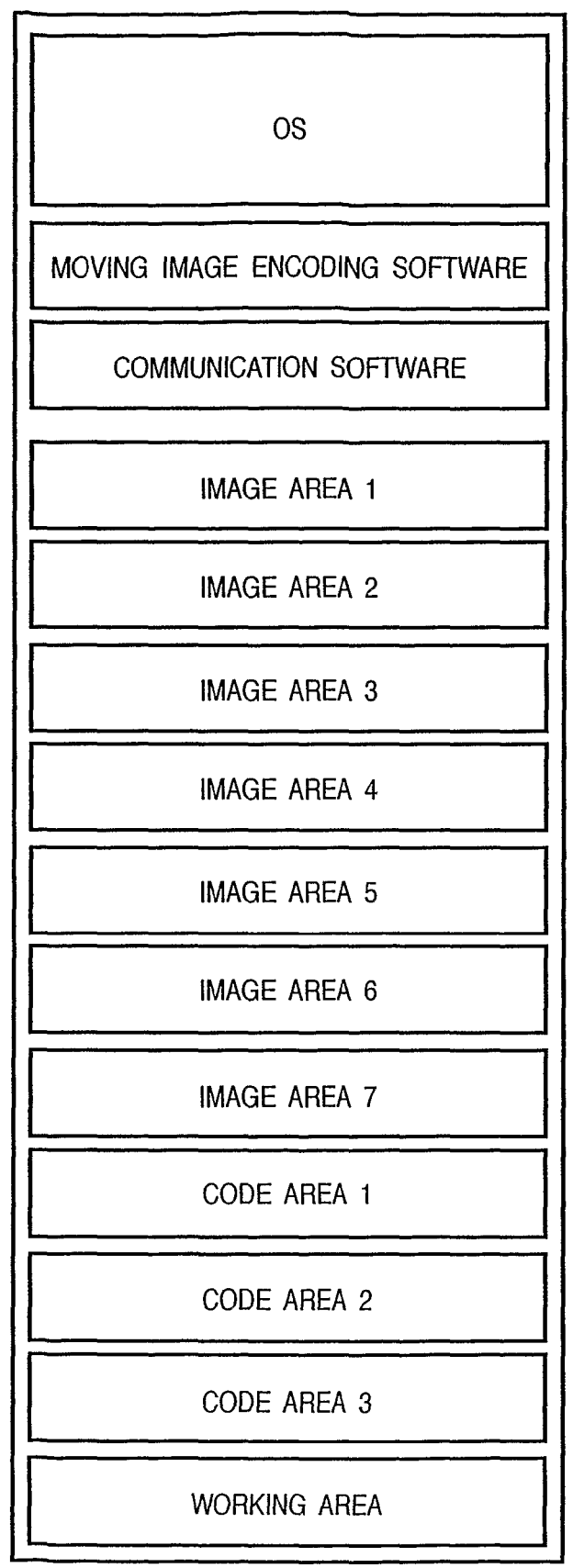
FIG. 18 shows an example of the memory map in a memory 301 in the eighth embodiment of the present invention.

FIG. 18 shows an example of the memory map in the memory 301. As shown in FIG. 18, areas for storing the moving image encoding software and communication software are assured on the memory 301, and an area for storing an OS (operating system) for making the CPU 300 execute processes that control these software programs is also assured. Furthermore, the memory 301 includes image areas (1 to 7; to be described later), code areas (1 to 3), and a working area. The reason why the number of code areas is 3 is that the number of frames to be referred to is 3. If another number of frames to be referred to is set, the number of code areas changes accordingly.

Figure 19:
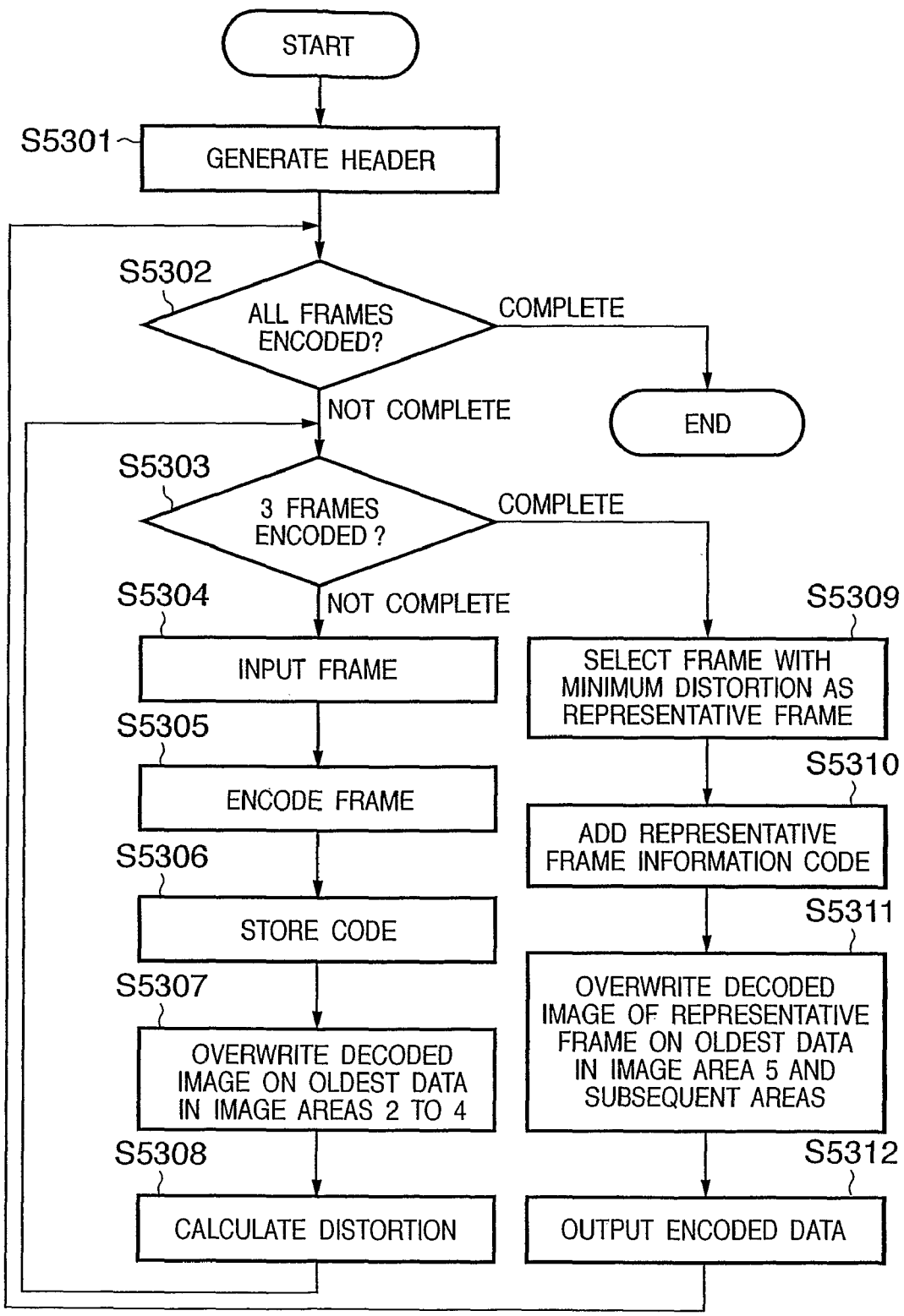
FIG. 19 is a flowchart of a process implemented by a CPU 300 upon executing moving image encoding software and communication software according to the eighth embodiment of the present invention.

FIG. 19 is a flowchart of the process implemented when the CPU 300 executes these moving image encoding software and communication software.

The CPU 300 generates header information including information indicating that the encoding method to be executed below uses a representative frame, and information indicating the maximum number of frames to be referred to, and stores it on the memory 301 (step S5301).

The encoding process of all frames is determining whether or not complete, when the encoding process of all frames is not complete yet, the flow advances to step S5303 to check if the encoding process for three frames is complete (step S5303). If the encoding process for three frames is not complete yet, the flow advances to step S5304. The CPU 300 reads out data for one frame of the moving image data sensed by the camera 306 from the storage device 305, and stores it in one image area of the memory 301 (step S5304). If the process in step S5304 is the first one, data is stored in image area 1.

The frame data input in step S5304 is encoded by one of inter-frame encoding and intra-frame encoding (step S5305). If either of inter-frame encoding or intra-frame encoding is executed, the method of one of the above embodiments can be applied. In this embodiment, assume that the frame data is encoded by inter-frame encoding.

The encoded result in step S5305 is stored in one code area (step S5306). If the process in step S5306 is the first one, data is stored in code area 1.

The image of the frame encoded in step S5305 is decoded by executing the same process as in the above embodiment, and the decoded result (decoded image) is stored in one of image areas 2 to 4 (step S5307). Note that the frame numbers of frame data stored in respective image areas are referred to, and the decoded image is stored in the image area that stores frame data with the oldest frame number.

A distortion value between the image stored in step S5306 and the decoded image obtained by decoding this image in step S5307 is calculated (step S5308). As an example of a method of calculating this distortion value, the absolute values of differences of pixel values between positionally corresponding pixels in two images are calculated, and the sum total value of the absolute values of differences for respective pixels is calculated to obtain a distortion value between the images. The method of calculating a distortion value is not particularly limited. In brief, an index indicating a difference between a source image and an image, which is once encoded and then decoded, need only be obtained as a value.

The flow returns to step S5303 to repeat the subsequent processes. After the processes are repeated, if the encoding process for three frames is complete, the flow advances from step S5303 to step S5309. The CPU 300 refers to the distortion values calculated in step S5308 for three encoded frames, and determines a frame with a smallest distortion value as a representative frame which is a frame that represents the three encoded frames (step S5309).

The CPU 300 appends the frame number of the determined representative frame to the encoded data stored in the code areas (step S5310).

The CPU 300 stores a decoded image of the representative frame (which is stored in one of image areas 2 to 4 and can be uniquely selected by the frame number) in an image area which stores frame data with the oldest frame number of image areas 5 to 7 (step S5311).

By executing the communication software, the CPU 300 outputs encoded data stored in the code areas on the memory 301 to the network 309 via the communication interface 308 (step S5312). Note that the output destination of the encoded data of respective frames in step S5312 is not limited to this. For example, the encoded data may be stored in predetermined areas in the memory 301 or may be saved in the storage device 304, 305, or the like.

The flow then returns to step S5302 to encode the next three frames, thus repeating the subsequent processes. If no next three frames are available, the process according to the flowchart shown in FIG. 19 ends.

With a series of selection operations described above, since a frame with a smallest distortion value due to encoding is selected as a representative frame, deterioration of the image quality due to encoding can be prevented, and can be minimized.

Note that this embodiments encodes three frames each. However, the number of frames is not particularly limited.

Ninth Embodiment

This embodiment will explain a decoding apparatus which decodes the encoded result output from the moving image encoding apparatus according to the eighth embodiment. The decoding apparatus according to this embodiment is an apparatus which has the same arrangement as that of the third embodiment.

Hence, the decoding apparatus according to this embodiment and the moving image encoding apparatus according to the eighth embodiment may be integrated, and the encoding and decoding processes may be done in a single apparatus. In this case, in the eighth embodiment, the encoded results must be held in the apparatus (e.g., in predetermined areas in the memory 301).

The decoding apparatus according to this embodiment and the moving image encoding apparatus according to the eighth embodiment may be arranged as independent apparatuses. In this case, in the eighth embodiment, the encoded results must be output onto the network 309 via the communication interface 308 and must be input to the decoding apparatus according to this embodiment.

However, in the following description, the essential process to be executed is the same in either of the above cases.

Figure 20:
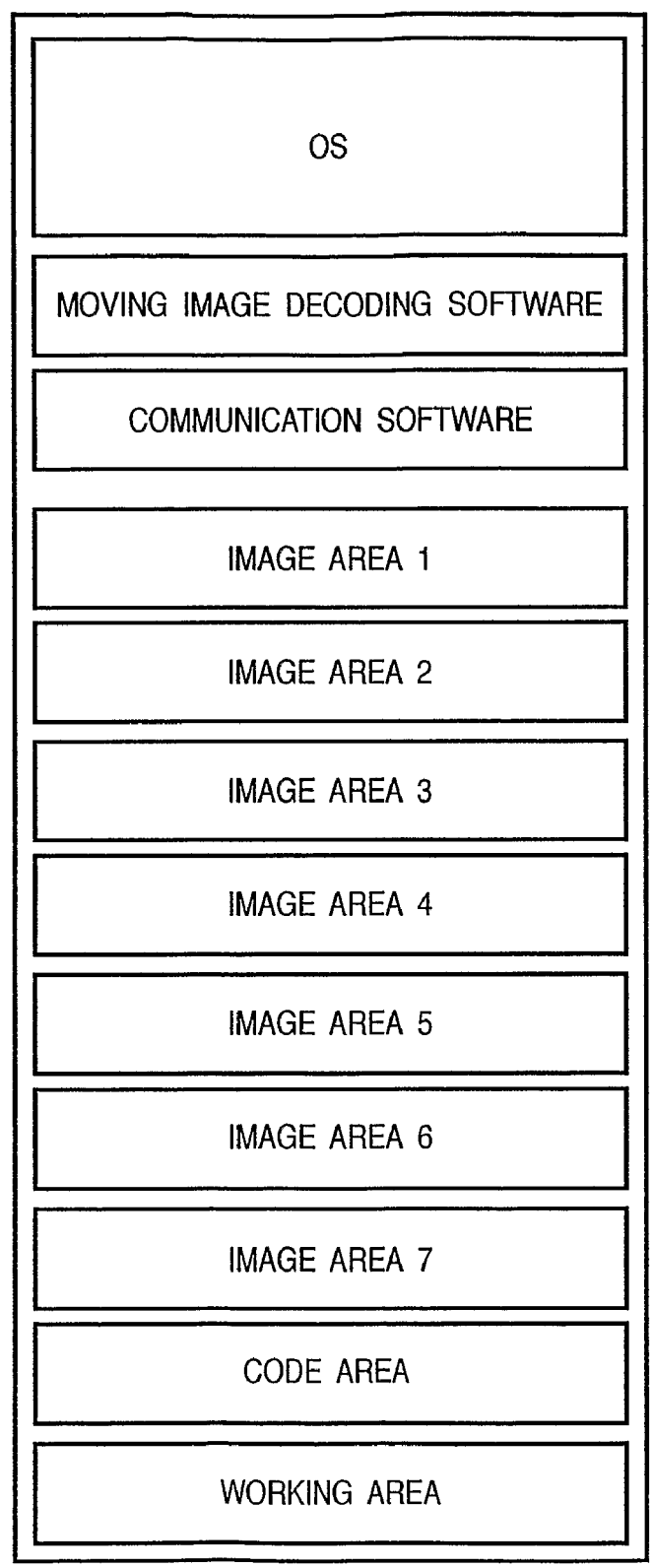
FIG. 20 shows an example of the memory map in a memory 301 in the ninth embodiment of the present invention.

FIG. 20 shows an example of the memory map in the memory 301. As shown in FIG. 20, areas for storing the moving image decoding software and communication software are assured on the memory 301, and an area for storing an OS (operating system) for making the CPU 300 execute processes that control these software programs is also assured. Furthermore, the memory 301 includes image areas (1 to 7; to be described later), a code area, and a working area. Note that image area 1 stores a decoded image, and image areas 2 to 7 store reference images. Note that images are stored in image areas 2 to 7 in the order named.

Figure 21:
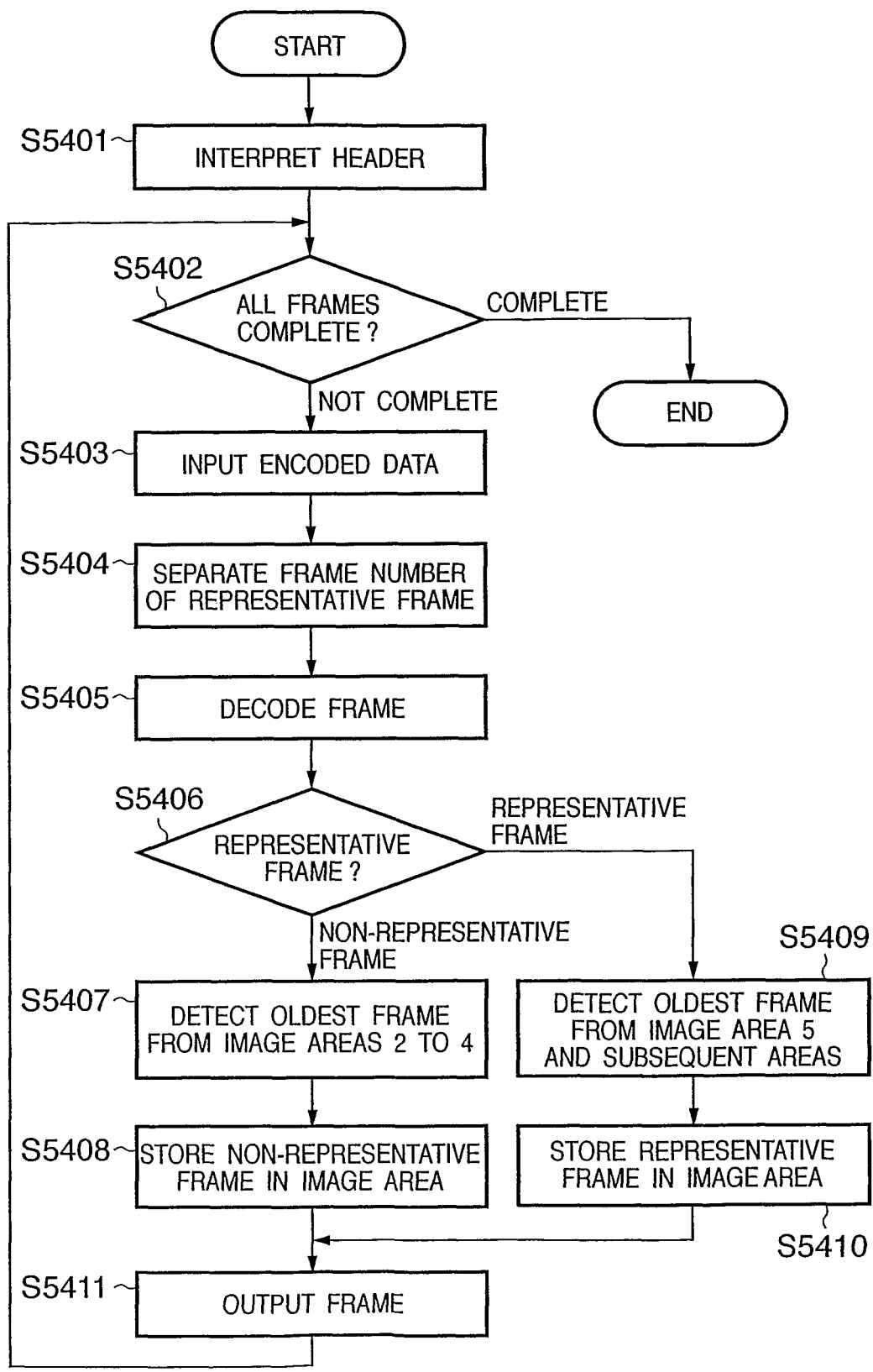
FIG. 21 is a flowchart of a process implemented by a CPU 300 upon executing moving image decoding software and communication software according to the ninth embodiment of the present invention.
Figure 22:
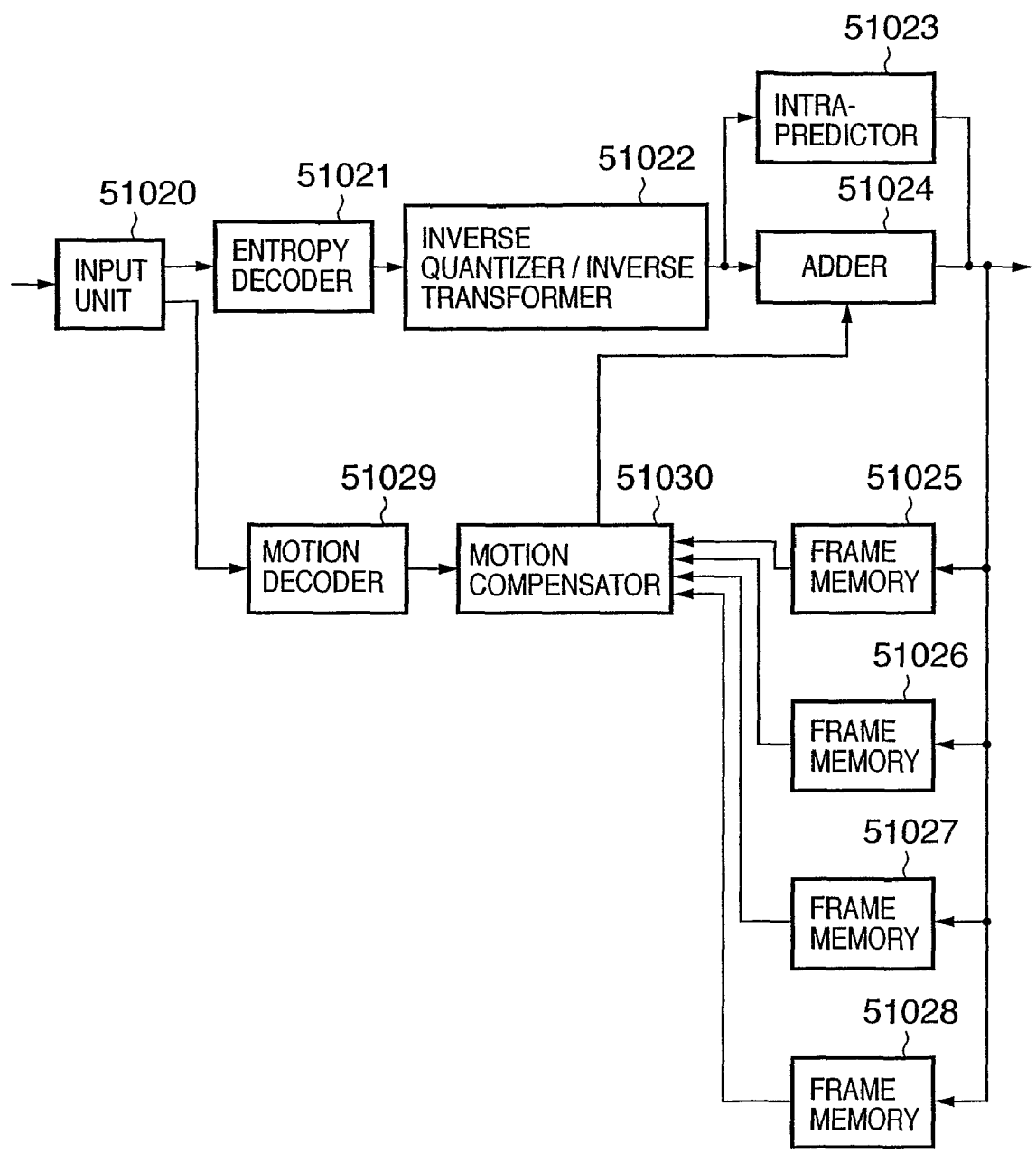
FIG. 22 is a block diagram showing the arrangement of a conventional H.264 decoder.

FIG. 21 is a flowchart of the process implemented when the CPU 300 executes these moving image decoding software and communication software.

The CPU 300 refers to and interprets the header information which is input externally or internally (e.g., from the memory) prior to encoded data, and executes various initialization processes (step S5401).

It is checked if the decoding process for all frames is complete (step S5402). If the decoding process for all frames is not complete yet, the flow advances to step S5403 to input encoded data of each frame to the code area on the memory 301 (step S5403). The CPU 300 then separates the frame number of the representative frame of this frame, which is appended to this encoded data, from the encoded data (step S5404).

The CPU 300 applies the decoding process to the input encoded data, as described in the sixth embodiment, and stores the decoded image in image area 1 (step S5405). In this decoding process, if data to be decoded is inter-frame encoded, the CPU 300 decodes the data with reference to reference images stored in image areas 2 to 7. Also, the CPU 300 stores the frame number of the decoded frame in the working area.

Next, whether or not the frame decoded in step S5404 is a representative frame is determined by referring to the frame number written in the working area, i.e., by checking if that frame number matches the frame number separated in step S5404 (step S5406). If the decoded frame is a non-representative frame, the flow advances to step S5407. The CPU 300 specifies an image area which stores frame data with the oldest frame number of image areas 2 to 4 (step S5407), and copies the image stored in image area 1 to the specified area (step S5408).

On the other hand, if the decoded frame is a representative frame, the flow advances to step S5409. The CPU 300 specifies an image area which stores frame data with the oldest frame number of image areas 5 to 7 (step S5409), and copies the image stored in image area 1 to the specified area (step S5410).

Then, the CPU 300 outputs the decoded image data stored in image area 1 (step S5411). The output destination is not particularly limited. For example, the decoded image data may be output to the display device 307 and may be displayed.

The flow returns to step S5402 to repeat the subsequent processes.

With a series of selection operations, a temporally farther frame is held as a representative frame, and both temporally closer frames are referred to, thus obtaining a reconstructed image with a smaller information volume.

Note that this embodiment uses the position of the latest reference frame as information to be referred to. However, the present invention is not limited to this, and information such as the latest reference time and the like may be used.

10th Embodiment

Figure 23:
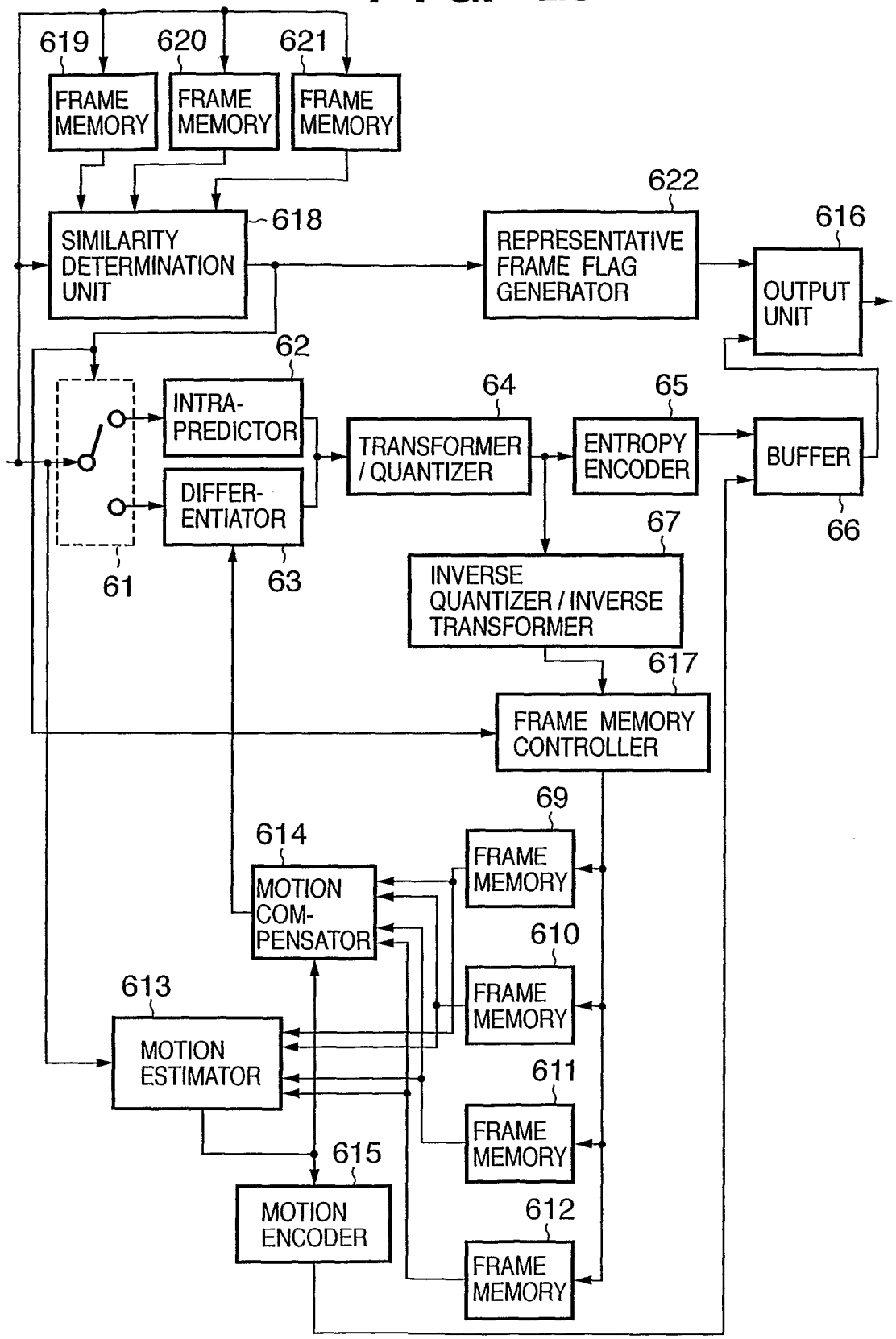
FIG. 23 is a block diagram showing the arrangement of a moving image encoding apparatus according to the 10th embodiment of the present invention.

FIG. 23 is a block diagram showing the arrangement of a moving image encoding apparatus according to this embodiment. In this embodiment, a description will be given based on the H.264 encoding method, but temporally discontinuous reference frames are to be referred to unlike in H.264. However, the base method is not limited to H.264. For the sake of simplicity, forward prediction that refers to previous frames will be exemplified. However, the present invention can also be applied to two-way prediction. In the following description, image data of a frame will also be referred to as frame data. This frame data (an image of a frame) includes data indicating the frame number of this frame.

Referring to FIG. 23, reference numerals 619 to 621 denote frame memories, which store images of representative frames selected by a process to be described later of images of respective frames (input images) of an externally input moving image. Reference numeral 61 denotes a selector which selects an output destination in accordance with the intra-frame encoding or inter-frame encoding mode.

Reference numeral 62 denotes an intra-predictor which performs intra-prediction based on the H.264 encoding method; and 63, a differentiator for obtaining motion prediction errors. Reference numeral 64 denotes a transformer/quantizer which performs integer orthogonal transformation, and quantizes input coefficients; and 67, an inverse quantizer/inverse transformer which performs the reverse process of the transformer/quantizer 64. Reference numeral 65 denotes an entropy encoder which encodes the quantization result of the transformer/quantizer 64; and 66, a buffer which stores generated codes for a plurality of frames.

Reference numerals 69, 610, 611, and 612 denote frame memories each of which stores locally decoded image data and the frame number for each frame. Reference numeral 613 denotes a motion estimator which extracts an optimal motion vector from the corresponding frame of an input image and decoded image data; and 614, a motion compensator which generates a predicted image on the basis of the motion vector calculated by the motion estimator 613 and information of the corresponding frame. Reference numeral 615 denotes a motion encoder which encodes motion information on the basis of the calculated motion vector and information of the corresponding frame.

Reference numeral 617 denotes a frame memory controller which controls inputs/outputs of the frame memories 69 to 612; and 616, an output unit which outputs encoded data stored in the buffer 66. Reference numeral 618 denotes a similarity determination unit which calculates a similarity level by comparing an input image and an image of the representative frame. Reference numeral 622 denotes a representative frame flag generator which outputs the frame number of the representative frame to the output unit 616.

The moving image encoding operation in the moving image encoding apparatus with the above arrangement will be described below.

Prior to encoding, the representative frame flag generator 622 generates a code indicting that encoded data of interest adopts a method that refers to a representative frame, and outputs that code to the output unit 616. This code is encoded as user data to maintain compatibility to the H.264 encoding method. However, the present invention is not limited to this, and such information may be embedded as a digital watermark.

Furthermore, the output unit 616 generates and outputs header information which represents the maximum number of frames that can be used in reference. At this time, the number of frames that can be used in reference is 3. Also, the frame memories are reset to zero.

Images of respective frames (input images) that form a moving image are sequentially input to the selector 61 and similarity determination unit 618. The similarity determination unit 618 calculates similarity values by comparing the input image and image data of the representative frames stored in the frame memories 619, 620, and 621. In this embodiment, as a calculation method of the similarity level, the absolute values of differences of pixel values between positionally corresponding pixels in two images are calculated, and the sum total value of the absolute values of differences for respective pixels is calculated. However, the calculation method is not limited to such specific method, and other calculation methods may be used.

In this way, the similarity determination unit 618 calculates similarity levels between the input image and the images of the three representative frames. The unit 618 compares a minimum one of the calculated three similarity levels with a predetermined threshold. If the minimum similarity is equal to or larger than the predetermined threshold, the unit 618 determines this input image as an image of a representative frame. On the other hand, if the minimum similarity is smaller than the predetermined threshold, the unit 618 determines this input image as an image of a non-representative frame.

The selector 61 switches the output destination of the input image, which is determined as the representative frame by the similarity determination unit 618, to the intra-predictor 62. Also, the selector 61 switches the output destination of the input image, which is determined as the non-representative frame by the similarity determination unit 618, to the differentiator 63.

Also, when the similarity determination unit 618 determines that the input image is the image of the representative frame, it stores this input image in a frame memory which stores frame data with the oldest frame number of the frame memories 619 to 621.

On the other hand, when the similarity determination unit 618 determines that the input image is the image of the representative frame, it notifies the representative frame flag generator 622 of the frame number of this input image. The representative frame flag generator 622 outputs the notified frame number to the output unit 616. Note that the representative frame flag generator 622 holds the notified latest frame number; and outputs the currently held frame number until it receives a new number.

A case will be explained first wherein intra-frame encoding is applied to image data of the representative frame.

The input image is input to the intra-predictor 62 for respective macroblocks, and undergoes prediction for respective blocks. The prediction result is input to the transformer/quantizer 64, which performs integer orthogonal transformation and quantizes its coefficients. The quantization result is input to the entropy encoder 65 and inverse quantizer/inverse transformer 67.

The entropy encoder 65 entropy-encodes the input quantization result, and stores encoded data in the buffer 66 for respective frames. The inverse quantizer/inverse transformer 67 obtains a decoded image from the input quantization result. The decoded image is stored in a frame memory that stores the representative frame with the oldest frame number of the frame memories 69 to 612 in accordance with an instruction from the frame memory controller 617.

On the other hand, the output unit 616 appends "the frame number of the representative frame" from the representative frame flag generator 622 to encoded data stored in the buffer 66 and externally outputs the data.

A case will be explained below wherein inter-frame encoding is applied to a non-representative frame. The input image data is input to the selector 61 and motion estimator 613 for respective macroblocks. The motion estimator 613 reads out images held in the frame memories 69 to 612, and calculates a motion vector as the motion estimator 13 in the first embodiment. The motion compensator 614 generates a predicted image as the motion compensator 14 in the first embodiment, and inputs it to the differentiator 63.

Since the differentiator 63 receives the input image of the non-representative frame from the selector 61, as described above, it calculates a difference between this image and predicted image, i.e., a prediction error. The calculated prediction error is input to the transformer/quantizer 64, which quantizes the prediction error by integer orthogonal transformation. Furthermore, the quantization result is entropy-encoded by the entropy encoder 65. The entropy-encoded result is stored in the buffer 66 for each frame. Also, the motion vector is encoded by the motion encoder 615 and is stored in the buffer 66 as the motion encoder 15 in the first embodiment.

The output unit 616 outputs the encoded data stored in the buffer 66 together with the frame number of the representative frame output from the representative frame flag generator 622.

Figure 24:
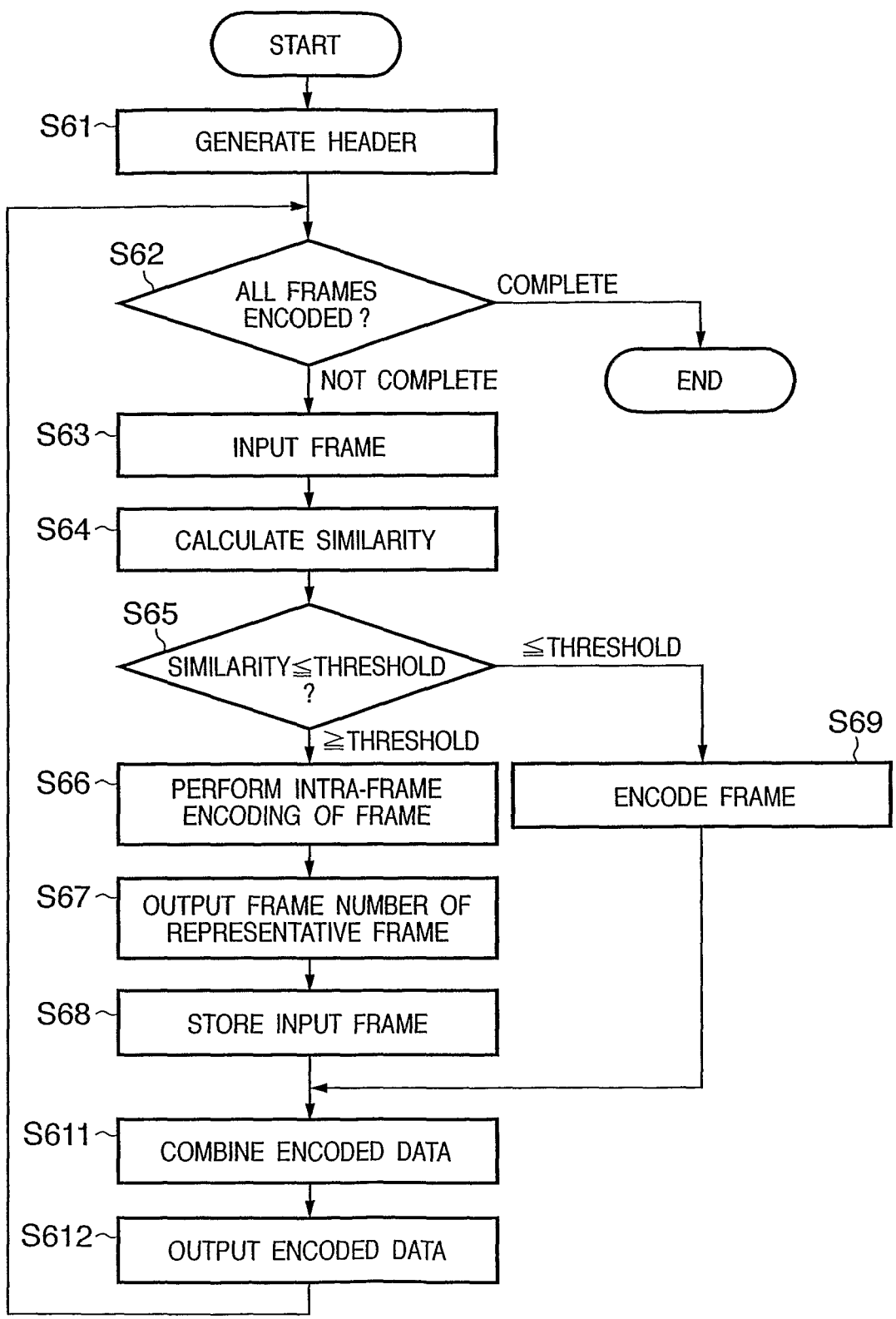
FIG. 24 is a flowchart of a moving image encoding process according to the 10th embodiment of the present invention.

FIG. 24 is a flowchart of the aforementioned moving image encoding process according to this embodiment.

The output unit 616 generates and outputs header information including information indicating that the encoding method to be executed below uses a representative frame, and information indicating the maximum number of frames to be referred to (step S61). It is then checked if the encoding process for all frames to be encoded is complete (step S62). If frames to be encoded still remain, the flow advances to step S63 to sequentially input frame data to be encoded to the similarity determination unit 618 and selector 61 (step S63). As described above, the similarity determination unit 618 calculates similarity levels between the input image and the images of the representative frames stored in the frame memories 619 to 621 (step S64), and checks if the minimum similarity level is equal to or smaller than the predetermined threshold (step S65).

If the minimum similarity level is equal to or larger than the predetermined threshold, the flow advances to step S66. The input image is determined as an image of a representative frame, and the intra-frame encoding process is applied to this input image (step S66), as described above. This encoding process includes, a process for decoding the encoded input image and storing the decoded image in a frame memory that stores the frame of the oldest frame number of the frame memories 69 to 612, as in the first embodiment.

The representative frame flag generator 622 outputs the frame number of this input image to the output device 616 (step S67). Also, the input image input in step S63 in one of the frame memories 619 to 621 (step S68).

On the other hand, if the minimum similarity level is equal to or smaller than the predetermined threshold, the flow advances to step S69. The input image is determined as an image of a non-representative frame, and the inter-frame encoding process is applied to this input image (step S69), as described above. Since the encoded result in either step S66 or S69 is output to the buffer 66, as described above, the output unit 616 appends the frame number output from the representative frame flag generator 622 to this encoded result (step S611), and externally outputs that result (step S612).

With a series of selection operations described above, frames for a long period of time can be referred to using a fewer number of frames, and the memory size can be suppressed upon encoding. Since the representative frame undergoes intra-frame encoding, deterioration of the image quality due to diffusion of errors can be prevented, and can be minimized.

Since the similarity levels are compared using the input image before encoding, a representative image can be selected without being influenced by distortion due to encoding.

In this embodiment, only the representative frame undergoes intra-frame encoding. However, the present invention is not limited to this, and other frames, i.e., those other than the representative frame may undergo intra-frame encoding at predetermined intervals.

Also, encoding units and the like are not limited to frames, as described above.

11th Embodiment

Figure 25:
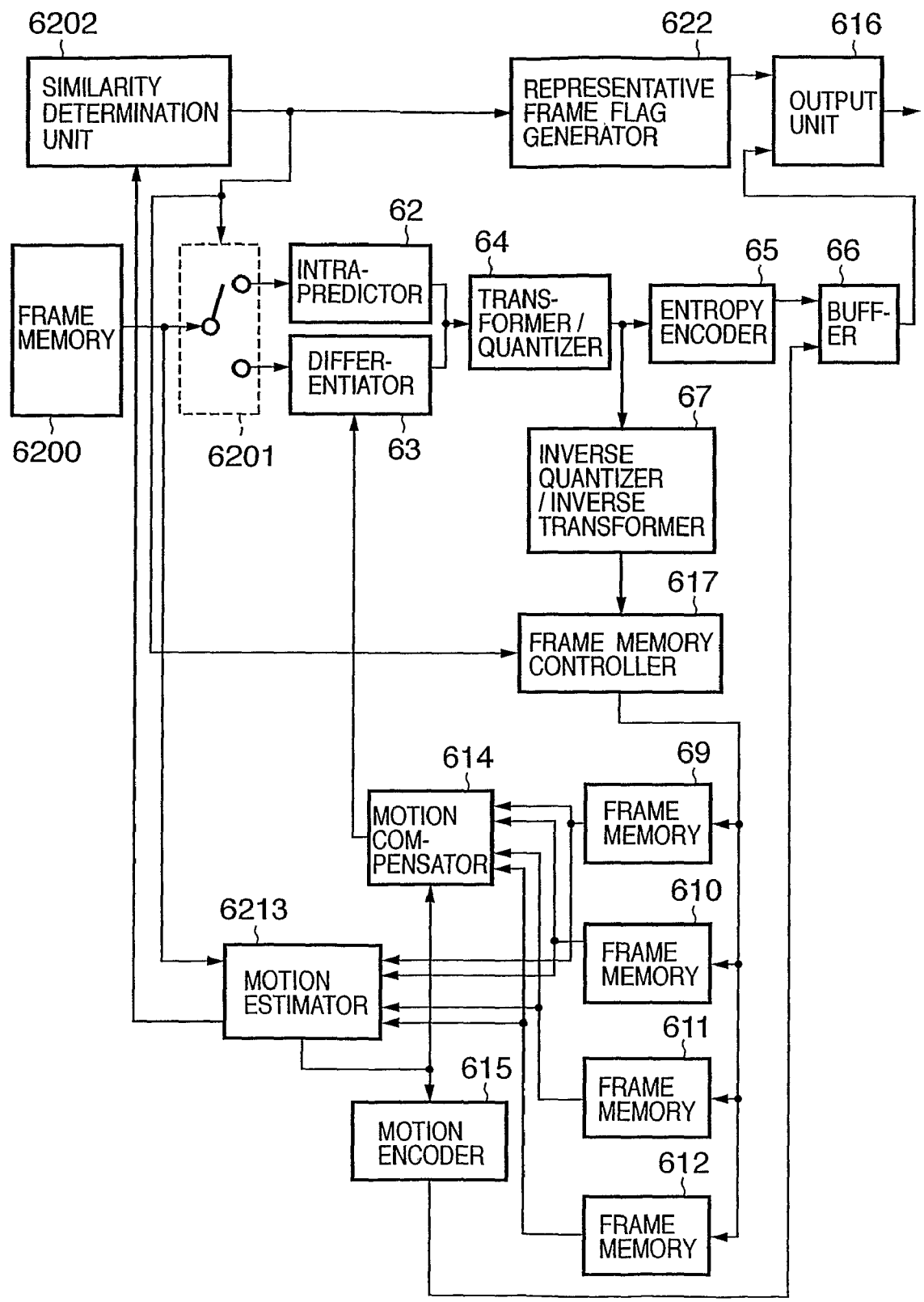
FIG. 25 is a block diagram showing the arrangement of a moving image encoding apparatus according to the 11th embodiment of the present invention.

FIG. 25 is a block diagram showing the arrangement of a moving image encoding apparatus according to this embodiment. The same reference numerals in FIG. 25 denote the same parts as in FIG. 23, and a description thereof will be omitted.

Reference numeral 6200 denotes a frame memory which holds images of respective frames (input images) that form a moving image to be encoded. Reference numeral 6213 denotes a motion estimator which compares the input image and image data in the frame memories 69 to 612 and outputs a motion vector and reference frame number. Also, the motion estimator 6213 outputs an error at that time.

Reference numeral 6202 denotes a similarity determination unit, which receives an error upon motion vector search from the motion estimator 6213, calculates similarity levels (to be described later), and determines if the input image is a representative frame. Reference numeral 6201 denotes a selector which selects the differentiator 63 as a normal output destination. The selector 6201 switches the output destination to the intra-predictor at predetermined intervals after the last timing when the similarity determination unit 6202 determines the representative frame.

The process to be executed by the moving image encoding apparatus according to this embodiment with the above arrangement will be described below.

As in the 10th embodiment, prior to encoding, the representative frame flag generator 622 generates a code indicating that encoded data of interest adopts a method that refers to a representative frame, and outputs that code to the output unit 616. Furthermore, the output unit 616 generates and outputs header information which represents the maximum number of frames that can be used in reference. At this time, the number of frames that can be used in reference is 15.

The frame memory controller 617 deletes a frame, which is separated apart 15 frames or more from the input image input from the frame memory 6200, of those held by the frame memories 69 to 612. This process is attained by referring to the frame numbers of respective frames held by the frame memories 69 to 612, and that of the input image input from the frame memory 6200, and deleting each frame data having a frame number which is different 15 or more from the frame number of the input image. As a result, the motion estimator 6213 cannot refer to a frame which is separated apart 15 frames or more from the input image input from the frame memory 6200.

Image data of each frame is input to the frame memory 6200, and is input to the motion estimator 6213 prior to encoding (to be described later). The motion estimator 6213 calculates motion vectors for respective macroblocks for all images stored in the frame memories 69 to 612.

The motion vector is calculated by a block matching method. In this method, a difference in a pixel position where the sum of the absolute values of differences for respective pixels between the corresponding portion of the reference image and input portion becomes minimum is used as a motion vector. The minimum absolute value sum at that time is input to the similarity determination unit 6202 as an error.

The similarity determination unit 6202 calculates the sum total of the absolute values of the generated errors for each frame. This sum total is used as a similarity level. If the sum total of the absolute values of errors is smaller than a predetermined threshold, the unit 6202 determines that the input image is a non-representative frame. If the sum total of the absolute values of errors is larger than the predetermined threshold, the unit 6202 determines that the input image is a representative frame.

When it is determined that the input image is a representative frame, the similarity determination unit 6202 notifies the representative frame flag generator 622 of the frame number of this input image. The representative frame flag generator 622 outputs the notified frame number to the output unit 616.

The image of the representative frame or the input image upon making intra-frame encoding at predetermined intervals as in the 10th embodiment is input to the intra-predictor 62 for respective macroblocks and undergoes prediction for respective blocks. The prediction result undergoes integer orthogonal transformation and quantization by the transformer/quantizer 64, and the quantization result is input to the entropy encoder 65 and inverse quantizer/inverse transformer 67.

The entropy encoder 65 entropy-encodes the input quantization result, and stores the encoded result in the buffer 66 for each frame. The inverse quantizer/inverse transformer 67 obtains a decoded image from the input quantization result in the same manner as in the 10th embodiment.

Since the frame memory controller 617 receives the determination result of the similarity determination unit 6202, it can determine if the decoded image from the inverse quantizer/inverse transformer 67 is that of the representative frame. If the decoded image is that of the representative frame, this input image is stored in a frame memory that stores the frame with the oldest frame number of the frame memories 69 to 612.

With the above process, the output unit 616 appends "the frame number" from the representative frame flag generator 622 to encoded data stored in the buffer 66 and externally outputs the data.

On the other hand, when inter-frame encoding is applied to a non-representative frame, the same process as in the 10th embodiment is executed. That is, input image data of a non-representative frame is input to the selector 6201 and motion estimator 6213 for respective macroblocks. The motion estimator 6213 reads out images held in the frame memories 69 to 612 to obtain motion vectors as in the 10th embodiment. The motion compensator 614 generates predicted images as in the 10th embodiment and inputs them to the differentiator 63.

Since the differentiator 63 receives the input image of the non-representative frame from the selector 6201, as described above, it calculates a difference between this image and predicted image, i.e., a prediction error. The calculated prediction error is input to the transformer/quantizer 64, which quantizes the prediction error by integer orthogonal transformation. Furthermore, the quantization result is entropy-encoded by the entropy encoder 65. The entropy-encoded result is stored in the buffer 66 for each frame. Also, the motion vector is encoded by the motion encoder 615 and is stored in the buffer 66 as in the 10th embodiment.

The output unit 616 outputs the encoded data stored in the buffer 66 together with the frame number of the representative frame output from the representative frame flag generator 622.

Figure 26:
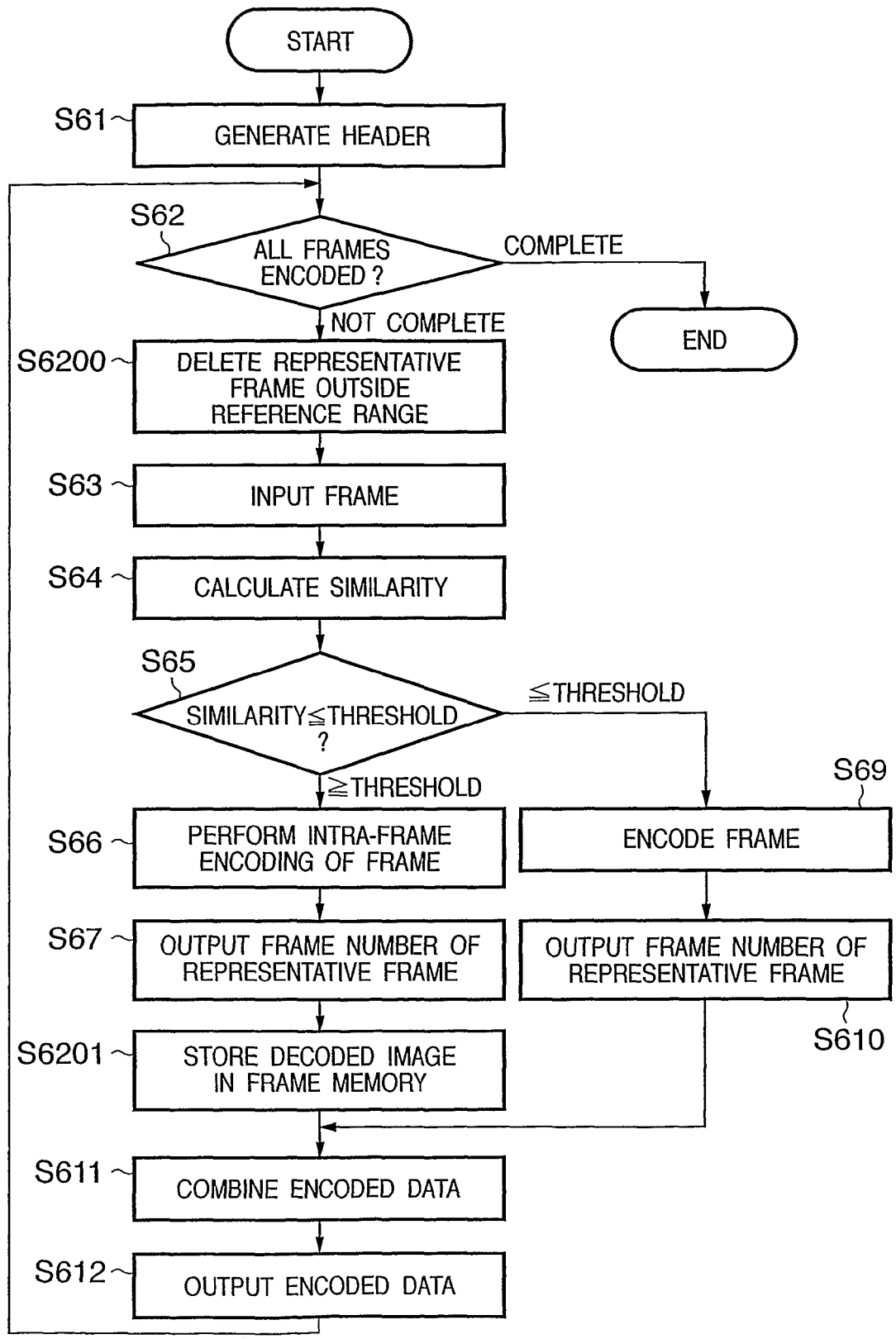
FIG. 26 is a flowchart of a moving image encoding process according to the 11th embodiment of the present invention.

FIG. 26 is a flowchart of the aforementioned moving image encoding process according to this embodiment. Note that the same step numbers in FIG. 26 are assigned to the same processing steps as in FIG. 24, and a description thereof will be omitted.

In step S6200, the frame memory controller 617 deletes a frame, which is separated apart 15 or more frames from the input image input from the frame memory 6200, of those which are held by the frame memories 69 to 612, as described above.

In step S6201, substantially the same process as in step S68 in FIG. 24 is executed except that the storage destination is different. More specifically, the image of the representative frame is stored in the frame memories 69 to 612 in step S6201.

With the above arrangement and a series of selection operations, the frame memory size on the encoding side can be reduced by referring to locally decoded images, and size and cost reductions of the circuit can be achieved.

Since the similarity calculation uses an error after motion compensation, a similarity level can be determined in consideration of image motion, thus improving the precision.

Since the representative frame undergoes intra-frame encoding, deterioration of the image quality due to propagation of errors can be prevented, and can be minimized.

Since the number of reference frames is limited, the compatibility to existing H.264 can be maintained, and encoded data can be decoded not only by the decoding apparatus according to the sixth embodiment but also by an existing decoding apparatus.

12th Embodiment

A moving image encoding apparatus according to this embodiment has the same arrangement as in the third embodiment. A case will be explained hereinafter wherein the moving image encoding apparatus according to this embodiment implements a moving image encoding process different from that according to the third embodiment.

The moving image encoding apparatus according to this embodiment encodes a moving image, which is sensed by the camera 306 and is recorded in the storage device 305, and stores the encoded result in the memory 301 or outputs it onto the network 309 via the communication I/F 308, as in the third embodiment. Note that the H.264 encoding method will be exemplified as the encoding method. However, the present invention is not limited to such specific method, and may be applied to any other encoding methods as long as they encode data with reference to a plurality of frames (i.e., two or more frames). For the sake of simplicity, three frames each before and after the frame of interest are referred to. However, the present invention is not limited to this.

When an encoding instruction is input using a keyboard or mouse (not shown) of the terminal 303, this instruction is supplied to the CPU 300, which initializes the respective units. The CPU 300 reads out software programs and data such as a software program for making the CPU 300 execute a moving image encoding process (to be described later), a software program for making a communication process (to be described later), and the like from the storage device 305, and loads them onto the memory 301.

As an example of the memory map in the memory 301 according to this embodiment, that shown in FIG. 18 can be applied.

Figure 27:
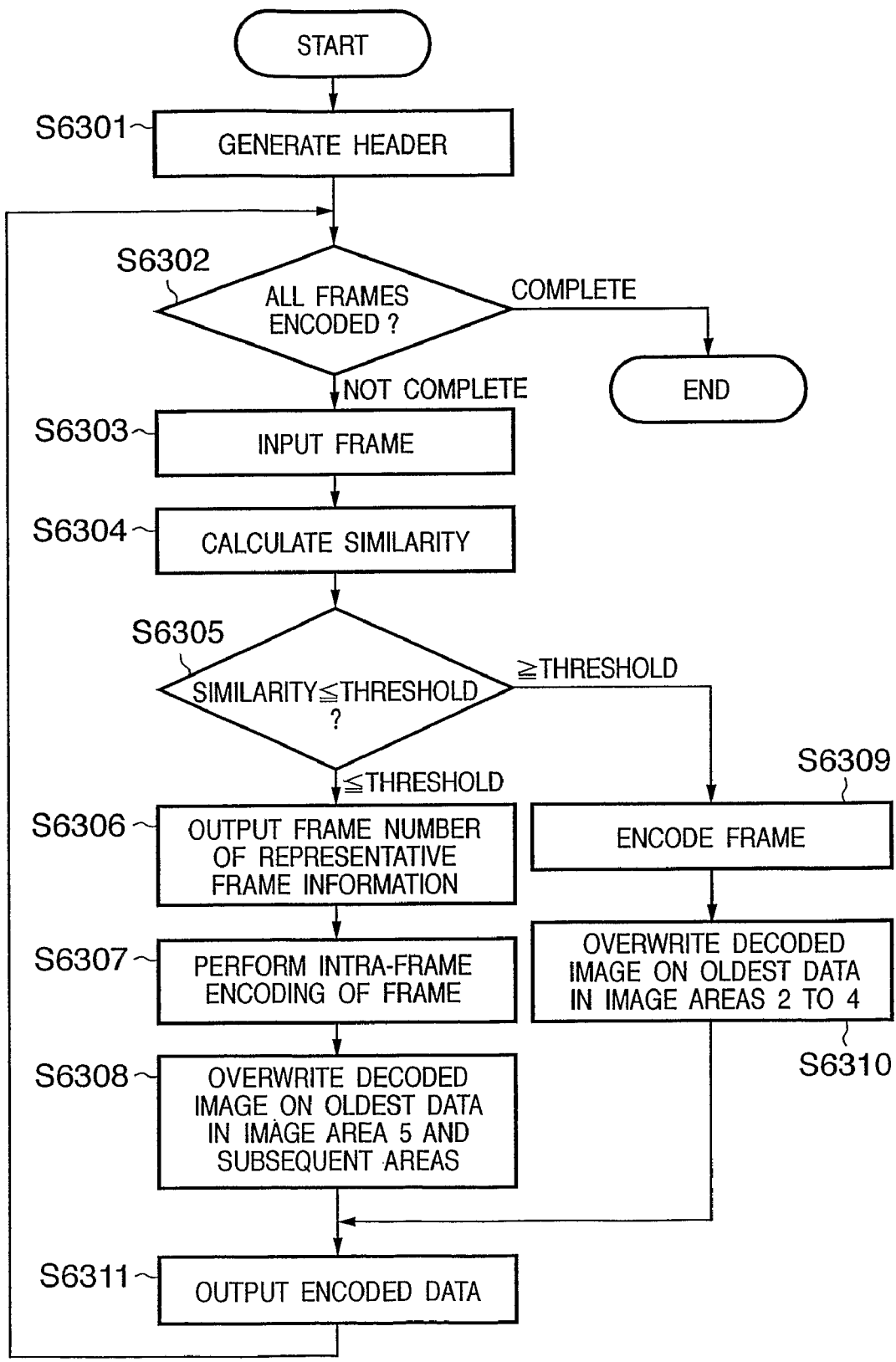
FIG. 27 is a flowchart of a process implemented by a CPU 300 upon executing moving image encoding software and communication software according to the 12th embodiment of the present invention.

FIG. 27 is a flowchart of the process implemented when the CPU 300 executes these moving image encoding software and communication software.

Initially, header information including information indicating that the encoding method to be executed below uses a representative frame, and information indicating the maximum number of frames to be referred to is generated, and is held in the memory 301 (step S6301).

The encoding process of all frames is determining whether or not complete, when the encoding process of all frames is not complete yet, the flow advances to step S6303. The CPU 300 reads out data for one frame of the moving image data sensed by the camera 306 from the storage device 305, and stores it in image area 1 of the memory 301 (step S6303).

The CPU 300 calculates the similarity levels of respective images stored in image areas 4 to 7 with the image stored in image area 1 (step S6304). The method of calculating the similarity levels is not particularly limited. For example, in this embodiment, the absolute values of differences of pixel values between positionally corresponding pixels in two images are calculated, and the sum total value of the absolute values of differences for respective pixels is calculated, thus obtaining a similarity level between the two images.

It is checked if the value of the minimum similarity level of those which are calculated for the images stored in image areas 4 to 7 is equal to or smaller than a predetermined threshold (step S6305). If the value of the minimum similarity level is equal to or smaller than the predetermined threshold, the flow advances to step S6306. It is determined that the image stored in image area 1 is that of the representative frame, and the frame number of this representative frame is output (stored) to a predetermined area (e.g., working area) in the memory 301 (step S6306). Then, intra-frame encoding is applied to the image of this representative frame as in the above embodiment, and the encoded result is stored in the code area (step S6307).

The encoded frame image is decoded by executing the same process as in the above embodiment, and the decoded result (decoded image) is stored in one of image area 5 and subsequent image areas (step S6308). Note that the frame numbers of frame data stored in respective image areas are referred to, and the decoded image is stored in the image area that stores frame data with the oldest frame number.

If the value of the minimum similarity level is equal to or larger than the predetermined threshold, the flow advances to step S6309. It is determined that the image stored in image area 1 is that of a non-representative frame. As in the above embodiment, intra-frame or inter-frame encoding is applied to this image of the non-representative frame, and the encoded result is stored in the code area (step S6309).

The image of the encoded frame is decoded by executing the same process as in the above embodiment, and the decoded result (decoded image) is stored in one of image areas 2 to 4 (step S6310). Note that the frame numbers of frame data stored in respective image areas are referred to, and the decoded image is stored in the image area that stores frame data with the oldest frame number.

By executing the communication software, the CPU 300 appends the frame number stored in step S6306 to encoded data of respective frames stored in the code areas on the memory 301 and outputs them to the network 309 via the communication interface 308 (step S6311). Note that the output destination of the encoded data of respective frames in step S6311 is not limited to this. For example, the encoded data may be stored in predetermined areas in the memory 301 or may be saved in the storage device 304, 305, or the like.

The flow then returns to step S6302 to encode the next frame, thus repeating the subsequent processes. If no next frame is available, the process according to the flowchart shown in FIG. 27 ends.

With a series of selection operations described above, since both temporally closer and farther frames are referred to, temporally closer frames with a higher similarity level can be referred to, thus improving the encoding efficiency.

Since the representative frame undergoes intra-frame encoding, deterioration of the image quality due to diffusion of errors can be prevented, and can be minimized.

13th Embodiment

This embodiment relates to a decoding apparatus which decodes the encoded result output from the moving image encoding apparatus according to the 12th embodiment. The decoding apparatus according to this embodiment is an apparatus which has the same arrangement as that of the third embodiment.

Hence, the decoding apparatus according to this embodiment and the moving image encoding apparatus according to the 12th embodiment may be integrated, and the encoding and decoding processes may be done in a single apparatus. In this case, in the 13th embodiment, the encoded results must be held in the apparatus (e.g., in predetermined areas in the memory 301).

The decoding apparatus according to this embodiment and the moving image encoding apparatus according to the 12th embodiment may be arranged as independent apparatuses. In this case, in the 13th embodiment, the encoded results must be output onto the network 309 via the communication interface 308 and must be input to the decoding apparatus according to this embodiment.

However, in the following description, the essential process to be executed is the same in either of the above cases.

As an example of the memory map in the memory 301 according to this embodiment, that shown in FIG. 20 can be applied.

Figure 28:
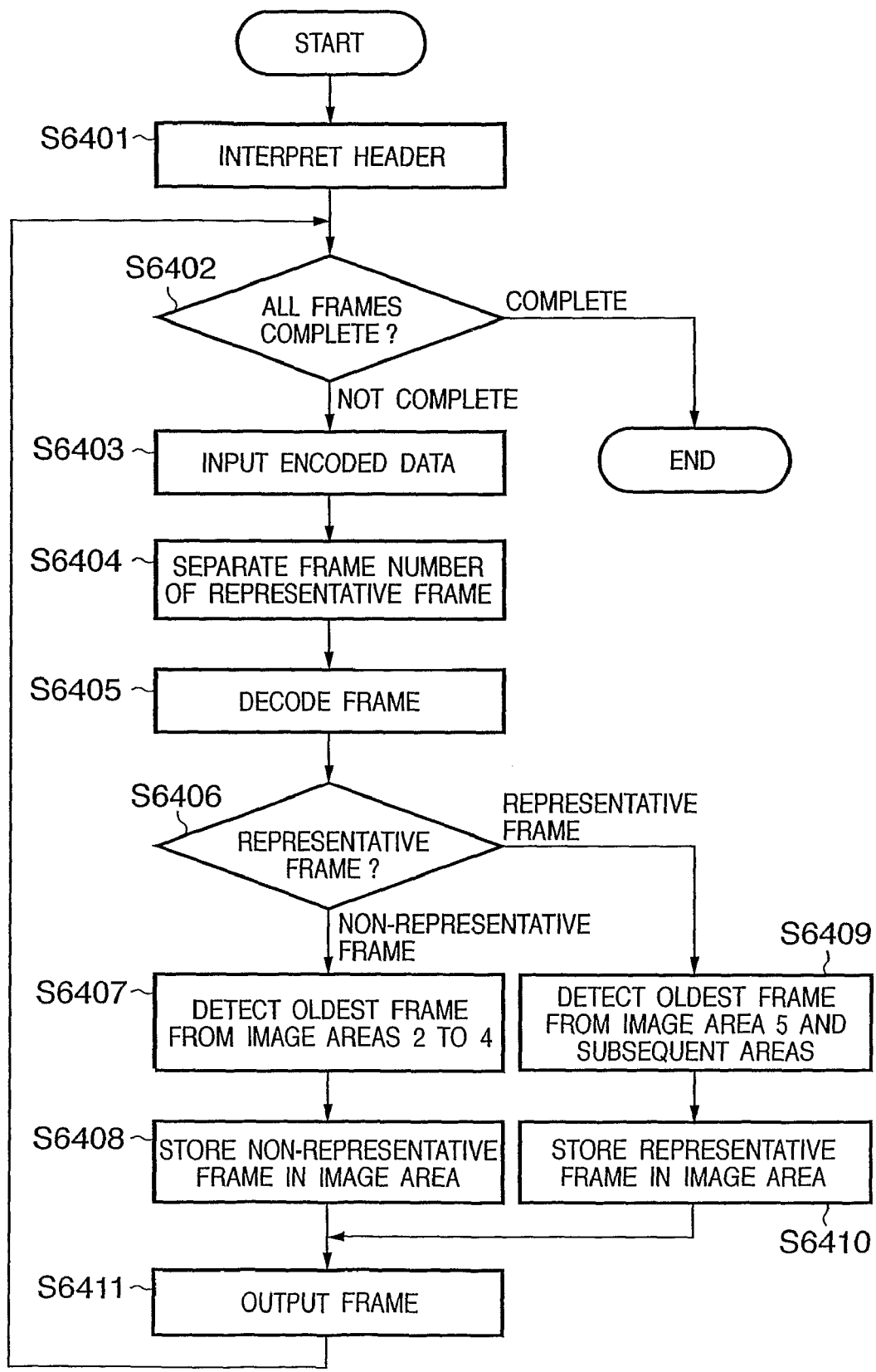
FIG. 28 is a flowchart of a process implemented by a CPU 300 upon executing moving image decoding software and communication software according to the 13th embodiment of the present invention.

FIG. 28 is a flowchart of the process implemented when the CPU 300 executes these moving image decoding software and communication software.

The CPU 300 refers to and interprets the header information which is input externally or internally (e.g., from the memory) prior to encoded data, and executes various initialization processes (step S6401).

It is checked if the decoding process for all frames is complete (step S6402). If the decoding process for all frames is not complete yet, the flow advances to step S6403 to input encoded data of each frame to the code area on the memory 301 (step S6403). The CPU 300 then separates the frame number of the representative frame of this frame, which is appended to this encoded data, from the encoded data (step S6404).

The CPU 300 applies the decoding process to the input encoded data, as described in the sixth embodiment, and stores the decoded image in image area 1 (step S6405). In this decoding process, if data to be decoded is inter-frame encoded, the CPU 300 decodes the data with reference to reference images stored in image areas 2 to 7. Also, the CPU 300 stores the frame number of the decoded frame in the working area.

Next, whether or not the frame decoded in step S6404 is a representative frame is determined by referring to the frame number written in the working area, i.e., by checking if that frame number matches the frame number separated in step S6404 (step S6406). If the decoded frame is a non-representative frame, the flow advances to step S6407. The CPU 300 specifies an image area which stores frame data with the oldest frame number of image areas 2 to 4 (step S6407), and copies the image stored in image area 1 to the specified area (step S6408).

On the other hand, if the decoded frame is a representative frame, the flow advances to step S6409. The CPU 300 specifies an image area which stores frame data with the oldest frame number of image areas 5 to 7 (step S6409), and copies the image stored in image area 1 to the specified area (step S6410).

Then, the CPU 300 outputs the decoded image data stored in image area 1 (step S6411). The output destination is not particularly limited. For example, the decoded image data may be output to the display device 307 and may be displayed.

The flow returns to step S6402 to repeat the subsequent processes.

With a series of selection operations, a temporally farther frame is held as a representative frame, and both temporally closer frames are referred to, thus obtaining a reconstructed image with a smaller information volume.

By applying intra-frame encoding to the representative frame, since a frame with high image quality is used as reference image data, the image quality can be improved.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 200.4-069486 filed on Mar. 11, 2004, the entire contents of which are hereby incorporated by reference herein.

The invention claimed is:

1. An encoding hardware apparatus for encoding images of frames which form a moving image by motion compensation, comprising:
   input means for inputting images of frames;
   section division means for dividing the frames into a plurality of sections on the basis of the images of the frames input by the input means;
   representative image setting means for setting, as a representative image, an image of a self frame, which has a smallest sum total value of differences from a group of images of other frames in each of the sections divided by the section division means; and
   reference image selection means for selecting one representative image to be referred to so as to encode an image of a frame of interest from the representative images set for respective sections, and
   wherein the image of the frame of interest is encoded by motion compensation using the images of the frames in the section that includes the representative image selected by the reference image selection means;
   wherein the section division means comprises:
   determination means for determining whether or not a frame of interest is included in a section to which a frame immediately before the frame of interest belongs;
   first setting means for, when the frame of interest is included in the section to which the frame immediately before the frame of interest belongs, setting the representative frame set in the section or the frame of interest as a new representative image in the section on the basis of images of respective frames in the section and an image of the frame of interest; and second setting means for, when the frame of interest is not included in the section to which the frame immediately before the frame of interest belongs, setting a new section which is different from the section and includes the frame of interest;

wherein the first setting means comprises:

first calculation means for calculating differences between respective frames in the section and the frame of interest, and calculating a sum total value of the calculated differences;

second calculation means for calculating a difference between the representative frame set in the section and the image of the frame of interest;

representative frame setting means for, when a sum of the value calculated by the second calculation means and a threshold is not less than the sum total value calculated by the first calculation means, setting the frame of interest as a new representative frame in the section;

first threshold setting means for, when the sum value is not less than the sum total value calculated by the first calculation means, setting the sum total value calculated by the first calculation means as the threshold; and second threshold means for, when the sum value is not more than the sum total value calculated by the first calculation means, setting the sum value as the threshold.

2. The apparatus according to claim 1, wherein the section division means comprises difference determination means for determining with reference to images of frames in an order said input means inputs whether or not an image difference between neighboring frames is not less than a predetermined value, and when the difference determination means refers to images in turn from an image of a first frame, and determines that a difference between an image of a second frame and an image of a third frame as a next frame of the second frame is not less than the predetermined value, the difference determination means sets the first and second frames as one section.

3. The apparatus according to claim 1, wherein the reference image selection means calculates prediction errors of motion compensation with an image of a frame to be encoded for respective representative images set in the respective sections, and selects the representative image that minimizes the prediction error.

4. The apparatus according to claim 2, wherein the image difference is a sum total value obtained by summing up differences between pixel values of corresponding pixels in two images for all or some pixels that form the images.

5. The apparatus according to claim 1, wherein the determination means calculates a difference between an image of a last frame of the section to which the frame immediately before the frame of interest belongs, and the image of the frame of interest, and when the calculated difference is not more than a predetermined value, the determination means determines that the frame of interest is included in the section to which the frame immediately before the frame of interest belongs.

6. An encoding method of encoding images of frames which form a moving image by motion compensation, using an encoding hardware apparatus, the encoding method comprising:

an input step of inputting images of frames;

a section division step of dividing the frames into a plurality of sections on the basis of the images of the frames input in the input step;

a representative image setting step of setting, as a representative image, an image of a self frame, which has a smallest sum total value of differences from a group of images of other frames in each of the sections divided in the section division step; and a reference image selection step of selecting one representative image to be referred to so as to encode an image of a frame of interest from the representative images set for respective sections, and wherein the image of the frame of interest is encoded by motion compensation using the images of the frames in the section that includes the representative image selected in the reference image selection step;

wherein the section division step includes:

a determining step of determining whether or not a frame of interest is included in a section to which a frame immediately before the frame of interest belongs;

a first setting step of, when the frame of interest is included in the section to which the frame immediately before the frame of interest belongs, setting the representative frame set in the section or the frame of interest as a new representative image in the section on the basis of images of respective frames in the section and an image of the frame of interest; and a second setting step of, when the frame of interest is not included in the section to which the frame immediately before the frame of interest belongs, setting a new section which is different from the section and includes the frame of interest;

wherein the first setting step further comprises:

a calculation step of calculating differences between respective frames in the section and the frame of interest, calculating a sum total value of the calculated differences, and calculating a second difference between the representative frame set in the section and the image of the frame of interest;

a representative frame setting step of, when a sum of the value calculated by the second difference and a threshold is not less than the sum total value, setting the frame of interest as a new representative frame in the section:

a first threshold setting step of, when the sum value is not less than the sum total value, setting the sum total value as the threshold; and a second threshold step of, when the sum value is not more than the sum total value, setting the sum value as the threshold.

7. A non-transitory computer-readable storage medium for storing a program, which when executed by a computer, causes the computer to perform the encoding method of claim 6.

* * * * *